United States Patent
Daily et al.

(10) Patent No.: US 10,154,317 B2
(45) Date of Patent: Dec. 11, 2018

(54) SYSTEM, METHOD, AND PROTOCOL FOR TRANSMISSION OF VIDEO AND AUDIO DATA

(71) Applicant: BoxCast, LLC, Cleveland, OH (US)

(72) Inventors: Gordon R. Daily, Cleveland, OH (US); Justin R. Hartman, Twinsburg, OH (US); Joel S. Helbling, Berea, OH (US); Ronald C. Hopper, Berea, OH (US)

(73) Assignee: BoxCast, LLC, Cleveland, OH (US)

( * ) Notice: Subject to any disclaimer, the term of this patent is extended or adjusted under 35 U.S.C. 154(b) by 0 days.

(21) Appl. No.: 15/637,160

(22) Filed: Jun. 29, 2017

(65) Prior Publication Data

US 2018/0014082 A1   Jan. 11, 2018

Related U.S. Application Data

(60) Provisional application No. 62/358,214, filed on Jul. 5, 2016.

(51) Int. Cl.
*H04N 21/61* (2011.01)
*H04N 21/231* (2011.01)
(Continued)

(52) U.S. Cl.
CPC ....... *H04N 21/6125* (2013.01); *H04L 67/327* (2013.01); *H04L 69/16* (2013.01); *H04N 21/2187* (2013.01); *H04N 21/231* (2013.01); *H04N 21/23439* (2013.01); *H04N 21/234363* (2013.01); *H04N 21/2743* (2013.01); *H04N 21/47214* (2013.01); *H04N 21/6437* (2013.01); *H04N 21/64322* (2013.01); *H04N 21/64746* (2013.01)

(58) Field of Classification Search
CPC . H04N 21/63; H04N 21/2187; H04N 21/6125
See application file for complete search history.

(56) References Cited

U.S. PATENT DOCUMENTS 5,115,429 A    5/1992  Hluchyj et al.
5,488,609 A    1/1996  Hluchyj et al.
(Continued)

FOREIGN PATENT DOCUMENTS

CA    2294511    1/1999
EP    1271830    1/2003
(Continued)

OTHER PUBLICATIONS

Printout of web page(s) at http://arstechnica.com/old/content/2006/03/6464.ars visited on Aug. 10, 2011 (1 page).
(Continued)

*Primary Examiner* — Nicholas T Corbo
(74) *Attorney, Agent, or Firm* — Calfee, Halter & Griswold LLP

(57) ABSTRACT

An improved backhaul protocol is provided, as well as computer-implemented systems and methods for autonomously broadcasting video data, audio data, or video and audio data during an event, wherein the broadcasting can be scheduled in advance and from a remote location (e.g., using a web browser), and wherein the video/audio data is streamed to a remote user over a network using the improved backhaul protocol.

36 Claims, 30 Drawing Sheets

(51) Int. Cl.
*H04N 21/2343* (2011.01)
*H04N 21/647* (2011.01)
*H04N 21/6437* (2011.01)
*H04N 21/643* (2011.01)
*H04N 21/2187* (2011.01)
*H04L 29/06* (2006.01)
*H04N 21/2743* (2011.01)
*H04N 21/472* (2011.01)
*H04L 29/08* (2006.01)

(56) References Cited

U.S. PATENT DOCUMENTS

| | | |
|---|---|---|
| 6,145,109 A | 11/2000 | Schuster et al. |
| 6,400,903 B1 | 6/2002 | Conoval |
| 6,421,387 B1 | 7/2002 | Rhee |
| 6,445,717 B1 | 9/2002 | Gibson et al. |
| 6,745,364 B2 | 6/2004 | Bhatt et al. |
| 6,771,594 B1 | 8/2004 | Upadrasta |
| 6,980,232 B2 | 12/2005 | Suzuki |
| 7,349,975 B2 | 3/2008 | Kikinis |
| 7,421,454 B2 | 9/2008 | DeShan et al. |
| 7,423,670 B2 | 9/2008 | Kawai et al. |
| 7,460,480 B2 | 12/2008 | Awais |
| 7,516,203 B2 | 4/2009 | Watanabe et al. |
| 7,522,528 B2 | 4/2009 | Fellman et al. |
| 7,562,380 B2 | 7/2009 | Negishi et al. |
| 7,617,434 B1 | 11/2009 | Huang |
| 7,773,517 B2 | 8/2010 | Abdel-Kader et al. |
| 7,859,571 B1 | 12/2010 | Brown |
| 7,986,626 B2 | 7/2011 | Abdel-Kader et al. |
| 8,121,078 B2 | 2/2012 | Siann et al. |
| 8,230,316 B2 | 7/2012 | Melliar-Smith et al. |
| 8,254,283 B2 | 8/2012 | Abdel-Kader et al. |
| 8,473,833 B2 | 6/2013 | Melliar-Smith et al. |
| 8,990,663 B2 | 3/2015 | Liu et al. |
| 9,167,275 B1 | 10/2015 | Daily et al. |
| 9,686,574 B2 | 6/2017 | Daily et al. |
| 2002/0026636 A1 | 2/2002 | LeComte |
| 2003/0229840 A1 | 12/2003 | Pattavina |
| 2004/0243922 A1 | 12/2004 | Sirota et al. |
| 2005/0200714 A1 | 9/2005 | Marchese |
| 2005/0251832 A1 | 11/2005 | Chiueh |
| 2005/0289618 A1 | 12/2005 | Hardin |
| 2006/0051060 A1 | 3/2006 | Derovanessian et al. |
| 2006/0129458 A1 | 6/2006 | Maggio |
| 2006/0171453 A1 | 8/2006 | Rohlfing et al. |
| 2006/0198300 A1 | 9/2006 | Li et al. |
| 2006/0222181 A1 | 10/2006 | Wu et al. |
| 2008/0040453 A1 | 2/2008 | Cohen |
| 2008/0168522 A1 | 7/2008 | Choi |
| 2008/0218498 A1 | 9/2008 | Yoshioka et al. |
| 2009/0046580 A1 | 2/2009 | Botzko et al. |
| 2009/0049491 A1 | 2/2009 | Karonen et al. |
| 2009/0055873 A1 | 2/2009 | Kim |
| 2009/0066788 A1 | 3/2009 | Baum et al. |
| 2009/0070477 A1 | 3/2009 | Baum et al. |
| 2009/0070804 A1 | 3/2009 | Liao |
| 2009/0113500 A1 | 4/2009 | Frenkel et al. |
| 2009/0113505 A1 | 4/2009 | Yu |
| 2009/0144400 A1 | 6/2009 | Kunito |
| 2009/0150936 A1 | 6/2009 | Lee et al. |
| 2009/0183213 A1 | 7/2009 | Mukerji et al. |
| 2009/0183217 A1 | 7/2009 | Mukerji et al. |
| 2009/0199234 A1 | 8/2009 | Mukerji et al. |
| 2009/0245268 A1 | 10/2009 | Pugliese |
| 2009/0255268 A1 | 10/2009 | Kaleeswaran et al. |
| 2009/0317056 A1 | 12/2009 | Hu et al. |
| 2009/0318224 A1 | 12/2009 | Ealey |
| 2009/0319574 A1 | 12/2009 | Burgard et al. |
| 2010/0030744 A1 | 2/2010 | DeShan et al. |
| 2010/0135643 A1 | 6/2010 | Fleming |
| 2010/0172403 A1 | 7/2010 | Rabenold et al. |
| 2010/0180311 A1 | 7/2010 | Gordon |
| 2010/0195823 A1 | 8/2010 | Lee et al. |
| 2010/0195826 A1 | 8/2010 | Lee et al. |
| 2010/0278043 A1 | 11/2010 | Abdel-Kader et al. |
| 2011/0099286 A1 | 4/2011 | Krikorian et al. |
| 2011/0154204 A1 | 6/2011 | Narayanaswamy |
| 2012/0110420 A1 | 5/2012 | Lin et al. |
| 2012/0268596 A1 | 10/2012 | Frenkel et al. |
| 2012/0331109 A1 | 12/2012 | Baum et al. |
| 2013/0194431 A1 | 8/2013 | O'Connor et al. |
| 2013/0214909 A1 | 8/2013 | Meijers |
| 2013/0239148 A1 | 9/2013 | Wilson et al. |

FOREIGN PATENT DOCUMENTS

| | | |
|---|---|---|
| EP | 1515513 | 3/2005 |
| WO | 2001084732 | 11/2001 |
| WO | 2002052858 | 7/2002 |
| WO | 2014160926 | 10/2014 |

OTHER PUBLICATIONS

Printout of web page(s) at http://arstechnica.com/old/content/2006/08/7493.ars visited on Aug. 10, 2011 (1 page).

Printout of web page(s) at http://www.dbstalk.com/showthread.php?t=109671 visited on Aug. 31, 2011 (7 pages).

Printout of web page(s) at watch.slingbox.com visited on Aug. 10, 2011 (1 page).

Printout of web page(s) at http://forums.crackberry.com/blackberry-bold-9700-f146/trendnet-security-camera-streaming-blackberry-os-407945/index2.html visited on Aug. 10, 2011 (6 pages).

Printout of web page(s) at controlbynet.com/inthenews.php visited on Aug. 10, 2011 (1 page).

Printout of web page(s) at http://cube.teradek.com/ visited on Aug. 10, 2011 (1 page).

Printout of web page(s) at http://www.prnewswire.com/news-releases/comcast-adds-remote-dvr-scheduling-launches-anyroom-dvr-and-upgrades-on-screen-program-guide-in-massachusetts-and-new-hampshire-101370429.html visited on Aug. 10, 2011 (3 pages).

Jim Roskind, "Multiplexed Stream Transport Over UDP," QUIC (Quick UDP Internet Connections), Apr. 2012 (51 pages).

Zhao et al., Broadcast system source codes: a new paradigm for data compression, 1999 IEEE, California Institute of Technology Department of Electrical Engineering.

Zhhou et al., A web-based management system for H.264 live video broadcasting, 2007 IEEE, Ningbo Institute of Technology. Zhejiang University, China.

www.yourschoollive.com archived screenshots from Sep. 1, 2009 (3 pages).

www.yourschoollive.com archived screenshots from Feb. 6, 2010 (1 page).

www.yourschoollive.com archived screenshots from Oct. 6, 2009 (1 page).

www.yourschoollive.com archived screenshots from Dec. 1, 2009 (1 page).

www.yourschoollive.com archived screenshots from Jan. 6, 2010 (1 page).

www.yourschoollive.com archived screenshots from Mar. 10, 2010 (1 page).

www.yourschoollive.com archived screenshots from May 27, 2010 (1 page).

www.yourschoollive.com archived screenshots from Feb. 8, 2011 (1 page).

200

SYSTEM, METHOD, AND PROTOCOL FOR TRANSMISSION OF VIDEO AND AUDIO DATA

RELATED APPLICATION

The present application is being filed as a U.S. non-provisional patent application claiming priority/benefit under 35 U.S.C. § 119(e) from the U.S. provisional patent application entitled SYSTEM, METHOD, AND PROTOCOL FOR TRANSMISSION OF VIDEO AND AUDIO DATA, having Ser. No. 62/358,214 and filed on Jul. 5, 2016, the entire disclosure of which is incorporated herein by reference.

FIELD

The general inventive concepts relate to data transmission protocols and, more particularly, to an improved backhaul protocol for the transmission of video and audio data.

BACKGROUND

As disclosed in U.S. Pat. No. 9,167,275, the entire disclosure of which is incorporated herein by reference, computer-implemented systems and methods provide for the autonomous broadcasting of video data, audio data, or video and audio data during an event, wherein the broadcasting can be scheduled in advance and from a remote location (i.e., over a network). Various conventional protocols, such as Real-time Transport Protocol (RTP) over User Datagram Protocol (UDP), are used for sending the data over the network.

The systems and methods often use the H.264 video compression standard for video encoding and the Advanced Audio Coding (AAC) audio compression standard for audio encoding. These compression standards are designed to ride through some amount of packet loss. Consequently, UDP is preferred to Transmission Control Protocol (TCP), as TCP's congestion avoidance mechanisms can cause large backlogs (and subsequent buffering) in the face of occasional packet loss. Thus, RTP over UDP is frequently used as a backhaul protocol in the systems and methods.

Although RTP over UDP achieves the goals of having lower latency and less buffering than TCP, customers do notice packet losses, as artifacts commonly become visible/audible in the decoded picture and sound, especially when losses are part of a keyframe. Packet loss generally comes in two forms: (1) loss due to available bandwidth being lower than the transmitted data, and (2) loss due to temporary congestion along the backhaul path. A redesigned backhaul protocol would ideally address both of these situations, for example, by: (1) observing backpressure from the backhaul link and communicating that upstream to allow higher-level software to adjust transmission rates and (2) using measures to ensure that, in most circumstances, occasional loss is recovered.

Furthermore, the use of RTP over UDP allows intermediary backhaul nodes to freely inspect and analyze packet contents. This means that the stream data is free to be intercepted, observed, and even modified by any third-party through which the content passes, which may be undesirable for certain broadcasters with sensitive content. This also means that those intermediate nodes may use that information for undesired packet shaping or outright filtering. Service providers have used this approach to impose size restrictions on data transfers, including the streaming of video and/or audio data. A redesigned backhaul protocol should prevent or otherwise increase the difficulty of performing such activities.

Further still, the use of RTP over UDP leaves the distribution network vulnerable to attack at ingress by attackers who may spoof streamed content. Since the media servers are not able to ensure that received data actually originated from the expected transmission device, an attacker would be able to stream their own RTP/UDP data to the media server and disrupt the stream or even inject their own content. A redesigned backhaul protocol should prevent or otherwise increase the difficulty of performing such activities.

In view of the above, there is an unmet need for an improved backhaul protocol for the transmission of video and audio data.

SUMMARY

The general inventive concepts contemplate an improved backhaul protocol for the transmission of data (e.g., video data and/or audio data) over a network, and systems and methods using said backhaul protocol. For example, the general inventive concepts also encompass computer-implemented systems and methods for remotely scheduling autonomous broadcasting of video/audio data in advance, wherein the systems and methods use the improved backhaul protocol.

In one exemplary embodiment, a method of broadcasting digital content is disclosed. The method comprises: a. situating an autonomous broadcast device (ABD) behind a preexisting firewall; b. activating the ABD and establishing an Internet connection for the ABD behind the firewall, wherein the firewall prevents remote access to the ABD from outside the firewall; c. with the ABD, autonomously performing the following steps without any user intervention required at the location of the ABD and without any modification to or circumvention of the firewall: c-1. via the Internet connection, autonomously issuing a request to a scheduler web site situated outside the firewall and downloading schedule data for the ABD; c-2. determining a start time for an event from the schedule data downloaded from the scheduler web site; c-3. receiving digital content of the event at the start time from a digital recording device proximate to the event; c-4. via the Internet connection, transmitting streaming parameters to the scheduler web site; and c-5. via the Internet connection, transmitting the digital content to at least one server contemporaneously with the event, the digital content having a first quality; d. prior to processing the digital content, the at least one server receives the streaming parameters from the scheduler web site; and e. contemporaneously with the event, streaming from the at least one server the digital content having the first quality to a plurality of users. According to the method, all communications between the ABD and the scheduler web site are initiated by the ABD over the Internet connection. According to the method, the digital content is transmitted to the at least one server according to a first protocol, wherein the first protocol defines an encryption scheme for the digital content; and wherein the first protocol defines an error correction scheme for the digital content.

In one exemplary embodiment, the method further comprises: contemporaneously with the event, storing at the location of the ABD a version of the digital content having a second quality that is of higher quality than the first quality.

In one exemplary embodiment, the method further comprises: after the event, via the Internet connection, uploading to the at least one server the digital content having the second quality over a period of time longer than the length of the event.

In one exemplary embodiment, the method further comprises: in accordance with the start time for the event determined from the schedule data, automatically powering on the digital recording device before the start time.

In one exemplary embodiment, the method further comprises: permitting a user to alter a schedule and interrupt an upload only via the scheduler web site.

In one exemplary embodiment, the ABD lacks a user interface permitting a user to alter a schedule and interrupt an upload via the ABD.

In one exemplary embodiment, the method further comprises: dynamically scaling overall capacity represented by the at least one server based on demand for the digital content having the first quality by the users.

In one exemplary embodiment, the method further comprises: using the Internet connection to autonomously issue a request to a pre-determined registration web site situated outside the firewall to register the ABD.

In one exemplary embodiment, the method further comprises: determining an end time for the event from the schedule data downloaded from the scheduler web site, wherein at the end time, ceasing reception of the digital content from the digital recording device.

In one exemplary embodiment, the method further comprises: at the end time, automatically powering off the digital recording device.

In one exemplary embodiment, the digital content comprises at least one of video data and audio data.

In one exemplary embodiment, the digital content comprises video data, wherein the ABD transmits the video data to the at least one server in a first video resolution and a second video resolution, and wherein the first video resolution is lower than the second video resolution. In one exemplary embodiment, the video data having the first video resolution is streamed from the at least one server to the users contemporaneously with the event. In one exemplary embodiment, the video data having the second video resolution is stored on the at least one server for subsequent retrieval by a user.

In one exemplary embodiment, the method further comprises: dynamically scaling the at least one server based on demand for the digital content being streamed to the users.

In one exemplary embodiment, the method further comprises: prior to the start time: calculating an estimated bandwidth on the at least one server for the event, and reserving the estimated bandwidth on the at least one server.

In one exemplary embodiment, the digital recording device is a digital camera.

In one exemplary embodiment, the first protocol is a backhaul protocol that transports the digital content from the ABD to the at least one server using a plurality of packets, wherein at least one of the packets comprises encrypted data corresponding to a portion of the digital content, and wherein at least one of the packets comprises error correction information.

In one exemplary embodiment, the encryption scheme is one of eBC-0 and eBC-x16.

In one exemplary embodiment, the error correction scheme is a 1-dimensional XOR scheme suitable for recovering one missing packet from a group of N packets. In one exemplary embodiment, the value of N is selected to correspond to the last packet of a multi-packet frame.

In one exemplary embodiment, the error correction scheme is fBC-X1d.

In one exemplary embodiment, the streaming parameters are transmitted to the scheduler website according to the first protocol.

In one exemplary embodiment, the streaming parameters are transmitted to the scheduler website according to a second protocol. In one exemplary embodiment, the second protocol is Session Description Protocol (SDP).

In one exemplary embodiment, a system for scheduling broadcasting of video data is disclosed. The system comprises: scheduling logic; a video acquisition device; a broadcasting device; a plurality of media servers; and a network. According to the system, the broadcasting device is situated behind a pre-existing firewall; the scheduling logic is remote from and in data communication with the broadcasting device and the media servers over the network; the scheduling logic interfaces with a first user to allow the first user to set a start time for an event; the scheduling logic transmits the start time to the broadcasting device over the network; at the start time, the video acquisition device begins acquiring video data and the broadcasting device transmits the video data to the media servers over the network; the media servers transmit the video data as a live video stream to a second user over the network; the scheduling logic manages the flow of the video data from the broadcasting device to the media servers; and the scheduling logic manages the flow of the live video stream from the media servers to the second user. According to the system, the video data is transmitted to the media servers according to a backhaul protocol; wherein the backhaul protocol defines an encryption scheme for the video data; and wherein the backhaul protocol defines an error correction scheme for the video data.

In one exemplary embodiment, the first user, the second user, and the broadcasting device are remote from one another.

In one exemplary embodiment, at the start time, the broadcasting device automatically powers on the video acquisition device.

In one exemplary embodiment, the scheduling logic logs the start time in a schedule associated with the broadcasting device.

In one exemplary embodiment, the scheduling logic interfaces with the first user to allow the first user to set an end time for the event; the scheduling logic logs the end time in the schedule; the scheduling logic transmits the end time to the broadcasting device over the network; and at the end time, the broadcasting device ceases transmission of the video data captured by the video acquisition device.

In one exemplary embodiment, at the end time, the broadcasting device automatically powers off the video acquisition device.

In one exemplary embodiment, the broadcasting device transmits the video data captured by the video acquisition device to the media servers in a first video resolution and a second video resolution. In one exemplary embodiment, the first video resolution is lower than the second video resolution. In one exemplary embodiment, the video data in the first video resolution is used for the live video stream. In one exemplary embodiment, the video data in the first video resolution is stored on the media servers for subsequent retrieval by a third user. In one exemplary embodiment, the video data in the second video resolution is stored on the media servers for subsequent retrieval by a third user.

In one exemplary embodiment, the media servers include at least one streaming server for transmitting the live video stream to the second user over the network; and the media servers include at least one storage server for storing the video data for subsequent retrieval by a third user over the network.

In one exemplary embodiment, the scheduling logic dynamically scales the media servers based on demand for the live video stream.

In one exemplary embodiment, prior to the start time: the scheduling logic calculates an estimated bandwidth on the media servers for the event, and the scheduling logic reserves the estimated bandwidth on the media servers.

In one exemplary embodiment, the broadcasting device periodically polls the scheduling logic to detect any changes in the start time. In one exemplary embodiment, the broadcasting device periodically polls the scheduling logic to detect any changes in the end time.

In one exemplary embodiment, the video data includes audio data. In one exemplary embodiment, the video acquisition device is operable to acquire the audio data.

In one exemplary embodiment, the video acquisition device is a digital video camera.

In one exemplary embodiment, the network is the Internet.

In one exemplary embodiment, an improved backhaul protocol for use in a method of or by a system for broadcasting data (comprising at least one of video data and audio data) is disclosed. The protocol conveys the data between a stream originating device and a media server using a plurality of packets, wherein at least one of the packets comprises encrypted data corresponding to a portion of the data, and wherein at least one of the packets comprises error correction information.

Numerous other aspects, advantages, and/or features of the general inventive concepts will become more readily apparent from the following detailed description of exemplary embodiments, from the claims, and from the accompanying drawings being submitted herewith.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
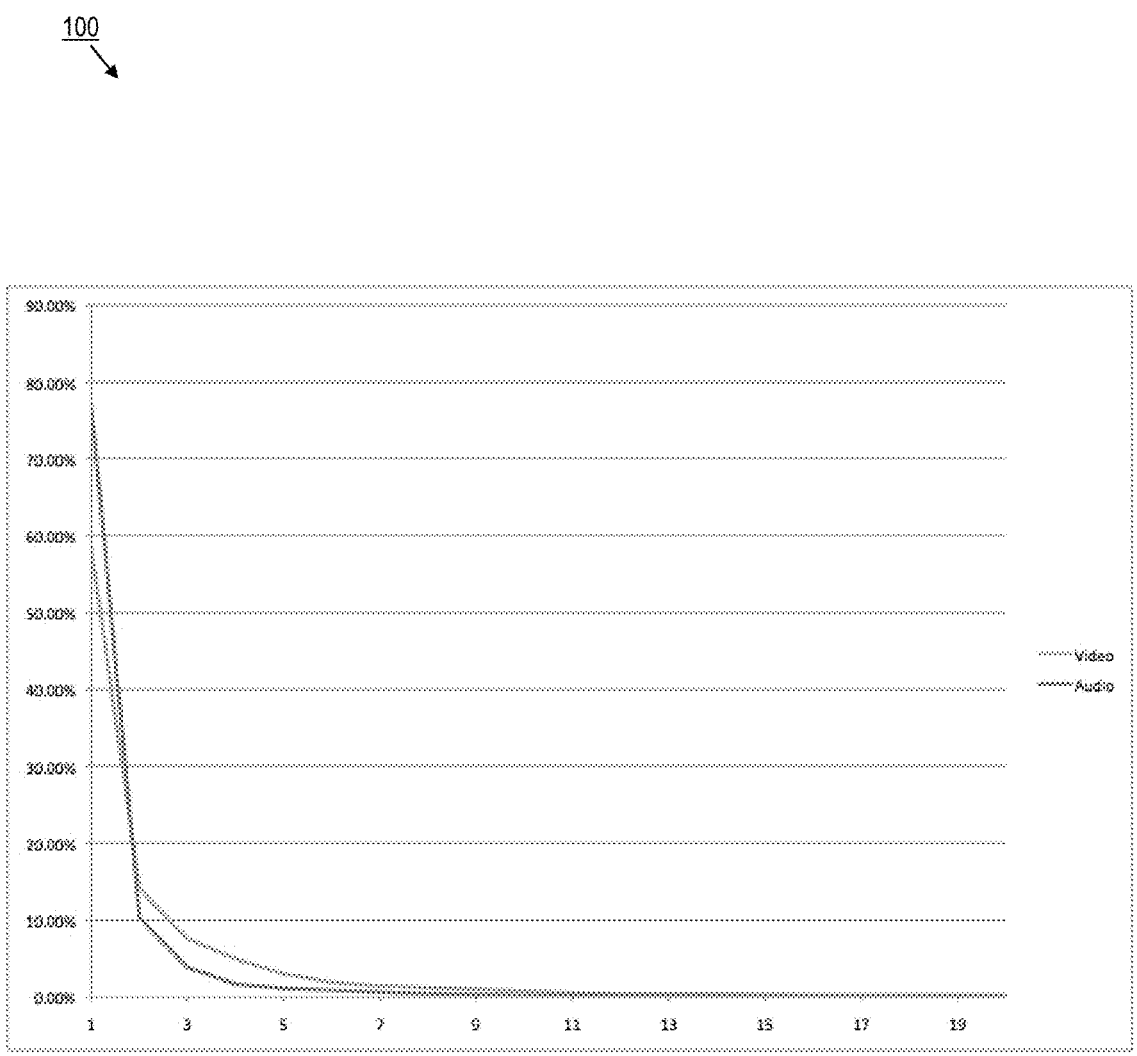
FIG. 1 is a graph showing the distribution of loss packets during the streaming of video and audio data.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts encompass an improved backhaul protocol, as well as computer-implemented systems and methods for autonomously broadcasting video data, audio data, or video and audio data during an event, wherein the broadcasting can be scheduled in advance and from a remote location (e.g., using a web browser), and wherein the video/audio data is streamed to a remote user over a network using the improved backhaul protocol.

As used herein, unless the context indicates otherwise, the terms "Advanced Encryption Standard" and "AES" refer to a symmetric block cipher for the encryption of electronic data.

As used herein, unless the context indicates otherwise, the terms "computer," "processor," and "CPU" include, but are not limited to, any programmed or programmable electronic device or coordinated devices that can store, retrieve, and process data and may be a processing unit or in a distributed processing configuration.

As used herein, unless the context indicates otherwise, the term "backhaul" refers to the communications between the streaming hardware/device and the media server, or more generally, the set of network links and protocols used to convey the stream information from the broadcast location to the distribution network.

As used herein, unless the context indicates otherwise, the term "Blowfish" refers to a symmetric block cipher for the encryption of electronic data.

As used herein, unless the context indicates otherwise, the terms "Forward Error Correction" and "FEC" refer to a technique used for controlling errors in data transmission, wherein redundant information is supplied in advance so that the redundant information may be used to correct for (certain kinds of) missing data.

As used herein, unless the context indicates otherwise, the term "keyframe" refers to a frame in encoded video that does not depend on any other frames, but is used as a reference point for other frames' motion vectors. Also known alternatively as an I-frame or an IDR frame.

As used herein, unless the context indicates otherwise, the terms "logic" and "circuit" include, but are not limited to, hardware, firmware, software and/or combinations of each to perform a function(s) or an action(s). For example, based on a desired application or needs, logic may include a software controlled microprocessor, discrete logic such as an application specific integrated circuit (ASIC), programmed logic device, or other processor. Logic may also be fully embodied as software.

As used herein, unless the context indicates otherwise, the terms "Real-Time Transport Protocol" and "RTP" refer to a standardized packet format for delivering video and audio data over IP networks.

As used herein, unless the context indicates otherwise, the term "software" includes, but is not limited to, one or more computer readable and/or executable instructions that cause a computer or other electronic device to perform functions, actions, and/or behave in a desired manner. The instructions may be embodied in various forms such as routines, algorithms, modules, or programs including separate applications or code from dynamically linked libraries. Software may also be implemented in various forms such as a stand-alone program, a function call, a servlet, an applet, instructions stored in a memory, part of an operating system, or other type of executable instructions. It will be appreciated by one of ordinary skill in the art that the form of software is dependent on, for example, requirements of a desired application, the environment it runs on, and/or the desires of a designer/programmer or the like.

As used herein, unless the context indicates otherwise, the terms "Transport Control Protocol" and "TCP" refer to a stream-based protocol for delivering information over IP networks.

As used herein, unless the context indicates otherwise, the terms "User Datagram Protocol" and "UDP" refer to a block- or datagram-based protocol for delivering information over IP networks.

As used herein, unless the context indicates otherwise, the term "wire protocol" refers to a protocol that typically operates higher than the physical layer, which is used to get data from point to point. Wire protocols are useful when different applications need to interoperate.

As used herein, unless the context indicates otherwise, the terms "eXclusive OR" and "XOR" refer to a Boolean operation which, when applied to two bits, produces a result that is true if and only if only one of the input bits is true. The XOR operation is commonly used in various kinds of encryption and error detection/correction schemes.

Given various shortcomings of conventional protocols (e.g., RTP over UDP) used to carry video and audio data over a network, an improved backhaul protocol is proposed that achieves one or more of the following objectives. More preferably, the backhaul protocol achieves a plurality of the following objectives. Most preferably, the backhaul protocol achieves all of the following objectives, at least to some increased extent over conventional protocols.

The backhaul protocol protects the video data and/or audio data (i.e., the "media") from eavesdropping by intermediate third parties.

The backhaul protocol prevents or otherwise reduces the likelihood of an attacker disrupting the stream or injecting their own content into the stream.

The backhaul protocol prevents or otherwise reduces the likelihood of intermediate backhaul nodes shaping or filtering media flows.

The backhaul protocol allows higher-level processes and applications to adjust to changing link conditions dynamically by responding to backpressure/congestion information provided by the backhaul protocol. This will typically be implementation dependent. For example, in some embodiments, the backpressure/congestion information is provided to the application through as series of readable properties that the application can poll on a periodic basis.

The backhaul protocol allows for recovery from occasional packet loss on the backhaul. In general, this is handled by filing in missing packets that can be recovered (e.g., by forward error correction) when possible, or retransmitting packets that are lost in transit.

With respect to protecting the media from eavesdropping by intermediate third parties, one solution would be to encrypt all packet contents. An investigation into using AES, as a conventional encryption scheme, in the context of a system for streaming video and audio data (e.g., any of the systems described in U.S. Pat. No. 9,167,275) showed that encrypting all packets of a 3 Mbps/128 kbps stream would take approximately 25-50% of the system's processing power (i.e., CPU). A similar investigation in the use of Blowfish, as a conventional encryption scheme which had been reported to be 4× faster than AES, showed that encrypting all packets of a 3 Mbps/128 kbps stream would take approximately 6-12% of the CPU.

The streaming devices used in the system typically have a limited amount of processor power. For example, a lower capacity CPU may be utilized for design reasons, such as to keep the profile of the device relatively small (i.e., portable) and/or to reduce the overall cost of the device. As another example, the CPU may simply already be performing at or near its capacity simply by streaming the media. Consequently, it is not practical for the streaming devices to sacrifice a relatively significant portion of their processing power in order to encrypt all packet contents.

Instead, the improved backhaul protocol employs an encryption methodology that minimizes CPU and memory utilization to fit within the available resources of the streaming devices, while also being expandable to accommodate when sufficient advances in processor technology might support more advanced encryption techniques (including the encryption of all packet contents).

In some embodiments, the encryption methodology employed by the improved backhaul protocol also serves to prevent or otherwise reduce the likelihood of an attacker disrupting the stream or injecting their own content into the stream. In particular, the encryption scheme employed by the backhaul protocol allows the system to confirm that both endpoints are knowledgeable of the secret data used to encrypt the media.

There are two primary ways of addressing occasional backhaul packet loss (i.e., packet loss not directly related to the link speed being lower than the transmission rate): (1) retransmission and (2) error correction. Retransmission minimizes overhead by only utilizing extra bandwidth when necessary, but it increases the latency by requiring the flow to be delayed (to account for the worst-case retransmission time). Error correction can recover from some losses without retransmission (thus keeping the latency lower), but adds a constant overhead that is not always necessary. Furthermore, depending on the error correction scheme that is used, certain kinds of losses are unrecoverable (typically more "bursty" losses). To better decide on a suitable scheme for packet loss recovery, the inventors investigated the nature of packet losses on an existing backhaul utilized by a system for streaming video and audio data.

In particular, the inventors downloaded and analyzed the packet loss data for 2,799 broadcasts that occurred over a 2-3 month period. The distribution of the number of subsequent packets typically lost is shown in the graph 100 of FIG. 1. According to the inventors' analysis, approximately 62% of all packet losses were single-packet losses, and 89% of all loss events were 5 adjacent packets or fewer. However, since the suitability of various error correction schemes depends more on how many subsequent packets were not lost, the inventors performed a more nuanced investigation.

A 1-dimensional Forward Error Correction scheme is generally able to correct one packet loss for a group of N packets (where N-1 packets in the group are correctly received). To determine the suitability of a 1-dimensional FEC scheme for the loss data, the inventors performed the following algorithm:

1) Analyze all single-packet loss events to discover the number of packets received before and after the loss occurred. The largest possible N that could (optimistically) recover this loss is then before+after+1.

2) Collect all such instances; for all values of N within a reasonable range, determine how many single-packet loss events could be recovered by N.

3) Consider that the overhead for N is 1/N (to send 1 FEC packet for a group of N data packets).

Figure 2:
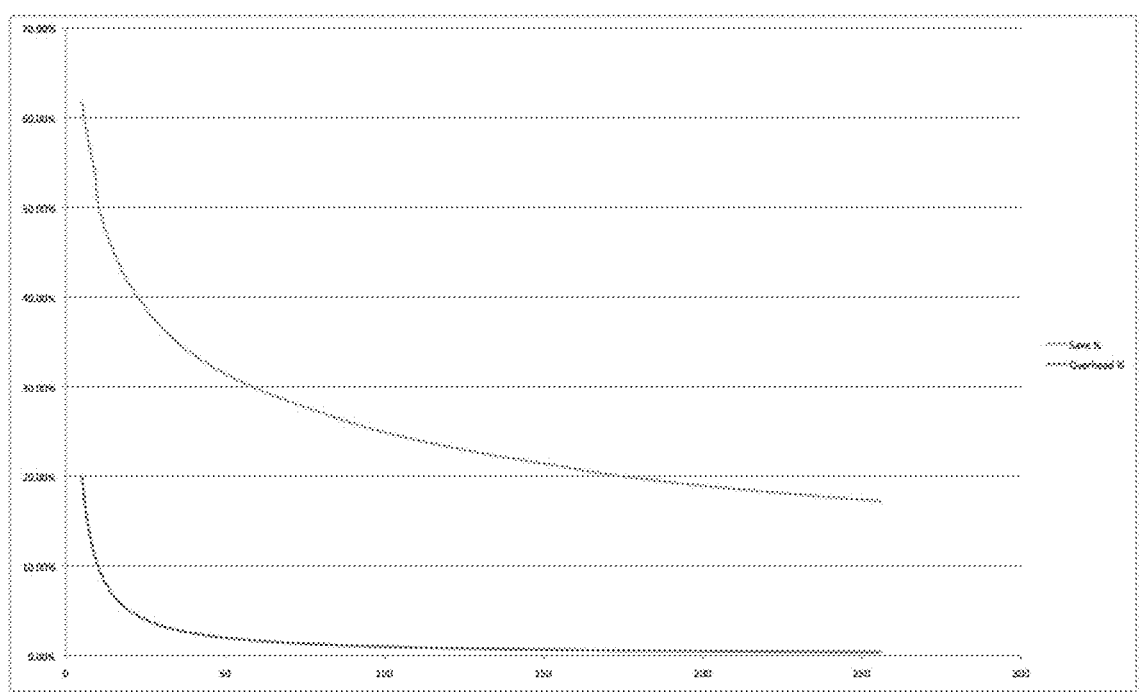
FIG. 2 is a graph showing how many single-packet losses (%) could be recovered amongst N packets by performing a 1-dimensional FEC scheme and the overhead (%) of N.

Performing this analysis revealed (1) how many single-packet loss events could be (optimistically) recovered by N and (2) the overhead of N. This information is shown in the graph 200 of FIG. 2.

Highlighting a couple of data points, N=10 yields a 10% constant overhead for the potential of recovering from approximately 50% of all single-loss events (or, approximately 31% of all loss events). N=20 yields a 5% constant overhead for the potential of recovering from approximately 41% of all single-loss events (or, approximately 26% of all loss events).

The choice of N also affects the latency, as the media flows must be delayed until an entire group is received (or should have been received). Depending on the packet rate for the various kinds of flows (video: ~30-270 pps; audio: ~43-47 pps; other: ~0.1-30 pps), larger values of N may increase latency in an undesirable way.

Fortunately, for simple FEC schemes (e.g., XOR), the value of N can be chosen on the fly. The inventors found that this allowed for the intelligent selection of N to minimize latency, for example, to end a group on the last RTP packet of a video frame. N can also be bounded at the lower end to constrain overhead.

The inventors also considered FEC schemes that utilize two dimensions (e.g., M FEC packets are sent for every N data packet such that each "row" and "column" is protected by FEC data). Such schemes are better at handling bursty packet loss at the cost of greater overhead. For example, consider a 5×5 "grid" of packets (N=25). One FEC packet is sent for each row and column (M=10). Thus, the overhead is 40%, but up to 5 lost packets (including 5 subsequent packets) can be recovered.

Analyzing the suitability of such a scheme is much more difficult. Furthermore, reducing the overhead requires fairly large values of N, which increase latency unacceptably. Consequently, the inventors did not analyze any such schemes.

General design goals for various exemplary embodiments of the improved backhaul protocol include (but are not limited to) one or more of the following:

The protocol minimizes latency (particularly when doing so is not in conflict with other goals).

The protocol minimizes head-of-line blocking for individual media flows.

The protocol provides a mechanism by which packets can be encrypted.

The encryption scheme is selectable and upgradable.

The encryption scheme can run within the CPU and memory constraints of existing streaming devices, such as those disclosed in U.S. Pat. No. 9,167,275.

The encryption scheme can provide a guarantee that the two parties (i.e., sender and receiver) are who they should be.

The encryption scheme sufficiently obfuscates its contents for the purpose of thwarting intermediary routing and shaping nodes along the backhaul.

The protocol provides a mechanism for recovering from occasional data loss by use of a forward error correcting scheme.

The protocol employs a forward error correcting scheme that is selectable and upgradable.

The protocol employs a forward error correcting scheme that runs within the CPU and memory constraints of the broadcasting device.

The protocol employs a forward error correcting scheme that intelligently chooses its parameters to minimize latency and communication overhead.

The protocol provides a mechanism for recovering from bursty packet loss by retransmission.

The protocol provides a mechanism for giving link congestion/backpressure information to upstream elements (e.g., for the purpose of adjusting transmission speed).

Figure 3:
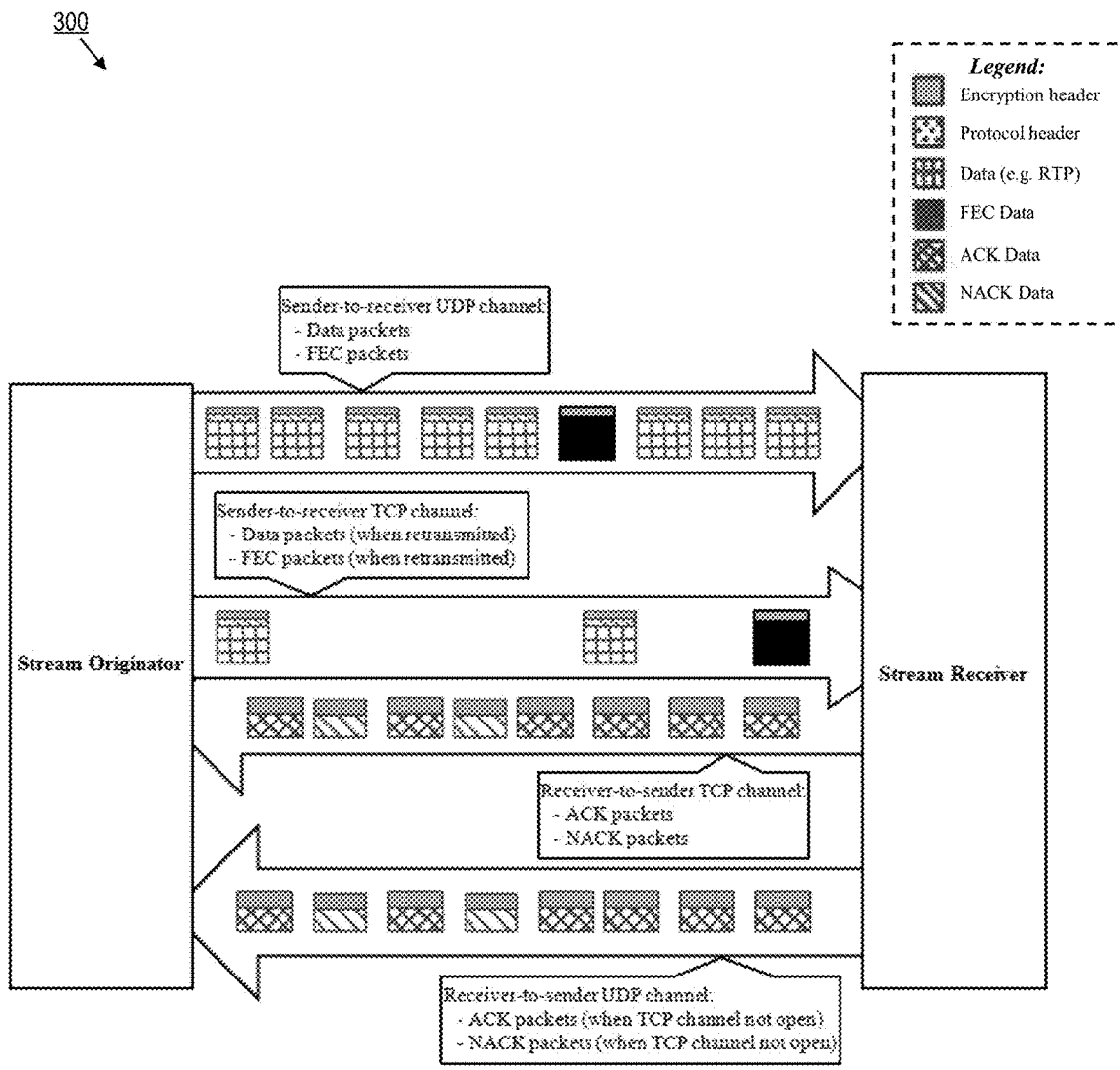
FIG. 3 is a diagram illustrating an improved backhaul protocol, according to an exemplary embodiment.

An exemplary embodiment of the improved backhaul protocol 300 will now be described with reference to FIG. 3.

The backhaul protocol 300 is a block-based or datagram-based protocol (rather than a stream-based protocol). The primary reason for this is to accommodate the use of UDP for transmission whenever possible, as UDP is a datagram-based protocol. Trying to adapt a stream-based protocol to datagrams introduces an extra layer of framing that is unnecessary. Furthermore, packetizers for RTP data abound.

The backhaul protocol 300 utilizes packets having contents that include two parts: (1) an encryption/decryption scheme and (2) a loss recovery scheme. On the sender side, encryption is the last step applied before packet transmission. Conversely, on the receiver side, decryption is the first step applied at packet reception. This ensures that any packets that make it through the decryption stage are unmodified and known to be from the expected sender.

Inside the encrypted envelope is the loss recovery protocol information (including the original RTP data). Each packet has a channel ID and a sequence number, which are used to uniquely identify packets (for example, in the acknowledgement of receipt). The loss recovery information also includes header information pertaining to the FEC scheme. Other error correction packets are also sent, which contain the data generated by the FEC scheme (for the purpose of error recovery at the receiver).

The protocol utilizes both UDP and TCP. The broadcasting device, i.e., the stream originator (herein labeled "BoxCaster"), first sends encrypted data packets (both original data and error correction data) to the media server over UDP. It also originates a TCP connection to the media server. This TCP connection is used to receive packet acknowledgements from the media server. It is also used to send data packets from the originator to the media server if and when retransmission is required. If the TCP connection is not open, retransmitted packets will be sent over UDP. The media server sends acknowledgements of received/non-received packets to the BoxCaster over the TCP connection. If the TCP connection is not open, it will send them via UDP.

The stream originator is ultimately in charge of deciding when a packet has been received by the media server. This means that all packets must be positively acknowledged before being considered as received. The media server sends a positive acknowledgement (ACK) for each packet received over either transport. The media server also sends positive acknowledgement (ACK) for any packet it recovered via the FEC mechanism. Furthermore, it may decide to send a negative acknowledgement (NACK) for a specific packet if it has reason to believe that packet may have been lost. Some reasons why a NACK may be sent include: (a) an FEC group has been closed and the packet loss for the group exceeds the recoverable threshold; (b) a sequence number gap indicates a likely loss that is greater than the recovery threshold; (c) a new FEC group has started, but the prior group's recovery information has not been received; etc.

Conversely, multiple causes may trigger a packet retransmission from the stream originator, for example: (a) a NACK for the packet has been received on either transport; (b) one $RTT+X*\sigma+\delta$ has passed since the FEC group has been closed and it has one or more unacknowledged packets; (c) some maximum timeout has occurred and the packet has not been acknowledged; etc.

As a final, fail-safe data point, the receiver also provides feedback to the sender of the running count of packets lost on each channel. This information is provided with each ACK and NACK packet. In case ACKs are not being reliably received by the originator, the originator can use the running loss count included in the ACK and NACK packets to get a sense of the actual amount of packet loss for each channel.

According to the backhaul protocol 300, both parties generally err on the side of it being more likely that a packet will be received; meaning some packets may be sent more times than is absolutely necessary.

Multiple pieces of information can be provided to the originating application including, but not limited to: (a) the number of buffers and bytes sent; (b) the number of buffers and bytes positively acknowledged (ACKed); (c) the number of buffers and bytes negatively acknowledged (NACKed); (d) the number of buffers retransmitted due to negative acknowledgements (NACKs); (e) the number of buffers retransmitted due to timeout waiting for positive acknowledgement; (f) the number of buffers and bytes for which positive acknowledgement (ACKs) were never received; (g) statistics about round-trip time (RTT), used to calculate timeout values; (f) whether the TCP socket is open or closed; (g) transmit backlog on the TCP socket; (h) amount of actual packet loss reported from the receiver for each channel, as well as the last time actual loss data was received; etc. In turn, the originating application can use this information to adjust the quality in an effort to reduce the likelihood of future loss. For example, the encoded bitrates can be reduced.

EXAMPLES

The following Examples are provided merely to further illustrate the general inventive concepts. Accordingly, the general inventive concepts are not intended to be limited to by these specific Examples.

As a first example, consider a so called "best case" scenario where there is typically no packet loss: (a) both the UDP and TCP channels would be open and fully functional; (b) all packets and error recovery data would be sent over the UDP channel; (c) packet acknowledgements would be received over the TCP channel; (d) no retransmissions would occur; (e) network overhead is minimal: simply the protocol and FEC overhead; and (f) CPU overhead is minimal: simply the encryption and error recovery overhead. In this case, there is little difference between the use of RTP/UDP and the improved backhaul protocol (e.g., backhaul protocol 300), other than slightly more network and CPU overhead.

As another example, consider a "close-to-best case" scenario with only small amounts of both bursty and intermittent packet loss: (a) both the UDP and TCP channels would be open and fully functional; (b) all packets and error recovery data would be initially sent over the UDP channel; (c) single-packet losses with appropriate margin are recovered at the media server via FEC; (d) multiple-packet losses and single-packet losses without appropriate margin are recovered via retransmission over the TCP channel; (e) packet acknowledgements would be received over the TCP channel; (f) network overhead is protocol overhead, FEC overhead, and retransmission overhead; and (g) CPU overhead is encryption and error recovery overhead, plus retransmission overhead. In this case, the difference between RTP/UDP and the improved backhaul protocol (e.g., backhaul protocol 300) is that RTP/UDP would experience packet loss, while the improved backhaul protocol would recover from all losses (at the expense of slightly higher network and CPU overhead).

As yet another example, consider a "more lossy" scenario: (a) the UDP channel is open, but lossy; (b) the TCP channel is sometimes open, but closes often due to congestion/loss; (c) all packets and error recovery data would be initially sent over the UDP channel, but many will be retried at least once over either the UDP or TCP channel (depending on what is open at the time); (d) single-packet losses with appropriate margin are few, therefore not much recovery occurs at the media server; (e) multiple-packet losses and single-packet losses without appropriate margin are frequent and trigger retransmissions over the TCP and/or UDP channels; (f) packet acknowledgements are received over both TCP and UDP channels (depending on what is open at the time); (g) network overhead is protocol overhead, FEC overhead, and lots of retransmission overhead, with this implementation providing backpressure information upstream; and (h) CPU overhead is encryption and error recovery overhead, plus lots of retransmission overhead. In this case, RTP/UDP would experience significant packet loss which would either significantly degrade the stream quality or cause the stream to be disrupted. The improved backhaul protocol (e.g., backhaul protocol 300), on the other hand, should be no worse than RTP/UDP while the congestion occurs, and should be much better than RTP/UDP once the upstream sender lowers the transmitted bitrates based on the backpressure information.

As still another example, consider a scenario where outbound (and therefore inbound) UDP is blocked entirely: (a) the UDP channel is effectively closed, due to UDP blockage at the router/firewall; (b) the TCP channel can be opened (but suffers well-known issues in the face of congestion/loss); (c) all packets are originally sent over UDP, but not acknowledged (due to being blocked); (d) all packets are subsequently sent over the TCP channel; (e) network overhead is protocol overhead, FEC overhead, and 2× retransmission overhead, with this implementation providing backpressure information upstream; and (f) CPU overhead is encryption and error recovery overhead, plus 2× retransmission overhead. In this case, RTP/UDP would not function at all, due to the UDP blockage. The improved backhaul protocol (e.g., backhaul protocol 300), however, should stream with some level of quality, and, in theory, adjust to alleviate congestion and loss. However, it may still encounter data loss if the TCP connection closes and reopens. In this scenario, the customer should be instructed to open up their outbound UDP ports to improve the situation.

As still another example, consider a so called "worst case" scenario where all UDP and TCP is blocked: (a) the UDP channel is effectively closed, due to UDP blockage at the router/firewall; (b) the TCP channel cannot be opened; (c) all packets are originally sent over UDP, but not acknowledged (due to being blocked); (d) no packets are acknowledged (and the TCP channel is not open), so all packets are retried one or more times over UDP; (e) network overhead is protocol overhead, FEC overhead, and at least 2× retransmission overhead, with this implementation providing backpressure information upstream; and (f) CPU overhead is encryption and error recovery overhead, plus at least 2× retransmission overhead. In this case, the improved backhaul protocol (e.g., backhaul protocol 300) may or may not be better than RTP/UDP. The retransmissions may result in lower packet loss, or they may overwhelm the link with redundant data. Furthermore, the overhead of the improved backhaul protocol is much higher than RTP/UDP. One potential way to deal with this is to not perform any retries until the stream originator receives one or more ACKs or NACKs from the stream receiver. This would make the overhead strictly be the protocol plus FEC overhead.

According to the general inventive concepts, the improved backhaul protocol (e.g., backhaul protocol 300) may utilize any suitable encryption scheme including, in some instances, those that have not yet been developed. In some exemplary embodiments, the encryption technology employed with the improved backhaul protocol is selected based on the general design goals outlined herein. For example, in some exemplary embodiments, the encryption scheme is selected based on the available CPU and/or memory resources of the streaming device.

For purposes of illustration, three exemplary encryption schemes are discussed: NULL, eBC-0, and eBC-x16.

The NULL encryption scheme does no encryption, but is instead defined simply as a baseline for comparison purposes.

The eBC-0 encryption scheme is an XOR-based shared key approach. The BoxCaster (i.e., stream originator) and the media server must agree on a shared key of arbitrary length (the agreement and exchange of which would typically be done outside of the improved backhaul protocol). The sender of a given packet then XORs the data with the key (duplicated as many times as necessary) to produce the encrypted data. Consider the following example:

| | |
|---|---|
| Plaintext (hex): | 1234 5678 90ab cdef beef f00d 1337 0000 |
| Key (hex, 32 bits, repeated): | 0429 fade 0429 fade 0429 fade 0429 fade |
| Encrypted text: | 161d aca6 9482 3731 bac6 0ad3 171e fade |

The plaintext can then be recovered by following the same XOR procedure:

| | |
|---|---|
| Plaintext (hex): | 161d aca6 9482 3731 bac6 0ad3 171e fade |
| Key (hex, 32 bits, repeated): | 0429 fade 0429 fade 0429 fade 0429 fade |
| Encrypted text: | 1234 5678 90ab cdef beef f00d 1337 0000 |

XOR-based encryption schemes are known to be insecure, and potentially vulnerable to frequency analysis and plaintext attacks. However, since the given key is only used for the duration of the stream, and since plaintext isn't likely to be known, the level of security provided may be sufficient in many situations. It certainly satisfies the goals of obfuscating the contents from intermediaries and validating party identities. It also satisfies the goal of encrypting the content for the "casual" customer who wishes to ensure basic privacy. It would likely be insufficient if any real or heightened guarantee of privacy was required.

The eBC-x16 encryption scheme is exactly like the eBC-0 encryption scheme, but with a key of exactly 16 bytes. This allows the implementation to be highly optimized for the embedded environment.

According to the general inventive concepts, the improved backhaul protocol (e.g., backhaul protocol 300) may utilize any suitable error correction scheme including, in some instances, those that have not yet been developed. In some exemplary embodiments, the error correction technology employed with the improved backhaul protocol is selected based on the general design goals outlined herein. For example, in some exemplary embodiments, the error correction scheme is selected based on the available CPU and/or memory resources of the streaming device.

For purposes of illustration, two exemplary Forward Error Correction (FEC) schemes are discussed: NULL and fBC-X1d.

The NULL FEC scheme does no error correction. Although its use is generally discouraged, it may be used for transporting data where correction is not important (e.g., one may consider its use for RTP Control Protocol (RTCP) data, which is not critical for stream performance).

The fBC-X1d FEC scheme is a simple 1-dimensional XOR scheme. A group of N packets are transitively XORed as they are transmitted (where shorter packets treat missing data as zero). The accumulated results are then transmitted at the end of the group. The receiver can use the accumulated data, along with the total byte count, to recover one missing packet from the group of N. As an example, consider the following group of 3 packets:

| | |
|---|---|
| Packet 1 (hex): | 1234 5678 |
| Packet 2 (hex): | feed d035 beef |
| Packet 3 (hex): | 0102 0304 0506 0708 |
| XOR accumulator (hex): | eddb 8549 bbe9 0708 |
| Total byte count: | 18 |

Now consider a scenario where the receiver receives packets 1 and 3 and the FEC information (XOR accumulator and byte count). It knows that packet 2 is missing, and that it is 6 bytes long (18-4-8=6). It can then XOR the packets it has received with the FEC data and use the first 6 bytes of the new accumulator to recover packet 2:

| | |
|---|---|
| Packet 1 (hex): | 1234 5678 |
| Packet 3 (hex): | 0102 0304 0506 0708 |
| FEC data (hex): | eddb 8549 bbe9 0708 |
| XOR accumulator (hex): | feed d035 beef 0708 |

As mentioned earlier in the document, a value of N does not need to be chosen in advance. Constraints can be placed on the selection of N to constrain both overhead and latency within reasonable bounds. For example, N may be chosen when the last packet of a multiple-packet frame is sent; this keeps the latency low, as the group is not waiting for more packets to be closed.

For purposes of further illustration, an exemplary embodiment of the improved backhaul protocol (e.g., the backhaul protocol 300) is implemented within the GStreamer open source multimedia framework, which is a library for constructing graphs of media-handling components.

Figure 4:
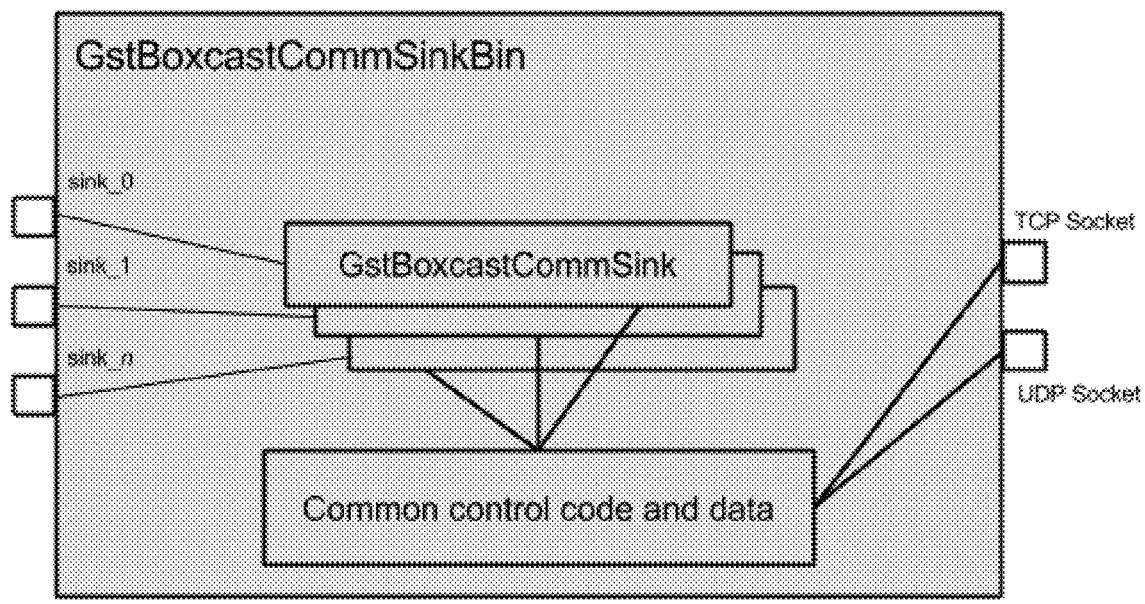
FIG. 4 is a diagram illustrating a container element in GStreamer 1.0 being used to define a stream originator, according to an exemplary embodiment, which performs the actions of packetizing, generating FEC, and encrypting via common shared code and data.

The BoxCaster (i.e., stream originator) side is implemented in GStreamer 1.0 format. It includes a bin element 400 that contains multiple sink elements (based on GstBaseSink) that performs the actions of packetizing, generating FEC, and encrypting via common shared code and data. See FIG. 4. The bin element links on-demand ghost pads to the child sink elements' sink pads.

Figure 5:
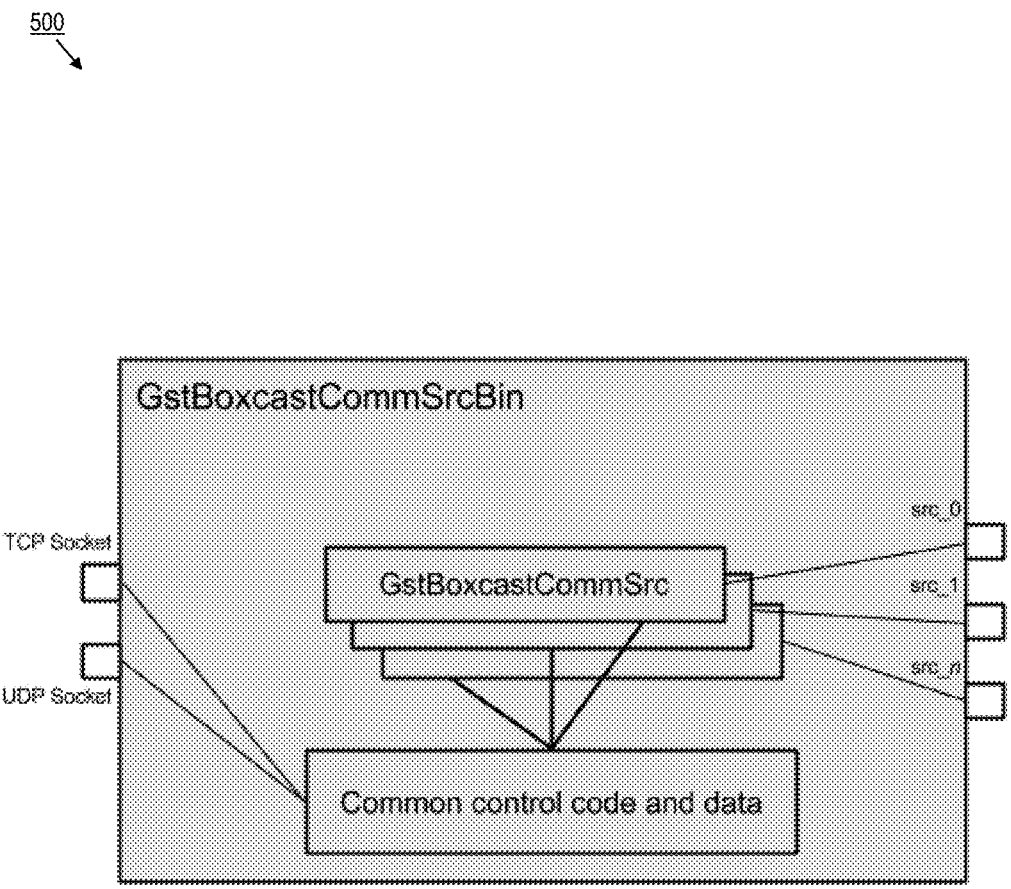
FIG. 5 is a diagram illustrating a container element in GStreamer 1.0 being used to define a stream receiver (e.g., media server), according to an exemplary embodiment, which performs the actions of decrypting, interpreting FEC, and depacketizing via common shared code and data.

The media server (i.e., stream receiver) side is also implemented in GStreamer 1.0 format. It includes a bin element 500 that contains multiple source elements (based on GstBaseSrc) that performs the actions of decrypting, interpreting FEC, and depacketizing via common shared code and data. See FIG. 5. The bin element links on-demand ghost pads to the child sources' source pads when data for new channel IDs is received.

In this illustrative exemplary embodiment, all shared code and data is implemented in C++. The GStreamer (GLib) "classes" act as basic shims that call their C++ counterparts.

For purposes of further illustration, an exemplary class design will now be described. The code is designed to share as much functionality and definition as possible between the BoxCaster (i.e., stream originator) and the media server (i.e., stream receiver) sides of the improved backhaul protocol. The code that is shared includes: (1) base TCP client functionality; (2) UDP socket functionality; (3) encryption/decryption functionality; (4) packet and header definitions; (5) protocol constants and utilities; and (6) XOR utilities.

Figure 6:
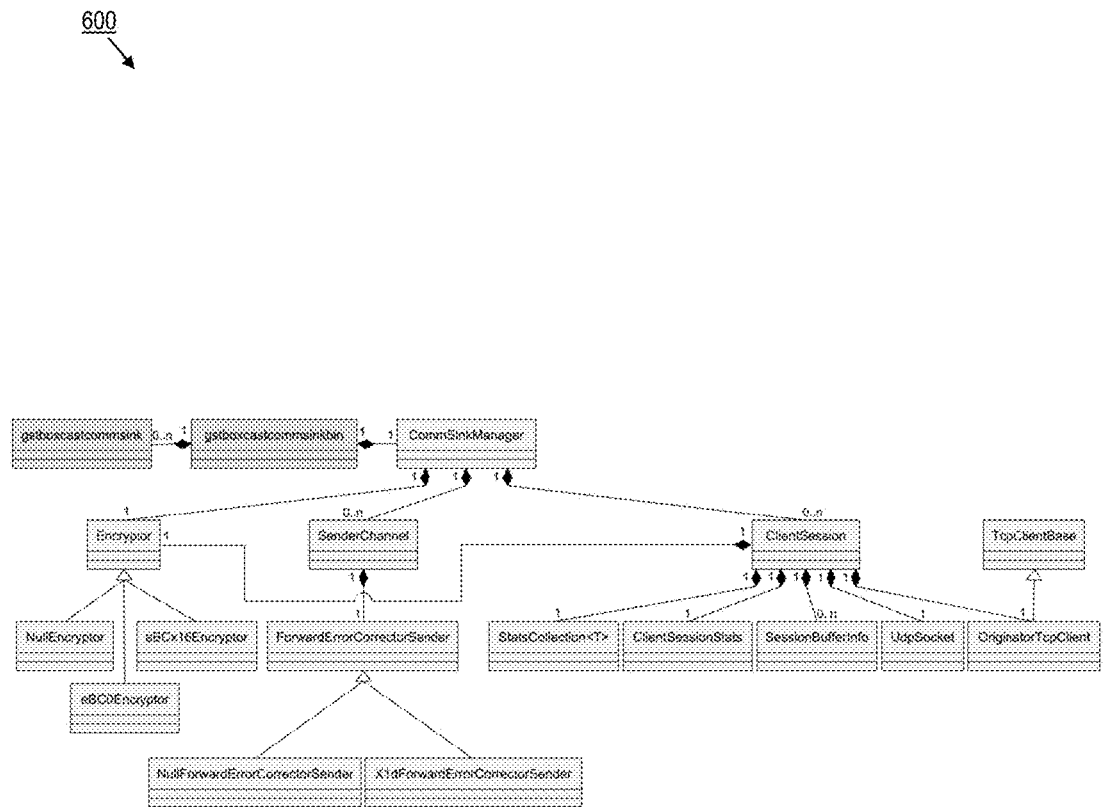
FIG. 6 is a diagram illustrating a class diagram of the stream originator side of the backhaul protocol of FIG. 3, according to an exemplary embodiment.

The diagram 600 of FIG. 6 provides an overview of the basic class diagram of the BoxCaster (i.e., stream originator) side of the protocol implementation.

The following steps describe an overview of the flow of data through the BoxCaster (i.e., stream originator) side of the protocol:

1. Buffers containing data to be sent (which is usually RTP data) arrive at one of the boxcastcommsinkbin's sink pads. Since these pads are ghosted to contained boxcastcommsink elements' sink pads, these buffers arrive at the boxcastcommsink's render function.

2. The boxcastcommsink asks the boxcastcommsinkbin to render the buffer on its behalf.

3. The boxcastcommsinkbin enqueues the buffer in the CommSinkManager.

4. The CommSinkManager's processing task takes the buffer from the queue, finds the SenderChannel context, prepares a data packet header (with the next sequence number from the SenderChannel), applies forward error correction, encrypts the packet, and asks all the ClientSessions to send it to their respective destinations.

5. Each ClientSession enqueues the packet in a queue of packets to be transmitted.

6. At the end of this processing cycle, the ClientSession asks the UDP socket to send all the packets that are waiting to be sent.

7. The ClientSession then enqueues a new SessionBufferInfo in a list of outstanding packets. This SessionBufferInfo entry contains a reference to the EncryptedPacket, as well as the first and last time the packet was sent and the number of times it has been sent.

8. At some point in the future, if the ClientSession receives an acknowledgement for the packet, it will remove the relevant SessionBufferInfo entry from the outstanding buffer list, freeing it and the EncryptedPacket.

9. If, on the other hand, the ClientSession receives a negative acknowledgement, or if it fails to receive a positive acknowledgement in time, it will retransmit the packet to the client over the TCP socket (if it is connected) or over the UDP socket (if the TCP socket is not connected).

10. If the packet is never acknowledged, the SessionBufferInfo entry will eventually be freed, along with its associated EncryptedPacket.

Figure 7:
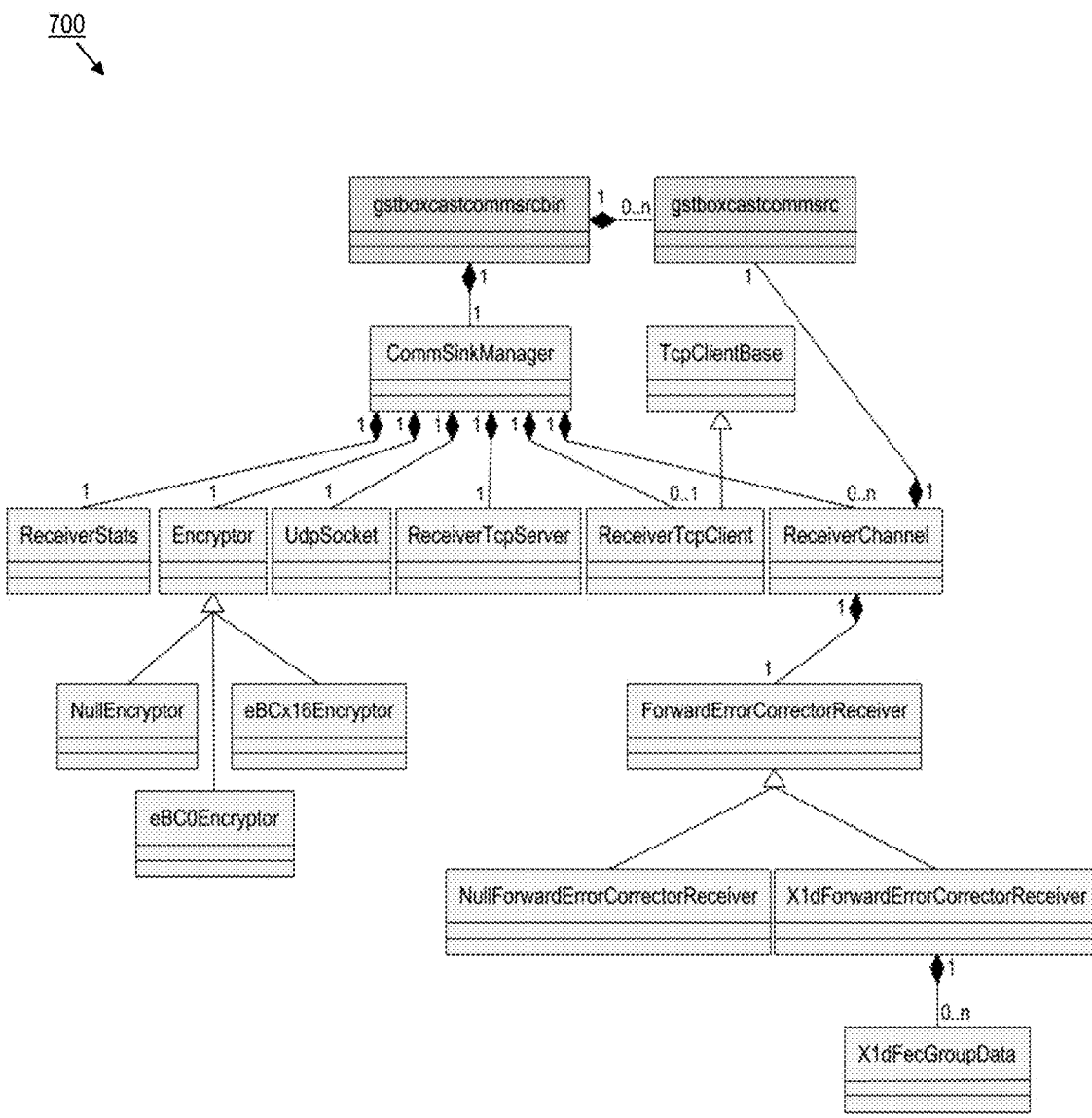
FIG. 7 is a diagram illustrating a class diagram of the stream receiver (e.g., media server) side of the backhaul protocol of FIG. 3, according to an exemplary embodiment.

The diagram 700 of FIG. 7 provides an overview of the basic class diagram of the media server (i.e., stream receiver) side of the protocol implementation.

The following steps describe an overview of the flow of data through the media server (i.e., stream receiver) side of the protocol:

1. Incoming data packets arrive on the receiver's UDP (or TCP) socket. They are received by the CommSrcManager as part of its thread's processing cycle.

2. After receiving an EncryptedPacket from a socket, the CommSrcManager decrypts the packet and applies it to the ReceiverChannel for its channel ID. It also acknowledges the packet with the sender.

3. The ReceiverChannel will apply the data packet to its ForwardErrorCorrectorReceiver, which will usually request to push a data buffer downstream.

4. The ReceiverChannel pushes the buffer to a queue in the boxcastcommsrc for the given channel, which is part of the boxcastcommsrcbin.

5. The boxcastcommsrc's push thread wakes up, takes the buffer out of the queue, and pushes it downstream.

A wire protocol may be used in the systems (and with the backhaul protocols) described herein. In an exemplary wire protocol, all numbers are sent in little-endian format for ease of use on the existing BoxCaster (i.e., stream originator), which is ARM little-endian.

According to the wire protocol, the encryption packet has the following format:

| Byte | Bit 0 | 8 | 16 | 24 | 31 |
|---|---|---|---|---|---|
| 0 | Magic Key (0xbc) | Proto Version (0) | Packet Type (0xe) | Encryption Method | Encryption Header Length (bytes) |
| 4 | Encrypted Data Length (bytes) | | Padding | | |
| 8 | Encryption Method-Specific Header Data | | | | |
| 8+E | Encrypted Data | | | | | wherein:

Magic Key (8 bits): 0xbc indicates this packet belongs to this protocol.
Proto Version (4 bits): 0 indicates the version of the protocol.
Packet Type (4 bits): 0xe indicates this type of packet.
Encryption Method (1 byte): indicates the type of encryption, from among:
 NULL: 0;
 eBC-0: 1; and
 eBC-x16: 2.
Encryption Header Length in bytes (1 byte): The specified encryption method may add its own header content of arbitrary length. This field specifies the length in bytes of the following encryption method-specific data.
Encryption Method-Specific Header Data: This data is specific to (and interpreted by) the specified encryption method.
Encrypted Data Length (2 bytes): The length in bytes of the following encrypted data.
Encrypted Data: The actual encrypted data.

Contained in the encrypted payload of an encryption packet may be a data packet, an FEC packet, an ACK packet, or a NACK packet.

A data packet has the following format:

| Byte | Bit 0 | 8 | 16 | 24 | 31 |
|---|---|---|---|---|---|
| 0 | Magic Key (0xbc) | Proto Version (0) | Packet Type (0xd) | Channel ID | Sequence Number (low) |
| 4 | Sequence Number (high) | FEC Scheme | FEC Header Length | Data Length (low) | |
| 8 | Data Length (high) | Padding | | | |
| 12 | FEC Header Data | | | | |
| 12+F | Data | | | | | wherein:

Magic Key (8 bits): 0xbc indicates this packet belongs to this protocol.
Proto Version (4 bits): 0 indicates the version of the protocol.
Packet Type (4 bits): 0xd indicates this type of packet.
Channel ID (1 byte): Since multiple sources of data will be multiplexed together, the ID identifies a channel for demuxing.
Sequence number (2 bytes): A monotonically increasing sequence number for the given channel, used (together with the channel ID) for subsequent packet identification.
FEC scheme (1 byte): indicates the type of forward error correction, from among:
 NULL: 0; and
 fBC-X1d: 1.
FEC Header Length in bytes (1 byte): The specified FEC scheme may add its own header content of arbitrary length. This field specifies the length in bytes of the following FEC scheme-specific data.
FEC Header Data: This data is specific to (and interpreted by) the specified FEC scheme.
Data Length (2 bytes): The length in bytes of the following data.
Data: The actual data payload.

The fBC-X1d FEC scheme defines the following header data format:

Group ID (2 bytes): Identifies the FEC group to which the data belongs.
Index (1 byte): The zero-based index of this packet within the group.
Padding (1 byte): To round the header data size to a word boundary.

An FEC packet has the following format:

| Byte | Bit 0 | 8 | 16 | 24 | 31 |
|---|---|---|---|---|---|
| 0 | Magic Key (0xbc) | Proto Version (0) | Packet Type (0xf) | Channel ID | Sequence Number (low) |
| 4 | Sequence Number (high) | FEC Scheme | FEC Data Length | | |
| 8 | FEC Data | | | | | wherein:

Magic Key (8 bits): 0xbc indicates this packet belongs to this protocol.
Proto Version (4 bits): 0 indicates the version of the protocol.
Packet Type (4 bits): 0xf indicates this type of packet.
Channel ID (1 byte): Since multiple sources of data will be multiplexed together, the ID identifies a channel for demuxing.
Sequence number (2 bytes): A monotonically increasing sequence number for the given channel, used (together with the channel ID) for subsequent packet identification.
FEC scheme (1 byte): indicates the type of forward error correction, from among:
 NULL: 0; and
 fBC-X1d: 1.
FEC Data Length in bytes (2 bytes): The length in bytes of the FEC scheme-specific data that follows.
FEC Data: This data is specific to (and interpreted by) the specified FEC scheme.

The fBC-X1d FEC scheme defines the following data format:

Group ID (2 bytes): Identifies the FEC group to which the data belongs.

Packet count (1 byte): Identifies the number of packets of the FEC group. A group may contain no more than 255 packets.

Byte count (4 bytes): The total length in bytes of all the data in the FEC group. A group may contain no more than 65,535 bytes. The group length allows the length of a single missing packet to be determined.

Padding (1 byte): To round the data size to a word boundary.

An ACK packet has the following format:

| Byte | Bit 0 | 8 | 16 | 24 | 31 |
|---|---|---|---|---|---|
| 0 | Magic Key (0xbc) | Proto Version (0) | Packet Type (0xa) | ACKed Channel ID | Padding |
| 4 | ACKed Sequence Number | | Lost Packets | | | wherein:

Magic Key (8 bits): 0xbc indicates this packet belongs to this protocol.

Proto Version (4 bits): 0 indicates the version of the protocol.

Packet Type (4 bits): 0xa indicates this type of packet.

ACKed Channel ID (1 byte): The channel ID for the packet being positively acknowledged.

ACKed Sequence Number (2 bytes): The sequence number for the packet being positively acknowledged.

Lost Packets (2 bytes): The running count of the total number of packets that have been lost on this channel.

A NACK packet has the following format:

| Byte | Bit 0 | 8 | 16 | 24 | 31 |
|---|---|---|---|---|---|
| 0 | Magic Key (0xbc) | Proto Version (0) | Packet Type (0xa) | NACKed Channel ID | Padding |
| 4 | NACKed Sequence Number | | Lost Packets | | | wherein:

Magic Key (8 bits): 0xbc indicates this packet belongs to this protocol.

Proto Version (4 bits): 0 indicates the version of the protocol.

Packet Type (4 bits): 0xa indicates this type of packet.

NACKed Channel ID (1 byte): The channel ID for the packet being negatively acknowledged.

NACKed Sequence Number (2 bytes): The sequence number for the packet being negatively acknowledged.

Lost Packets (2 bytes): The running count of the total number of packets that have been lost on this channel.

Figure 8:
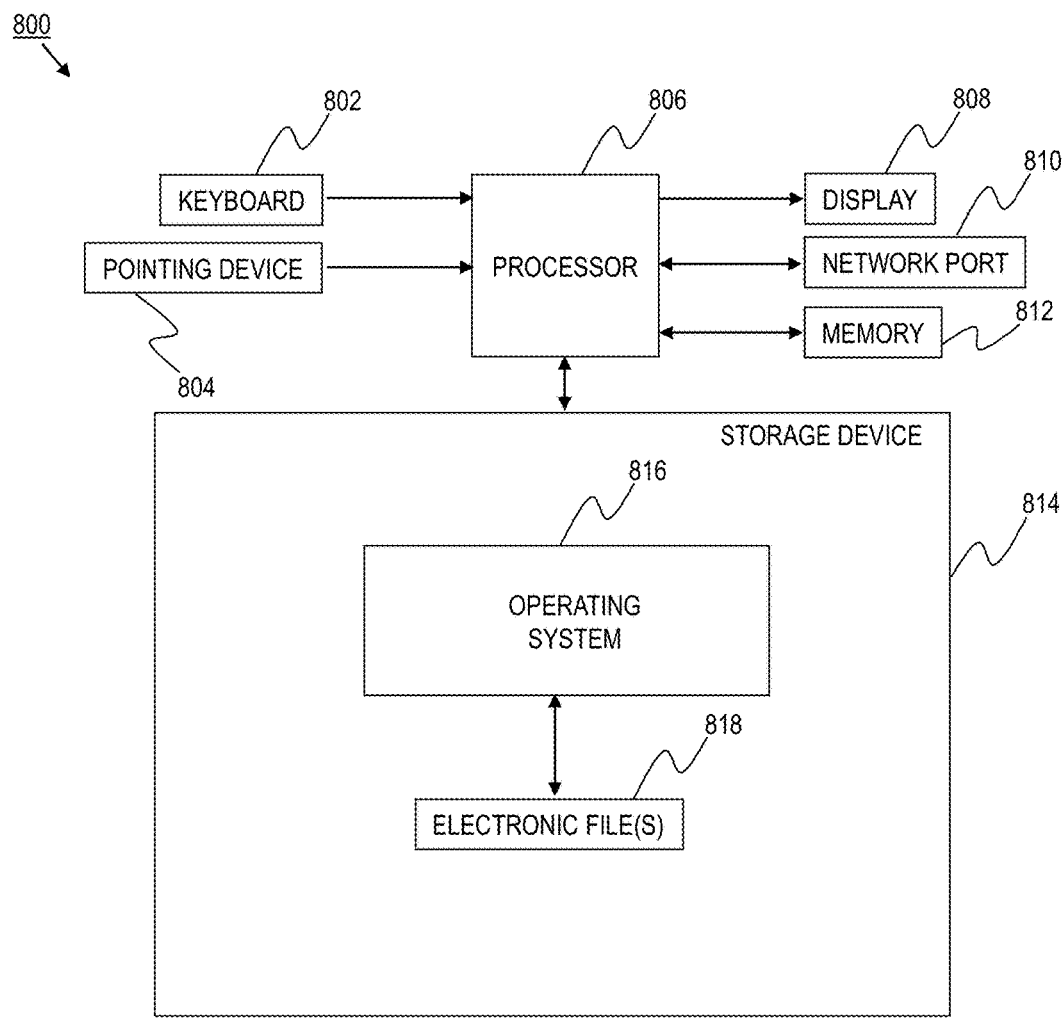
FIG. 8 is a diagram of a computer for use in an autonomous broadcasting system and/or for implementing an autonomous broadcasting method, according to one exemplary embodiment.

In accordance with the general inventive concepts, disclosed herein are exemplary embodiments of systems and methods for scheduling broadcasting of video and/or audio data, wherein the systems and methods employ the improved backhaul protocol described above. FIG. 8 shows a computer 800 (e.g., a general purpose desktop or laptop computer) for use in a video broadcasting system and/or a video broadcasting method, according to one exemplary embodiment.

The computer 800 includes a processing means, such a CPU 806, and memory, such as RAM 812, for use by the processing means. The computer 800 also includes input means, such as a keyboard 802 and a mouse 804, and output means, such as a monitor 808. The monitor can be, for example, an LCD or CRT display. The output means can include any device or mechanism for outputting signals generated by the computer 800. For example, the output means could include speakers (not shown) for outputting audio.

The computer includes a permanent and/or semi-permanent storage means, such as a hard disk drive 814. The hard disk drive 814 can be used to store software applications, such as an operating system 816, and/or data in the form of electronic files 818. The computer 800 further includes a networking means, such as a network port or adapter 810. The network adapter 810 can be, for example, an Ethernet adapter. The network adapter 810 allows the computer 800 to be connected to and communicate over a network, such as the Internet. The network adapter 810 can support, for example, wired or wireless communication over the network.

Various modifications could be made to the computer 800 without departing from the spirit and scope of the general inventive concepts. The computer 800 can be configured and used as a client and/or a server computer.

Figure 9:
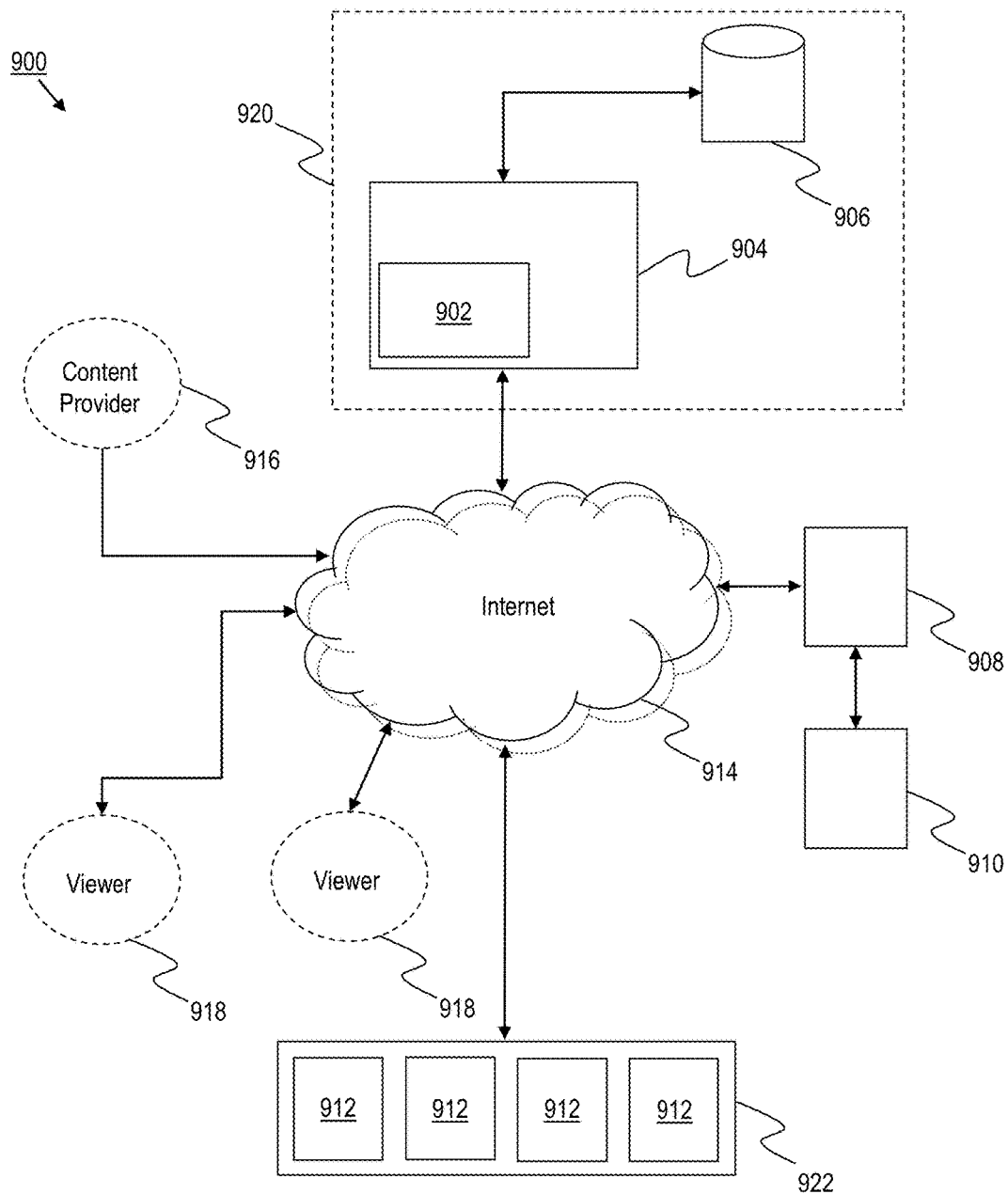
FIG. 9 is a diagram of an autonomous broadcasting system, according to one exemplary embodiment.

As shown in FIG. 9, an autonomous broadcasting system 900, according to one exemplary embodiment, includes scheduling software 902 installed on a server computer 904. The server computer 904 can be a general purpose computer, such as computer 800. The server computer 904 is in data communication with a data store 906. In one exemplary embodiment, the data store 906 is installed in the server computer 904.

The autonomous broadcasting system 900 also includes a broadcasting node or device 908, a video acquisition device 910, and a plurality of media servers 912. In one exemplary embodiment, a content delivery network (CDN) may be used. Additionally, the autonomous broadcasting system 900 includes a network, such as a wide area network (WAN) or the Internet 914, over which the server computer 904 with the scheduling software 902, the broadcasting device 908, and the media servers 912 can communicate.

In one exemplary embodiment, the broadcasting device 908 utilizes a processor system such as a Leopardboard 365 (hereinafter, the "Leopardboard"), provided by Leopardboard.org of Fremont, Calif., and as described in the Leopardboard 365 Hardware Guide (Rev. 1.0—dated Feb. 24, 2010), the entire disclosure of which is hereby incorporated by reference in its entirety. The Leopardboard is a processor system designed to provide a feature rich and economical solution based on Texas Instruments' Digital Media (DM) DM365 processor. This processor is dedicated, specialized hardware designed to support the acquisition, encoding, compression, etc. of video and audio data. Since the Leopardboard does not use a digital signal processor (DSP), the DM365 processor is used for video and audio encoding. The Leopardboard supports a wide range of peripherals and, thus, provides a useful tool for digital media and storage applications The Leopardboard has a generally low power consumption level. The Leopardboard includes an internal memory controller supporting a wide range of memories including DDR2/MDDR/SDRAM/NOR & NAND FLASH. The Leopardboard has a built-in Multimedia Card/Secure Digital (MMC/SD) controller which could be used to provide an instant add on storage for personal collections. The Leopardboard includes an expansion port and/or other connectors that provide an interface to other cards, devices, peripherals and the like. The Leopardboard also includes a universal serial bus (USB) port that provides a wide variety of peripheral connectivity.

Many other processor systems may be used in accordance with the teachings herein. A minimum configuration for the broadcasting device 908 processor system includes a processor (e.g., the DM365 processor and/or some other processor optimized for video and audio compression), a memory, a bus interface circuit permitting the processor to communicate with the various servers described herein via the Internet, and a bus interface circuit permitting the processor to accept video and audio from the video acquisition device 910. Additionally, the processor system can include a bus interface circuit permitting the processor to communicate with a power controller associated with the video acquisition device 910.

The use of such a processor system (e.g., the Leopardboard) in the broadcasting device, as contemplated by the general inventive concepts, provides many advantages over the use of a general purpose computer (e.g., the computer 800). For example, the processor system can have a much smaller footprint than the computer. In one exemplary embodiment, the processor system is enclosed in a housing measuring less than 5 inches by 5 inches by 2 inches, e.g., approximately 4.5 inches by 4.5 inches by 1.5 inches. This allows the broadcasting device to be deployed in manners and locations that would otherwise not be possible. Furthermore, a manufacturing cost of the processor system is much lower than a manufacturing cost of the general purpose computer. Further still, the reliability of the processor system will, on average, exceed that of the general purpose computer because, for example, because the processor system, unlike the computer, typically uses no moving parts (e.g., fans, disk drives). Furthermore, the processor system on average has a much lower power consumption than the general purpose computer. In one exemplary embodiment, the broadcasting device including the processor system consumes less than 5 W of power during normal operation. In addition to providing a cost savings in the form of energy savings, this low power consumption results in the generation of less heat, which further increases the reliability of the processor system relative to the computer. Yet further still, the processor system is less likely to be exposed to intentional or incidental manipulation of its data stream than the computer. In particular, because general purpose computers are designed to interact with users, they typically interface with input devices (e.g., keyboard 802, pointing device 804). These input devices conceivably allow a user to directly or indirectly affect the data stream. Conversely, because the process system is design to work without any direct user interaction therewith and, thus, includes no interfaced input devices, users are unable to affect its data stream.

In one exemplary embodiment, the video acquisition device 910 is a digital camera capable of capturing audio and video data. The video acquisition device 910 interfaces with the broadcasting device 908 to transfer data acquired by the video acquisition device 910 to the broadcasting device 908. In one exemplary embodiment, a USB cable is used to connect the video acquisition device 910 and the broadcasting device 908 so that the data can be transferred from the video acquisition device 910 to the broadcasting device 908.

In one exemplary embodiment, the media servers 912 are general purpose computers, such as computer 100. In one exemplary embodiment, the media servers 912 are implemented as a dynamically scalable server cloud that provides the necessary server functionality. In this manner, the capital expenditure associated with the purchasing and maintaining the media servers 912 can be avoided, as the autonomous broadcasting system merely rents usage of the media servers 912 from a third-party provider of a cloud computing service (e.g., Amazon EC2) and/or a cloud storage service (e.g., Amazon S3).

Figure 10:
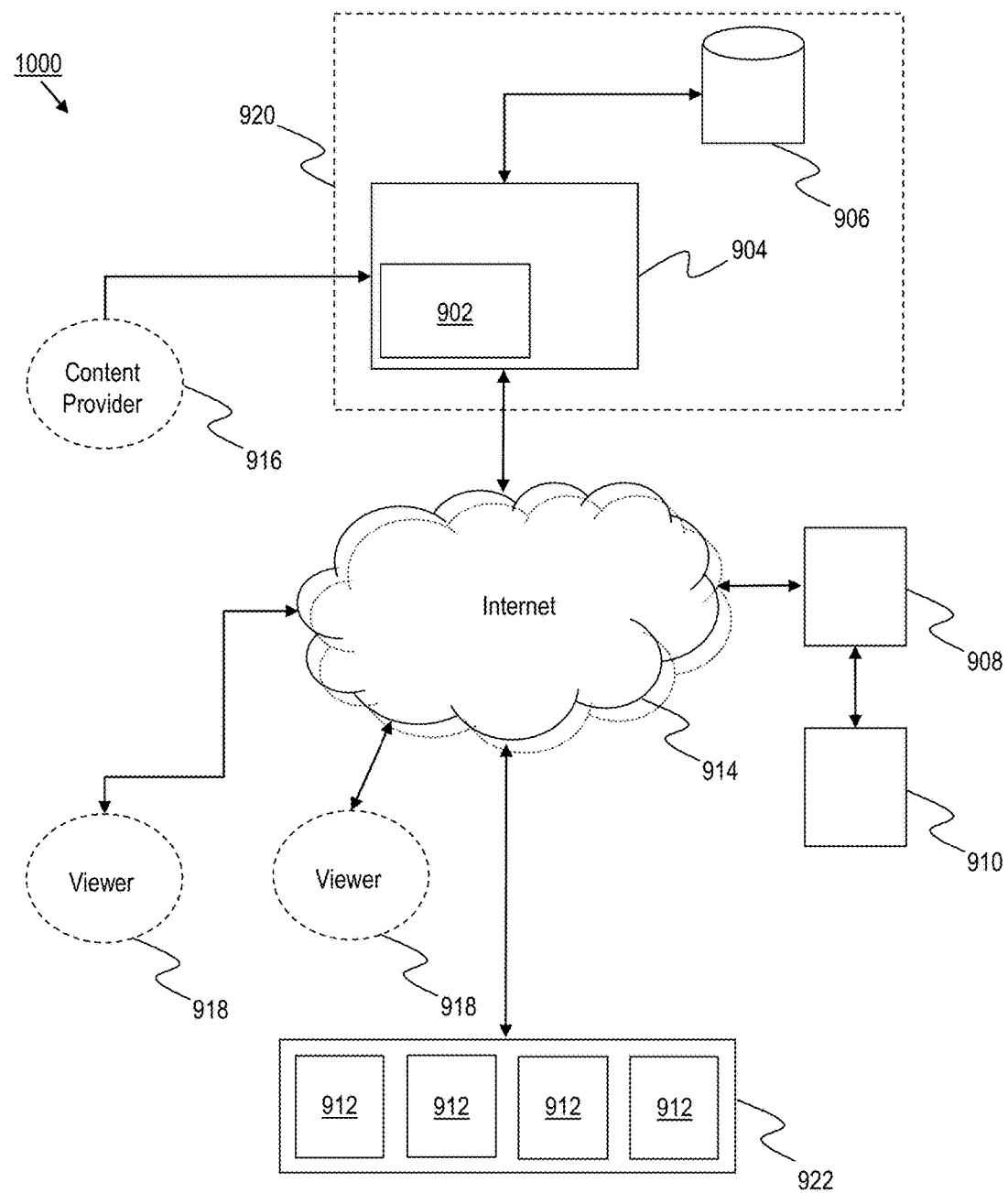
FIG. 10 is a diagram of an autonomous broadcasting system, according to one exemplary embodiment.

The autonomous broadcasting system 900 simplifies the task of broadcasting a secure live or pre-recorded video stream over the Internet. A content provider 916 using the autonomous broadcasting system 900 may securely broadcast live video by installing the broadcasting device 908 and subsequently scheduling events via the scheduling software 902 implemented as a scheduler website on the server computer 904. In the autonomous broadcasting system 900, the content provider 916 is remote from the scheduling software 902 and, thus, accesses the scheduling software 902 over the Internet 914. However, in an autonomous broadcasting system 1000, according to an alternative exemplary embodiment, as shown in FIG. 10, the content provider 916 is at the same physical location as the scheduling software 902 (i.e., the server computer 904). Accordingly, in the autonomous broadcasting system 1000, the content provider 916 can directly access the scheduling software 902, for example, by using an input device (not shown) of the server computer 904.

Figure 11:
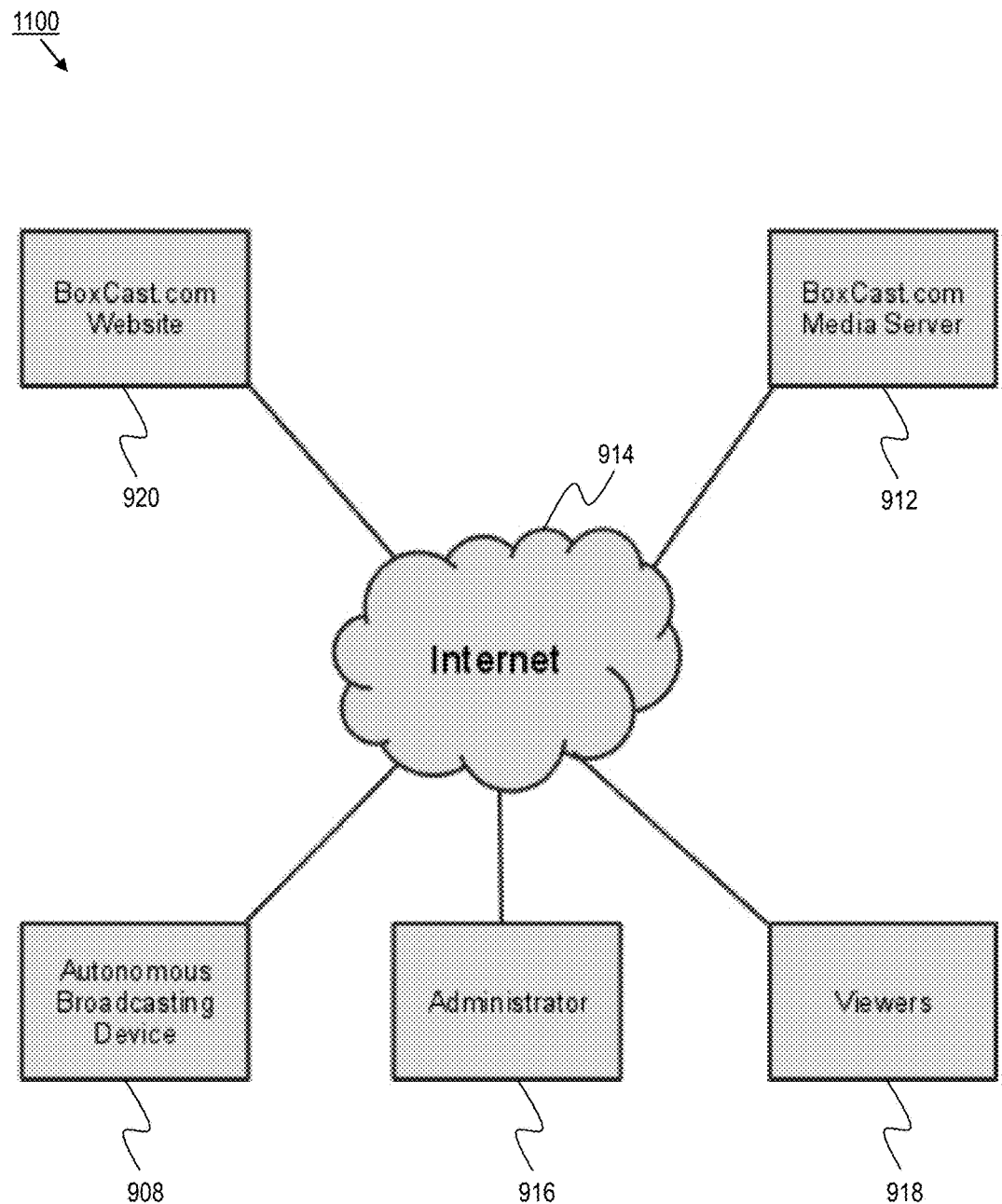
FIG. 11 is a diagram of an autonomous broadcasting system, according to one exemplary embodiment.
Figure 12:
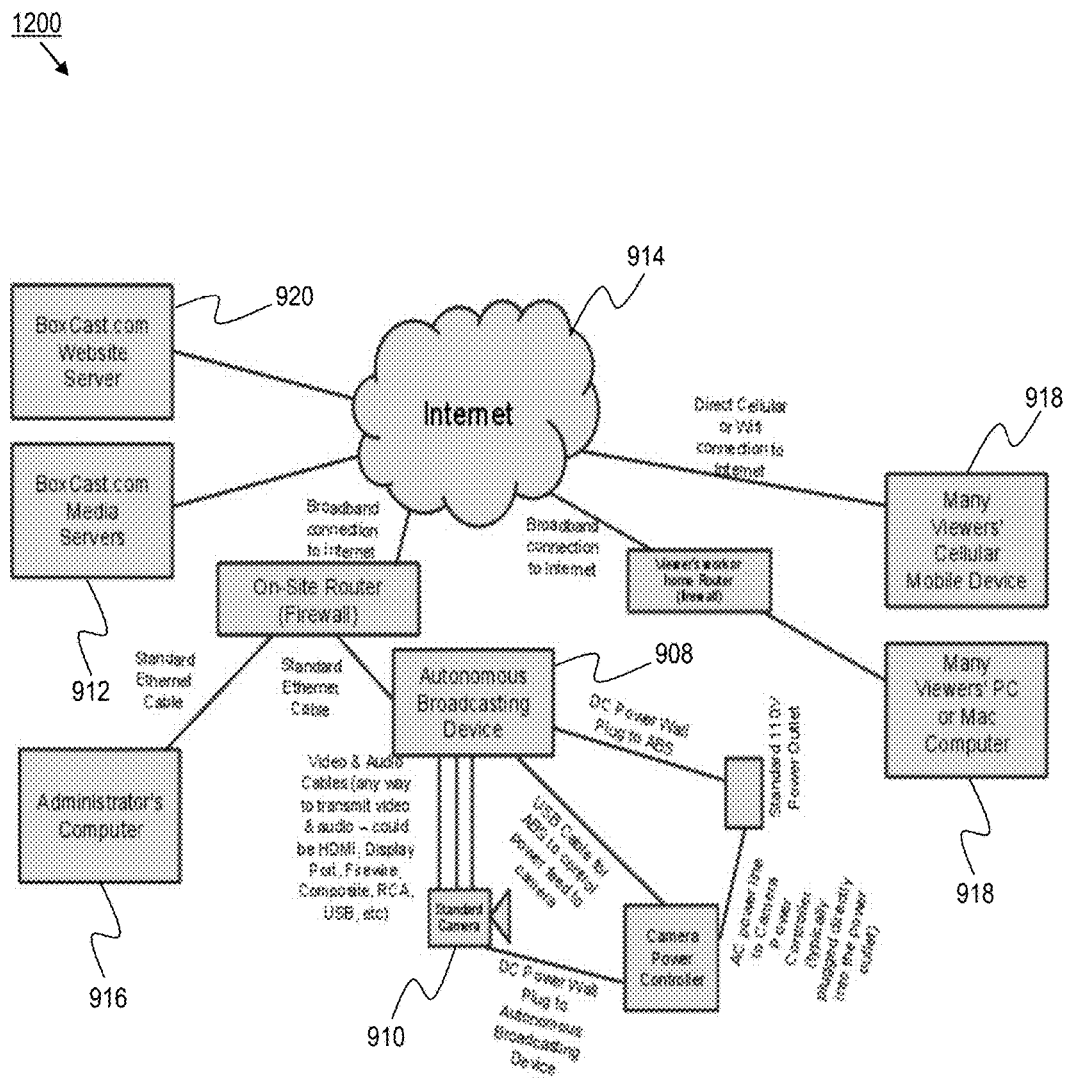
FIG. 12 is a diagram of an autonomous broadcasting system, according to one exemplary embodiment.
Figure 13:
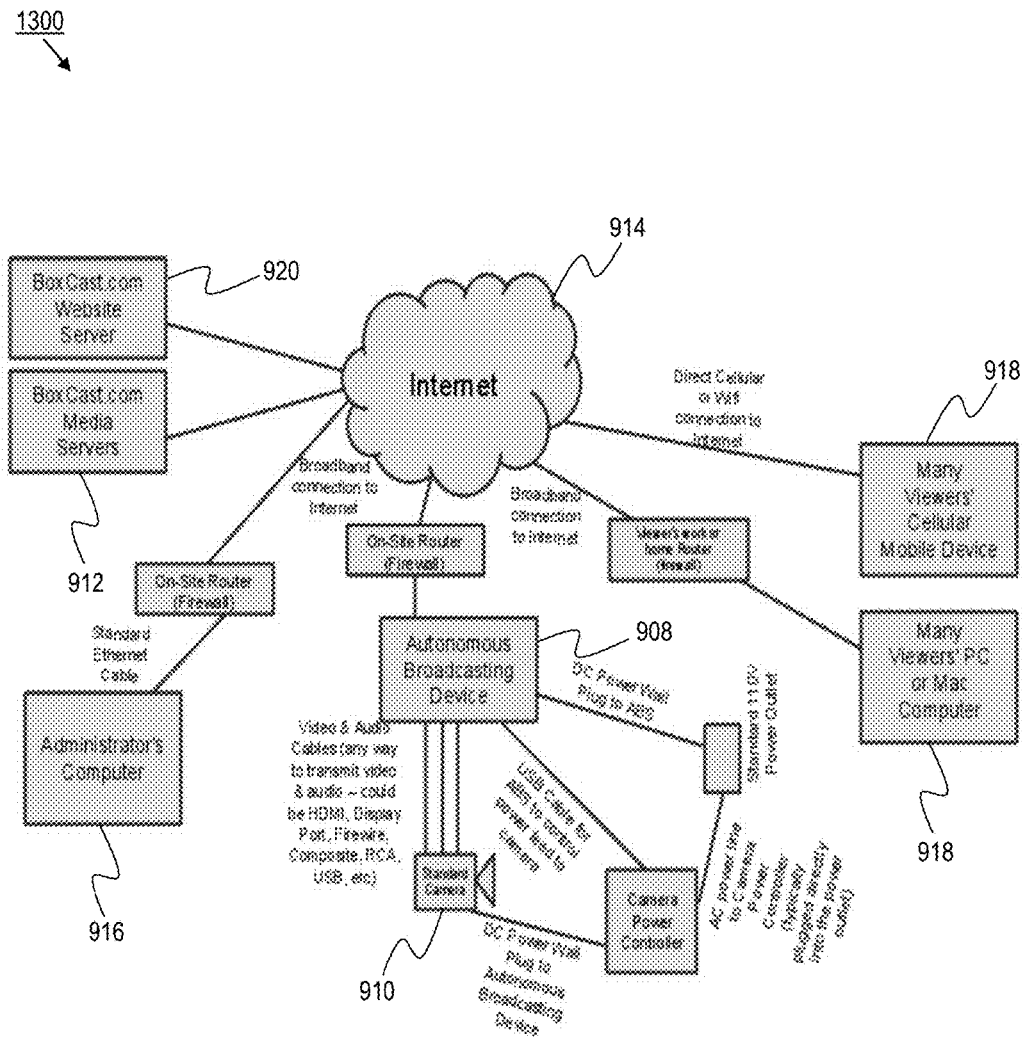
FIG. 13 is a diagram of an autonomous broadcasting system, according to one exemplary embodiment.
Figure 14:
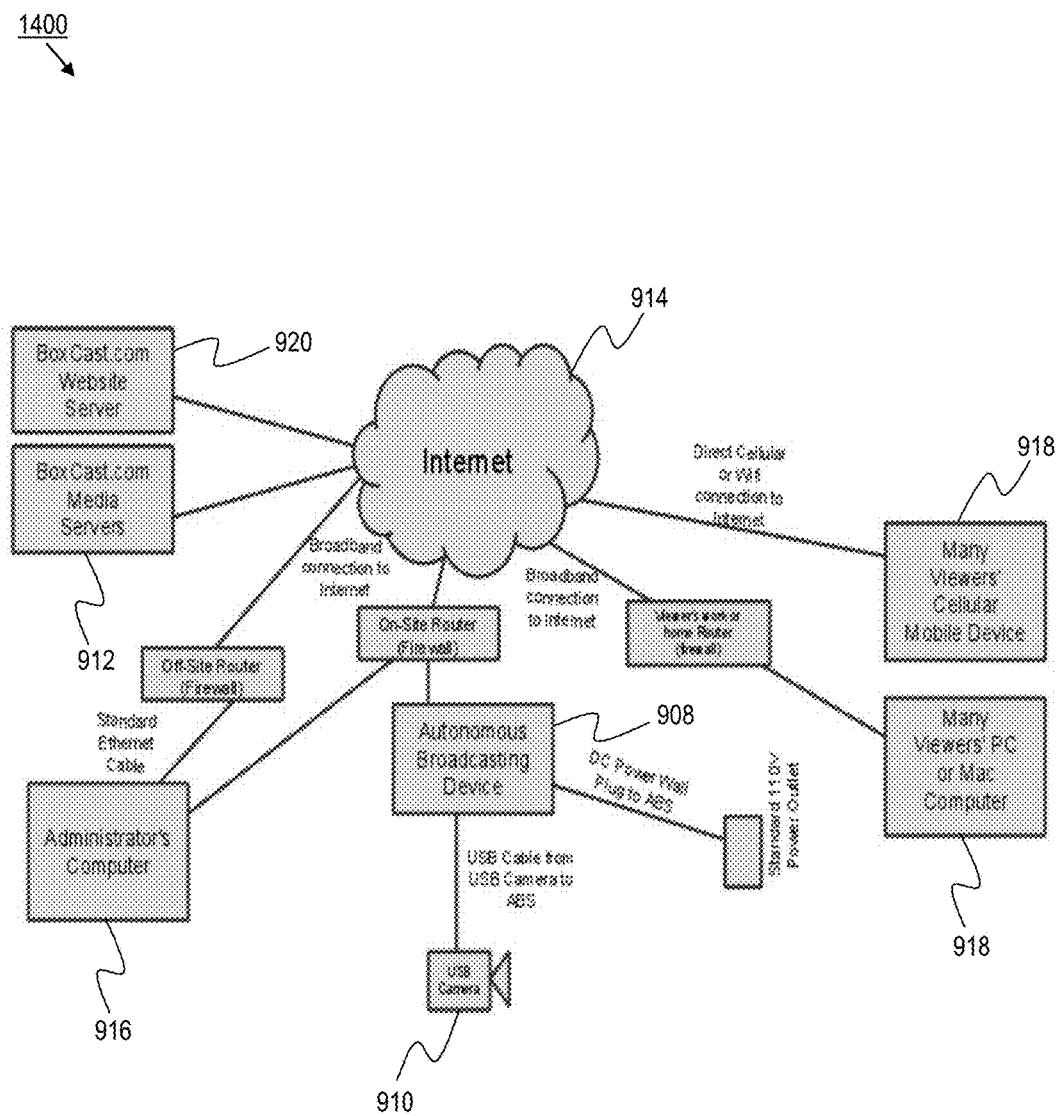
FIG. 14 is a diagram of an autonomous broadcasting system, according to one exemplary embodiment.

To further illustrate the general inventive concepts, autonomous broadcasting systems, according to other exemplary embodiments, are shown in FIGS. 11-14. FIG. 11 shows an autonomous broadcasting system 1100, according to one exemplary embodiment. FIG. 12 shows an autonomous broadcasting system 1200, according to one exemplary embodiment. FIG. 13 shows an autonomous broadcasting system 1300, according to one exemplary embodiment. FIG. 14 shows an autonomous broadcasting system 1400, according to one exemplary embodiment.

At the time that an event is scheduled to begin, the broadcasting device 908 automatically powers on any other required hardware (i.e., the video acquisition device 910) and begins encoding and publishing (i.e., uploading) a secure live video stream to the media servers 912. The media servers 912, as streaming servers, make this live video stream available to as many viewers 918 as possible by dynamically growing resources as the number of viewers 918 increases. This all happens automatically via the scheduling logic 920 as explained herein with no configuration or interaction required by the content provider 916 beyond the initial scheduling of the event. In one exemplary embodiment, the broadcasting system 900 supports the establishment of business rules to impose bandwidth growth "limits." For example, the broadcasting system 900 can set (or have as a default) a sensible limit on new accounts, say no more than 5,000 viewers allowed for the account unless and until its account status is upgraded.

Additionally, the scheduling logic 920 is responsible for directing a request from a viewer 918 to a specific media server 912 and monitoring loads of individual media servers 912. Based on these factors, the scheduling logic 920 dynamically allocates resources using the cloud computing service.

During the broadcast of the live video stream, the media servers 912, as streaming servers, may also record the broadcast onto the media servers 912, as storage servers. The recorded broadcast can then be accessed on-demand by the viewers 918 within any limits established by the content provider 916. Since the live broadcast data being uploaded essentially in real-time may be a lower quality than desired, as a result of upload bandwidth restrictions on the connection between the broadcasting device 908 and the Internet 914, the broadcasting device 908 may also record a higher quality (e.g., any one or any two or more of the following:

higher video resolution, lower video compression loss; increased audio quality, larger size, and/or increased frame rate) version of the broadcast than uploaded in real-time, which it then uploads to the media servers 912, as storage servers, at some time after completion of the broadcast. Additionally, since a local copy of the video data stored on the broadcasting device 908 may be a lower quality than desired, as a result of insufficient processing power, storage limits, etc., the local copy of the video data could be used to create the higher quality (e.g., any one or any two or more of the following: higher video resolution, lower video compression loss; increased audio quality, larger size, and/or increased frame rate) version of the broadcast than uploaded in real-time, which is uploaded to the media servers 912, as storage servers, at some time after completion of the broadcast.

In the autonomous broadcasting system 900, the server computer 904 with the scheduling software 902, as well as any associated data store 906, form scheduling logic 920. A single scheduling logic 920 acts as the central hub for all the activity of the autonomous broadcasting system 900. The scheduling logic 920 houses the primary database (e.g., data store 906) of events and related information. Content providers 916 interact with the scheduling logic 920 to manage and configure events. Broadcasting devices 908 interact with the scheduling logic 920 to coordinate with the event schedule and find out where video streams should be directed.

The media servers 912 can be provided as part of a media server cloud 922. The media server cloud 922 is completely monitored and managed by the scheduling logic 920 which may acquire new instances, change configuration on instances, or release instances as needed. The viewers 918 must gain access to live or pre-recorded broadcasts through the scheduling logic 920.

The primary responsibilities of the scheduling logic 920 are to: (1) maintain the schedule of events by providing a user-interface that allows content providers 916 to manage their respective events; (2) manage the scaling of the media server cloud 922 by acquiring and releasing server instances as the needs of the system 900 change; (3) manage access of the broadcasting device 908 to the media servers 912; and (4) manage access by the viewers 918 to the secure video streams. Other responsibilities of the scheduling logic 920 may include any one or any two or more of the following: accepting a payment (e.g., by a credit card, a debit card, a PayPal account) from a viewer on behalf of a content provider for video the content provider has made available for purchase; initiating mailing of video in the form of a DVD directly from a DVD printing and fulfillment house to a viewer; coordinating and/or enforcing video sharing rules between viewers; and providing an API that allows other websites to access the scheduling logic. Additionally, any one or any two or more of these other responsibilities could be implemented via separate logic.

Figure 15:
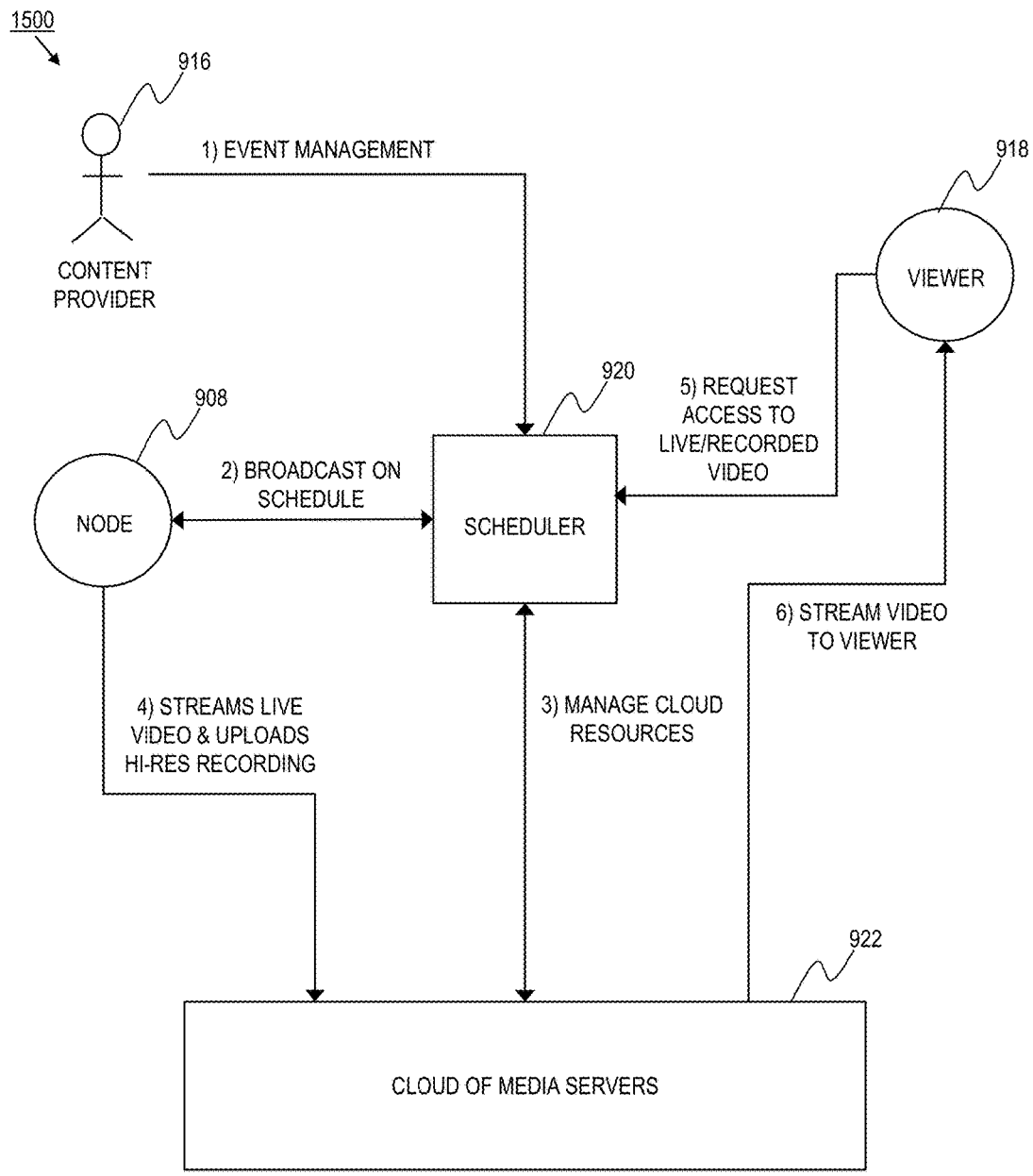
FIG. 15 is a diagram of an autonomous broadcasting system, according to one exemplary embodiment.

Accordingly, as shown in FIG. 15, the scheduling logic 920 includes four access points labeled as data flows or connections 1, 2, 3, and 5. A first access point (connection 1) is a website (and web-service API) for content providers 916 to manage their respective events. A second access point (connection 2) is a web-service API for broadcasting devices 908 to coordinate with the event schedule and open up channels for broadcasting. A third access point (connection 3) is a protocol for managing the media servers 912 and monitoring their usage. A fourth access point (connection 5) is a web interface for viewers 918 to request access to live or pre-recorded video streams.

In the autonomous broadcasting system 900, each broadcasting device 908 is an embedded device which can capture a video feed from a local source (e.g., a digital camera), encode that feed and stream it to media servers 912 provided by the media server cloud 922. The broadcasting device 908 interacts with the scheduling logic 920 in order to synchronize its event schedule, coordinate a live broadcast and later to upload a higher quality (e.g., any one or any two or more of the following: higher video resolution, lower video compression loss; increased audio quality, larger size, and/or increased frame rate) version of captured video to the media server cloud 922.

The primary responsibilities of the broadcasting devices 908 are to: (1) capture and encode a video feed for a scheduled event; (2) publish its video stream to a designated streaming server; and (3) manage any hardware that is needed for capturing the local video feed. Other responsibilities of the broadcasting devices 908 may include any one or any two or more of the following: automatically registering itself with the scheduling logic 920, uploading an improved quality (e.g., any one or any two or more of the following: higher video resolution, lower video compression loss; increased audio quality, larger size, and/or increased frame rate) version of the video data to the media server cloud 922; and providing a preview of the video at the broadcasting device 908, for example, using an external display (e.g., monitor) connected via a video output (e.g., VGA connector) of the broadcasting device 908 or using a display (e.g., LCD screen) integrated with the broadcasting device. Additionally, any one or any two or more of these other responsibilities could be implemented using a separate device.

The media server cloud 922 includes at least two types of resources: (1) streaming servers and (2) storage servers. A streaming server is able to stream a live or pre-recorded video to a viewer 918 from a broadcasting device's live stream, from another streaming server, or from a storage server. Instances of the media servers 912 can be dynamically created, deleted and configured at the discretion of the scheduling logic 920. The streaming servers are acquired as discrete server instances from a third-party cloud computing service (e.g., Amazon EC2). The storage servers are acquired as discrete data buckets from a third-party cloud storage service (e.g., Amazon S3).

The primary responsibilities of the media server cloud 922 are to: (1) make the video streams from the broadcasting devices 908 available to many individual viewers 918 on various types of viewing devices (e.g., televisions, personal computers, cell phones); (2) maintain secure access to live and pre-recorded video streams; (3) record live broadcasts onto a storage server; and (4) facilitate the uploading of higher quality (e.g., any one or any two or more of the following: higher video resolution, lower video compression loss; increased audio quality, larger size, and/or increased frame rate) broadcast recordings from the broadcasting devices 908 to storage servers. Other responsibilities of the media server cloud 922 may include any one or any two or more of the following: running initialization and shutdown scripts, running channel configuration and deletion scripts for each live broadcast, logging usage statistics (e.g., number of open viewer sessions, bandwidth usage, viewer IP addresses) back to the scheduling logic 920, and enforcing single-token security for preventing a ticketed viewer from opening two or more simultaneous views of the event. Additionally, any one or any two or more of these other responsibilities could be implemented separately.

The streaming servers are configured to serve five primary functions: (1) receive an originating stream from a broadcasting device 908 for recording and re-streaming (Origin); (2) relay a stream from one streaming server to another (Relay); (3) send a stream to an end-client for viewing (Edge); (4) send a recorded stream file from a storage server to an end-client for viewing as video-on-demand (VOD); and (5) receive a high-quality (e.g., any one or any two or more of the following: higher video resolution, lower video compression loss; increased audio quality, larger size, and/or increased frame rate) recording from a broadcasting device 908 and store it on a storage server (e.g., via a trickle upload process). Other responsibilities of the streaming servers may include any one or any two or more of the following: logging viewer usage information with the scheduling logic such as how long each viewer watched the video (e.g., for billing purposes), the IP address for each viewer (e.g., for geographical analysis of viewer base), and how much raw video data was used (e.g., for accounting purposes), converting the video, splicing and cropping the video, and filtering and excerpting the video (e.g., based on features of interest such as motion, facial recognition). Additionally, any one or any two or more of these other responsibilities could be implemented separately.

The storage servers have a single primary function, which is to maintain recorded stream-files for later viewing on-demand by viewers 918. Other responsibilities of the storage servers may include any one or any two or more of the following: performing authentication prior to granting access to stored video files, logging access to stored video files, providing an interface for managing stored video files (e.g., uploading, downloading, making available to third parties such as DVD manufacturers). Additionally, any one or any two or more of these other responsibilities could be implemented separately.

The interactions between the content provider 916 and the scheduling logic 920 are depicted in FIG. 15 as data flow or connection 1, labeled "event management." This is the primary interaction that the content provider 916 has with the scheduling logic 920.

In one exemplary embodiment, the content provider 916 manages events through a website interface. The website interface allows the content provider 916 to securely log in to the website associated with the scheduling logic 920 and see a list of broadcasting devices 908 belonging to or otherwise associated with the content provider 916, as well as any past, current, or future events that are scheduled to broadcast from those devices. Each event is defined by the broadcasting device 908 it streams from, a name assigned to it by the content provider 916, a start date/time, and the duration of the broadcast (or an end date/time). Each event also has parameters for the licensing type that will be used for the content.

When a content provider 916 receives a new broadcasting device 908, the content provider 916 must register that broadcasting device 908 before broadcasting from it. The registration process is designed to be extremely simple. The content provider 916 is assumed to already have an account on the website implemented by the scheduling logic 920. This account may have been setup at the time that the broadcasting device 908 hardware was purchased.

Figure 16A:
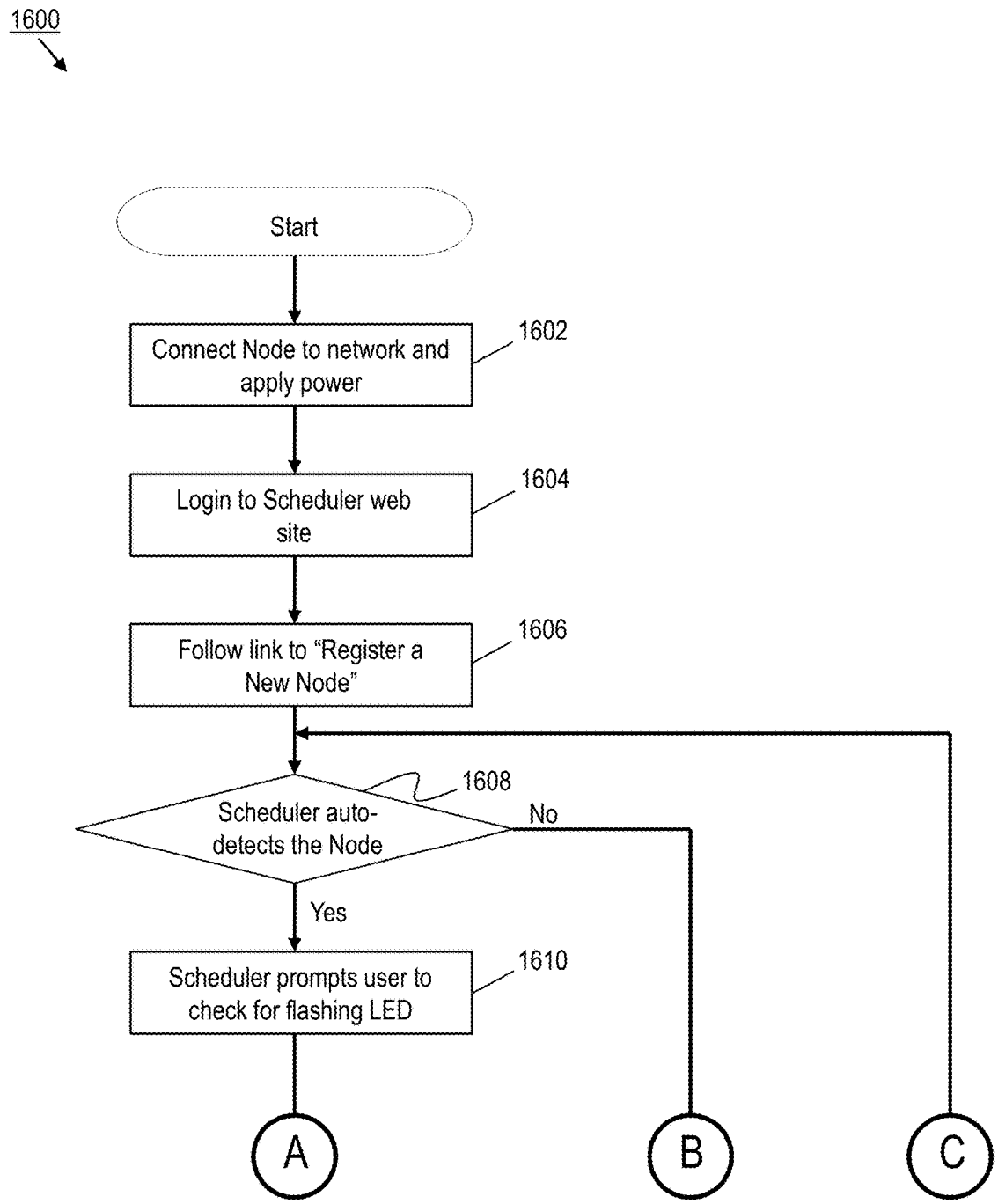
FIGS. 16A and 16B form a flow chart directed to a registration process, according to one exemplary embodiment, for registering a broadcasting device within an autonomous broadcasting system.
Figure 16B:
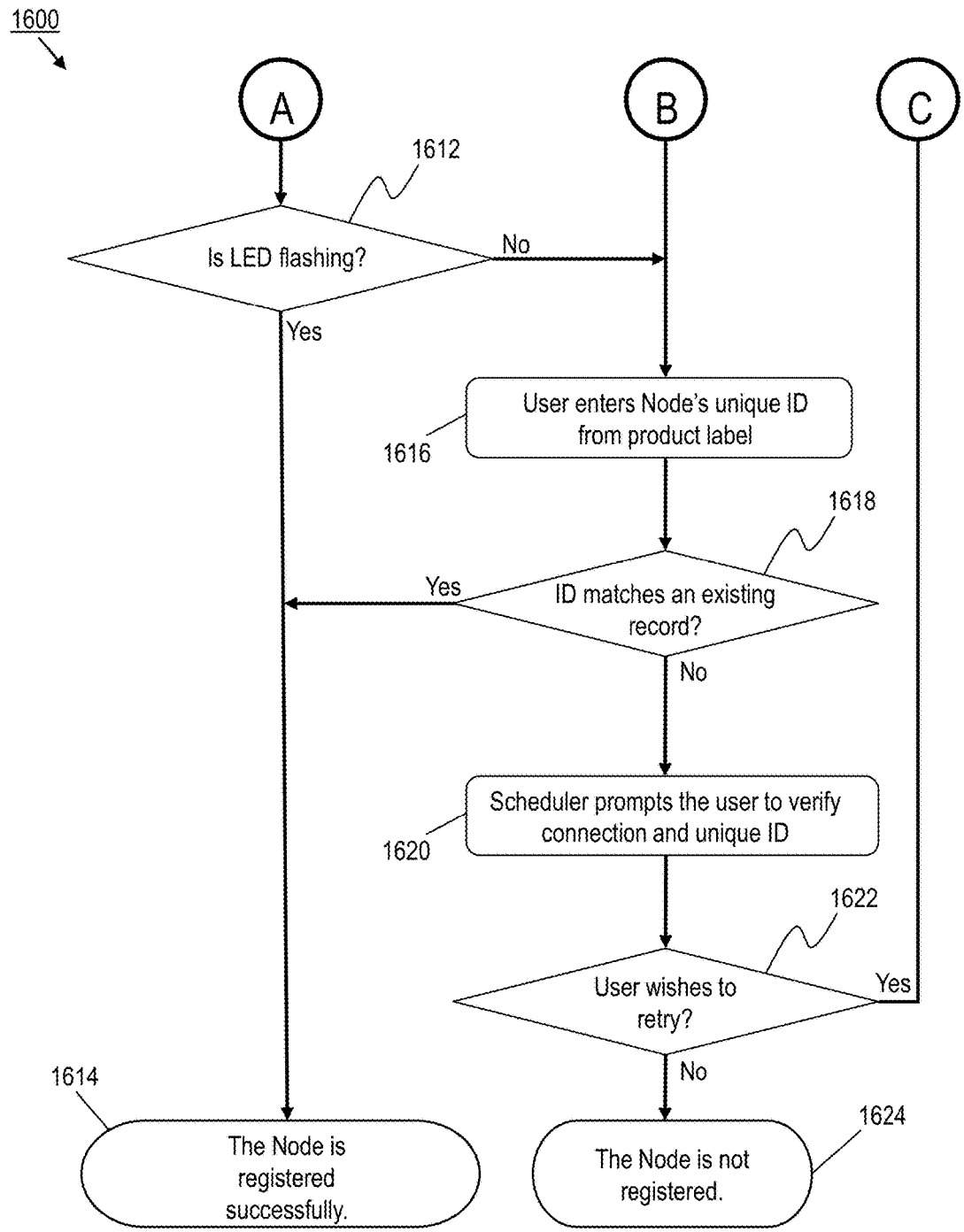

From the perspective of the content provider 916, a registration process 1600 for registering the new broadcasting device 908, according to one exemplary embodiment, is shown in FIGS. 16A and 16B.

In step 1602, the broadcasting device 908 is connected to the network 914. For example, the broadcasting device 908 is plugged into an active Internet connection using an Ethernet port on the broadcasting device 908 via a physical link such as a cable. As another example, the broadcasting device 908 is brought into range of an open wireless network, e.g., a WiFi connection, if the broadcasting device 908 supports WiFi. If the wireless network includes security preventing a ready connection (e.g., a WEP code), the broadcasting device 908 can be commissioned using the physical link to the Internet and, after registration, the security wireless network code(s) (e.g., a router WEP code) can be transmitted to the broadcasting device 908 via the physical link, after which the broadcasting device 908 can be disconnected from the physical link and connected to the Internet via the wireless network. Also in step 1602, power is applied to the broadcasting device, for example, by plugging in a power cord of the broadcasting device 908.

In step 1604, the content provider 916 uses a computer (e.g., computer 800) to navigate to the website of the scheduling logic 920. Then, the content provider 916 logs into his account.

In step 1606, the content provider 916 is provided with an indication (e.g., via a pop-up message or a flash message) on the website indicating that an unregistered broadcasting device from a recognized WAN IP address has been detected. In particular, in step 1608, the scheduling logic 920 determines if it is able to auto-detect the broadcasting device 908.

If the scheduling logic 920 is able to auto-detect the broadcasting device 908, the website will prompt the content provider 916, in step 1610, to check whether a light (e.g., LED) on a case of the broadcasting device 908 is flashing. The broadcasting device 908 can have any number of status indicators including visual status indicators (e.g., LEDs) and/or audio status indicators (e.g., speakers). These status indicators can be used to provide a visual and/or audible indication of various conditions relating to the broadcasting device 908 and/or the system in which it is deployed. In one exemplary embodiment, the visual status indicators include one or more of a power indicator, a network connection indicator, an online indicator (which indicates, for example, that the broadcasting device 908 can reach the scheduler website), a WiFi indicator, and a battery charge level indicator.

The broadcasting device 908 can also have means or structure for facilitating control of all or part of the streaming operation. For example, the broadcasting device 908 can include means for allowing an on-site operator to start, pause, and resume the streaming operation at their own discretion. The means can include any structure supporting input from the operator, such as a button, switch, or the like. In one exemplary embodiment, an administrator can toggle this functionality on and off.

In step 1612, the content provider determines if the light is flashing. If the content provider 916 sees the flashing light, he selects YES to confirm the flashing light and the broadcasting device 908 is successfully registered in step 1614. The registration process 1600 then ends (i.e., the remaining steps are skipped).

If the content provider 916 does not see the flashing light, he selects NO to indicate the light is not flashing. In response to the content provider 916 indicating that the light is not flashing (or the scheduling logic 920 being unable to auto-detect the broadcasting device 908 in step 1608), the scheduling logic 920 prompts the content provider 916 to manually register the broadcasting device 908. Manual registration requires that the content provider 916 find an identifier on the bottom of the case of the broadcasting device 908 and enter it via the website. This identifier can be any numeric data, alphanumeric data, or other code that uniquely identifies the broadcasting device. In one exemplary embodiment, the identifier is or is based on the die ID of the processor of the broadcasting device 908. In one exemplary embodiment, the identifier is one of a plurality of non-consecutive serial numbers. In one exemplary embodiment, at least a portion of the identifier is randomly generated. After the content provider 916 finds the identifier on the case, he enters it via the website in step 1616.

The identifier must be entered by the content provider 916 so that the scheduling logic 920 knows which broadcasting device 908 is being registered, since the scheduling logic 920 was unable to auto-detect the broadcasting device 908. The scheduling logic 920 maintains records (e.g., a list) of unregistered broadcasting devices 908 from a commissioning process, as described below. In step 1618, the scheduling logic 920 compares the identifier input by the content provider 916 to a record including data previously associated with the particular broadcasting device 918. In one exemplary embodiment, the record is created by the manufacturer interfacing with the website of the scheduling logic 920 after the broadcasting device is manufactured. The comparison in step 1618 insures that only expected broadcasting devices are registered with the scheduling logic 920, thereby reducing if not eliminating the possibility that unauthorized broadcasting devices will be introduced into the system. Thus, the unique identifier allows the scheduling logic 920 to identify the broadcasting device 908.

As described below, the unique identifier is also used in communications with the scheduling logic 920 by the broadcasting device 908 to communicate its identity, which is authenticated using the shared credentials that were established during the commissioning process.

If the scheduling logic 920 is able to find a record with data matching the identifier of the broadcasting device 908, then the broadcasting device 908 is successfully registered in step 1614. The registration process 1600 then ends (i.e., the remaining steps are skipped).

If the scheduling logic 920 does not find a record with data matching the identifier input by the content provider 916, the scheduling logic 920 prompts the content provider 916, in step 1620, to double-check that the broadcasting device 908 has power, the broadcasting device 908 is properly connected to the Internet, and the content provider 916 entered the identifier correctly.

If the content provider 916 finds one of these problems, he corrects it and clicks "Retry," in step 1622, which causes the registration process 1600 to return to the auto-detection stage (i.e., step 1608). Alternatively, if the content provider 916 does not find one of these problems or otherwise wishes to abort the registration process 1600, he can choose to not select "Retry," in step 1622. Thereafter, the broadcasting device 908 remains unregistered in step 1624. The content provider 916 can then elect to call a provided support number for further troubleshooting or assistance.

The registration process 1600 for registering a broadcasting device 908, as shown in FIGS. 16A and 16B, can also be viewed from the perspective of the broadcasting device 908. As noted above, the registration process 1600 is a process by which the broadcasting device 908 becomes associated with a particular content provider 916.

Figure 17A:
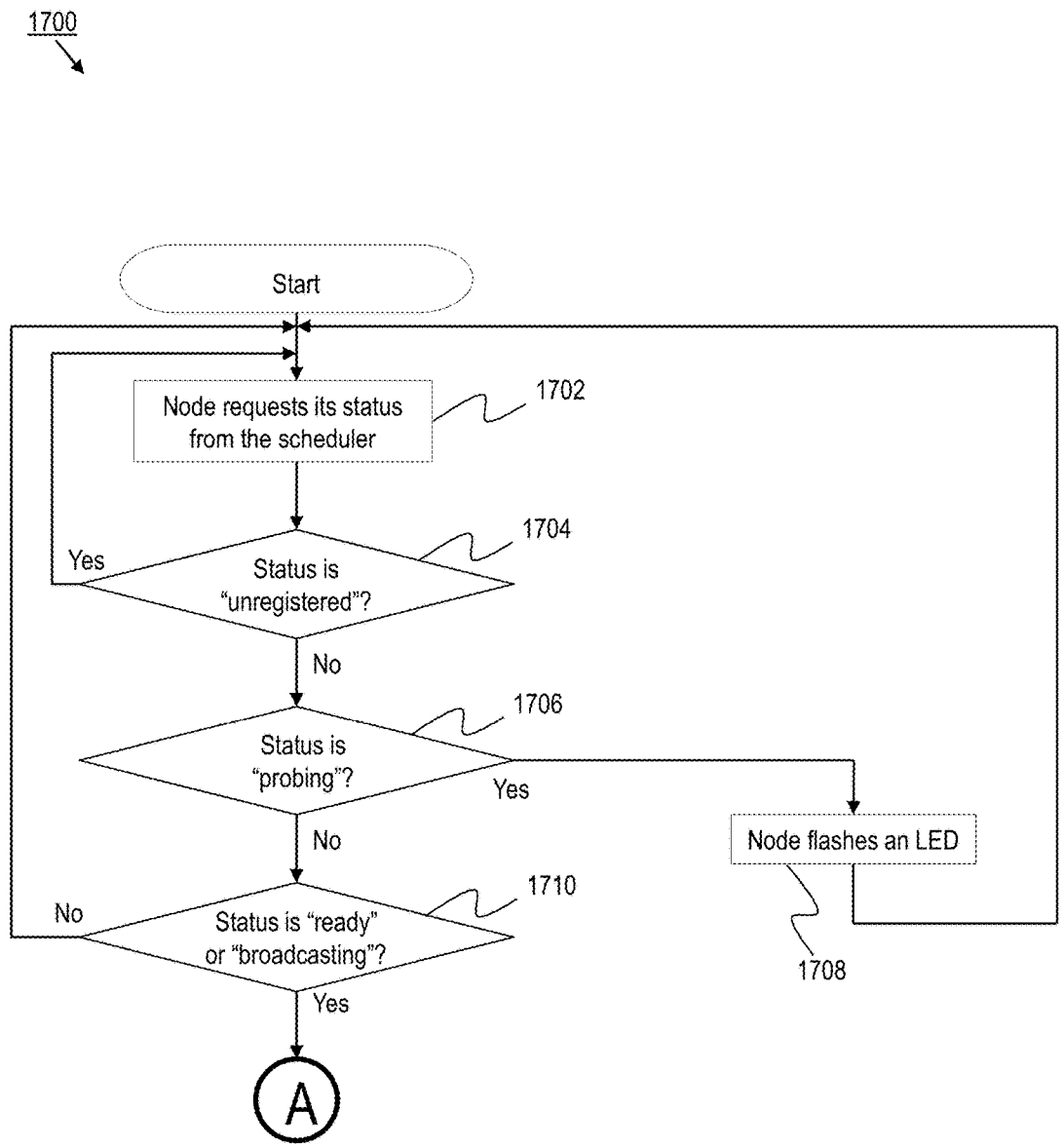
FIGS. 17A and 17B form a flow chart directed to a combined process of registering a broadcasting device and performing post-registration processing (e.g., broadcasting) using the broadcasting device, according to one exemplary embodiment.
Figure 17B:
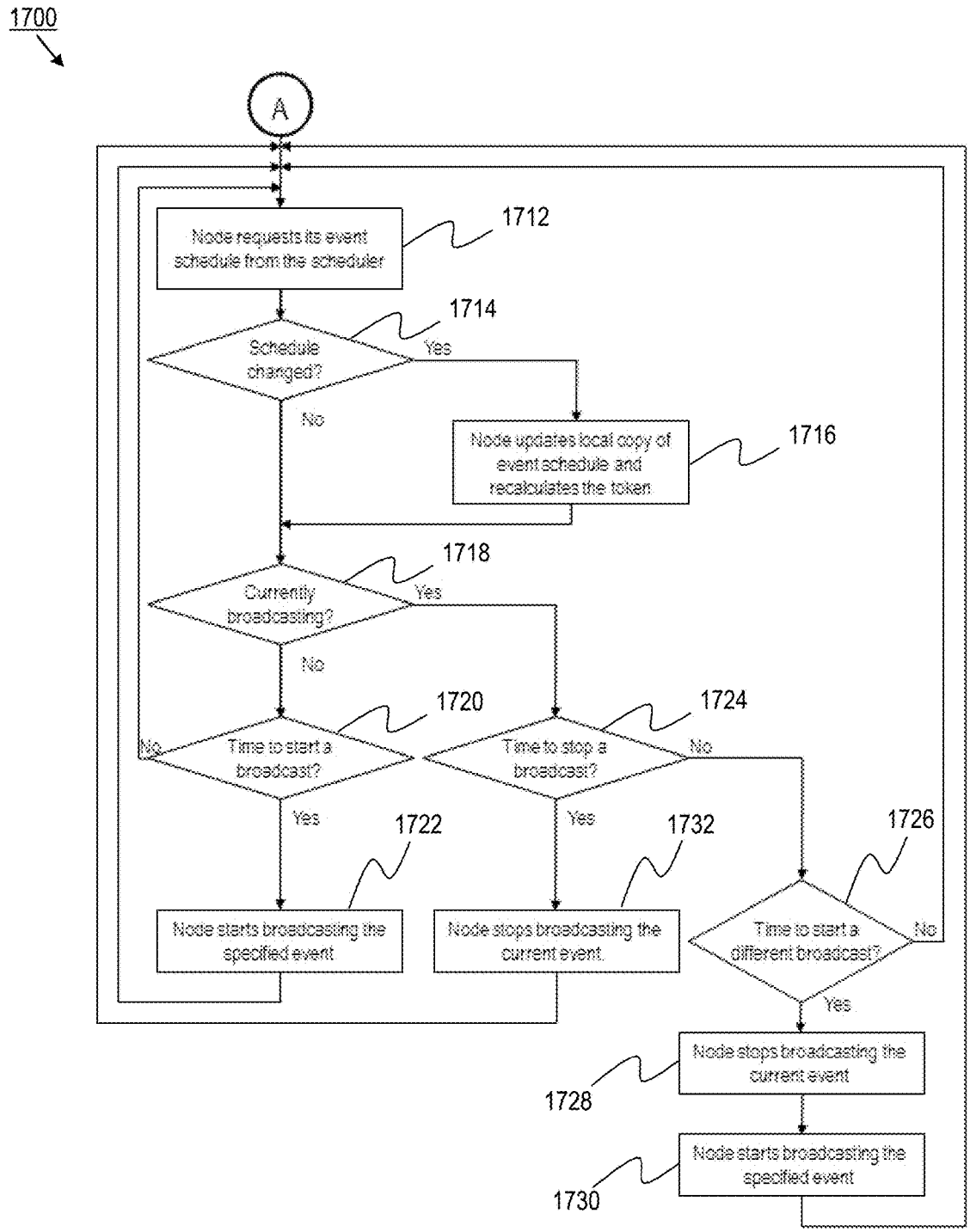
Figure 18A:
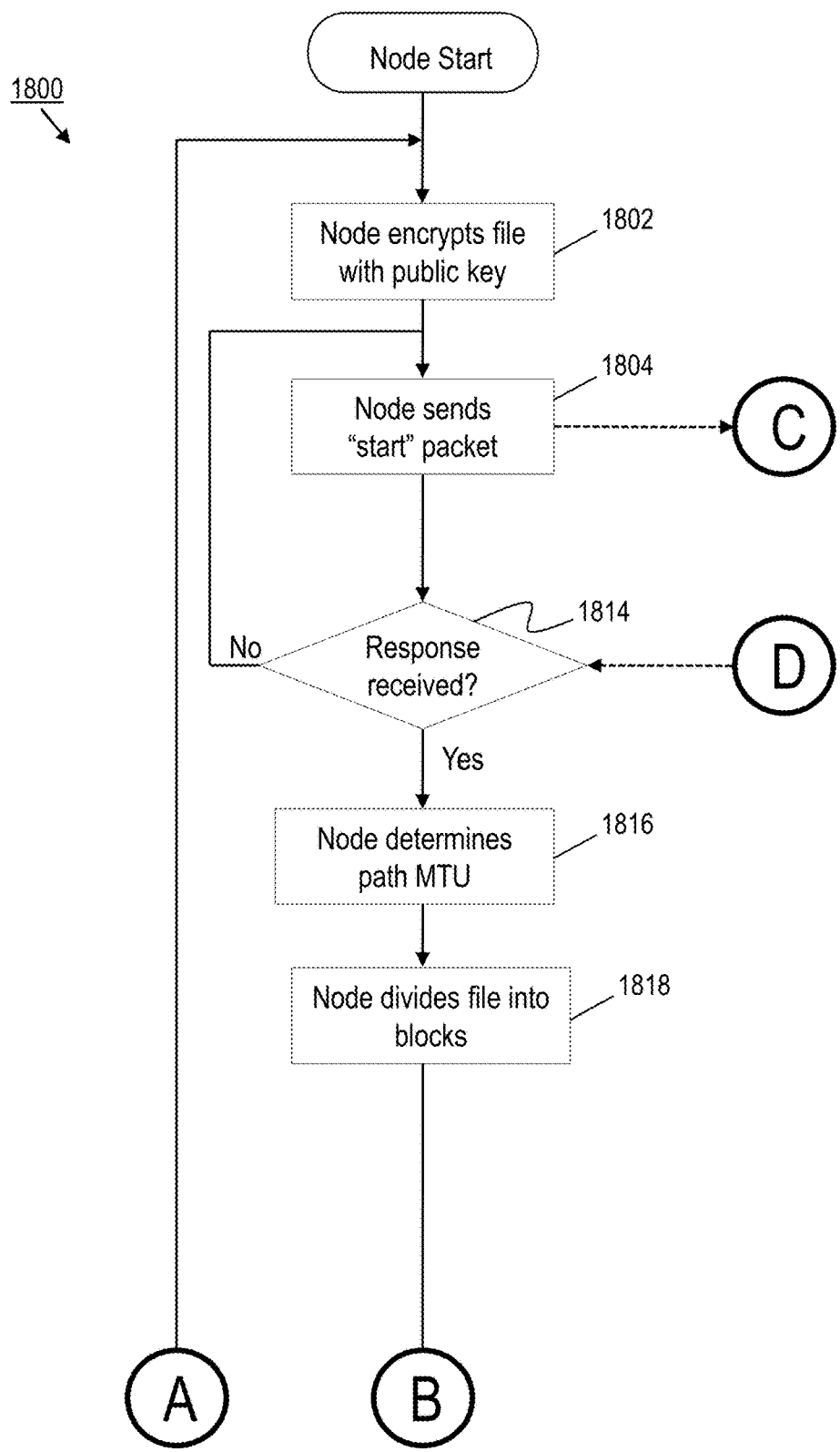
FIGS. 18A, 18B, 18C, 18D, 18E, and 18F form a flow chart directed to an upload process, according to one exemplary embodiment, for uploading higher quality data from a broadcasting device to a media server.
Figure 18B:
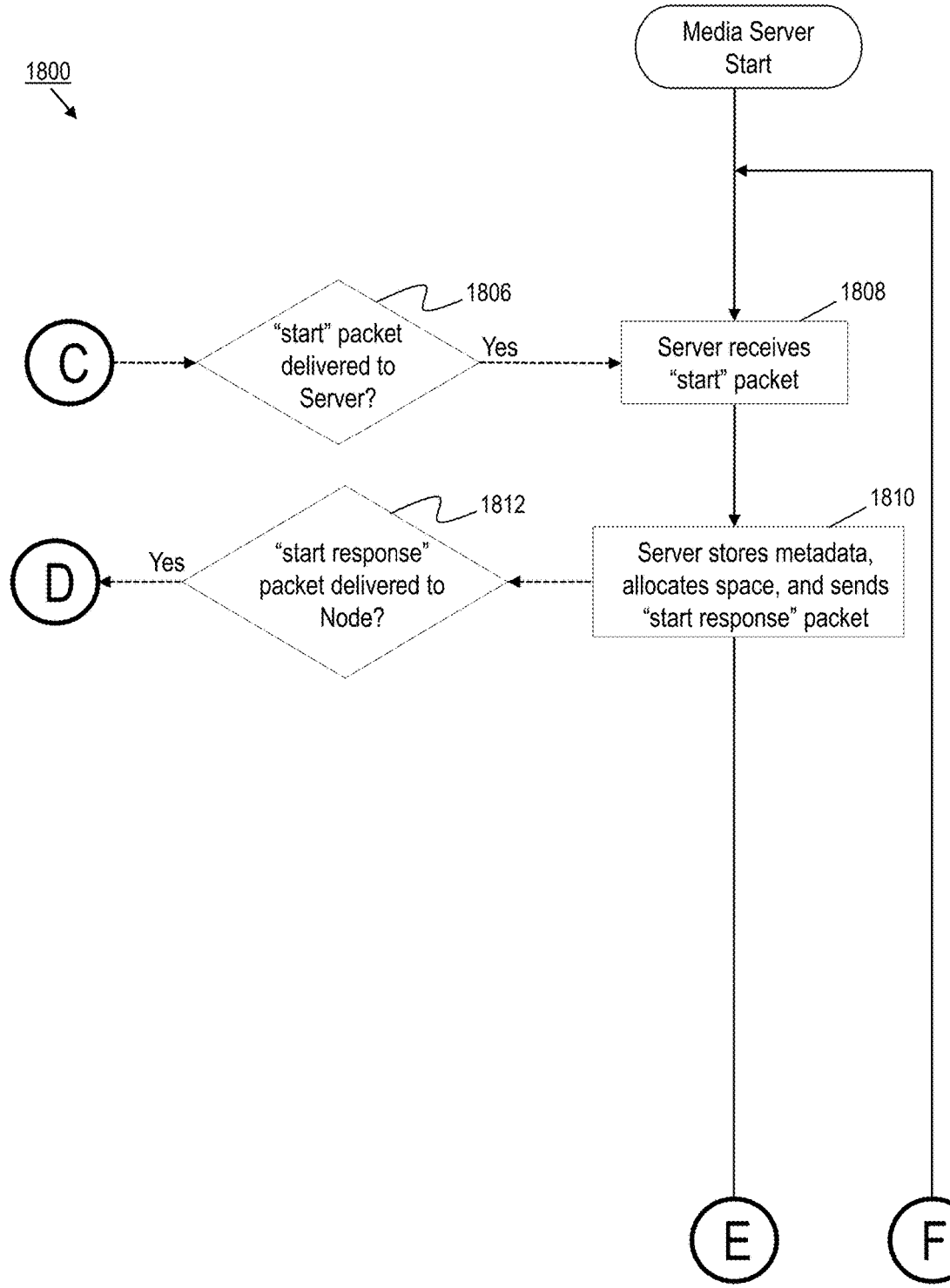
Figure 18C:
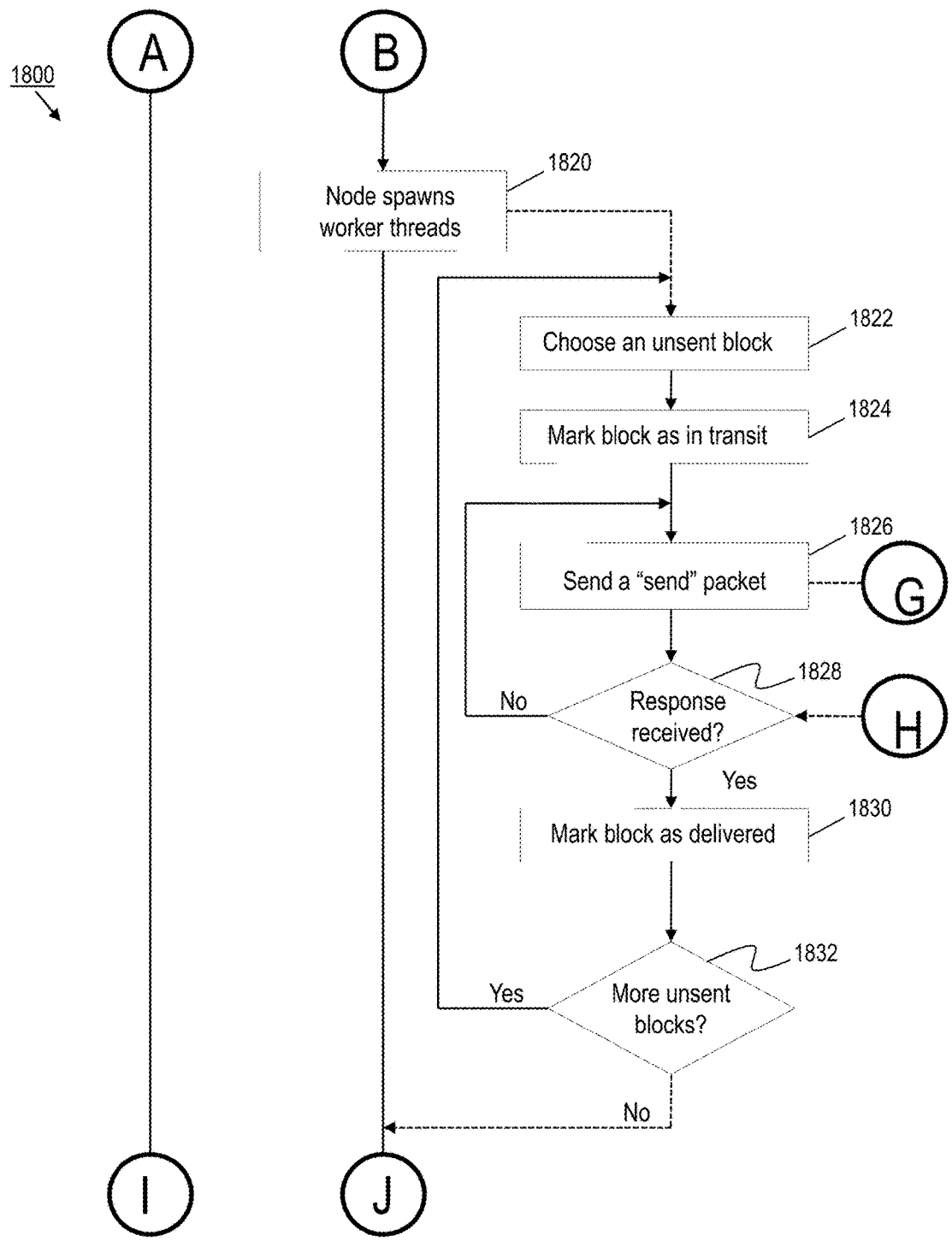
Figure 18D:
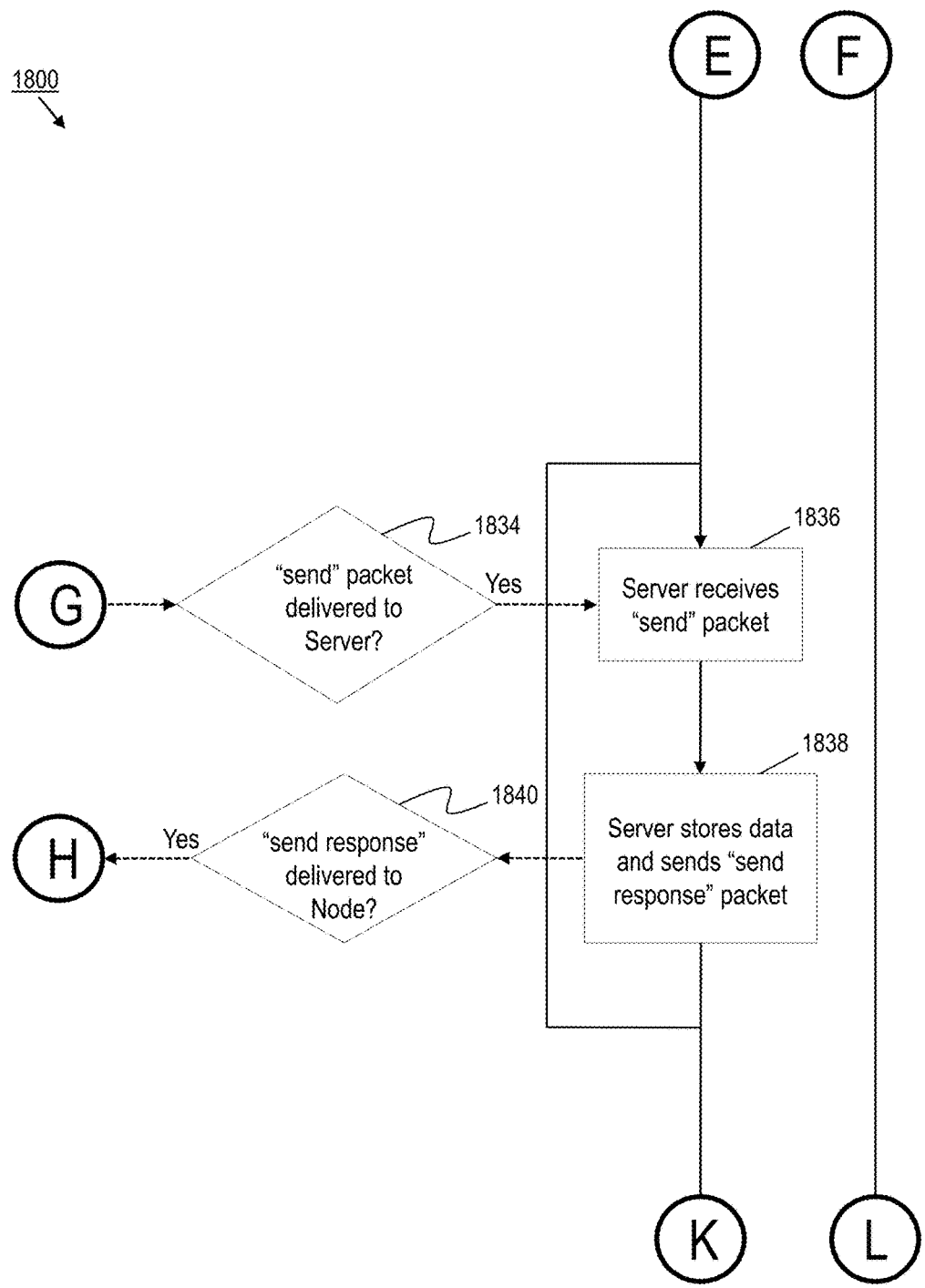
Figure 18E:
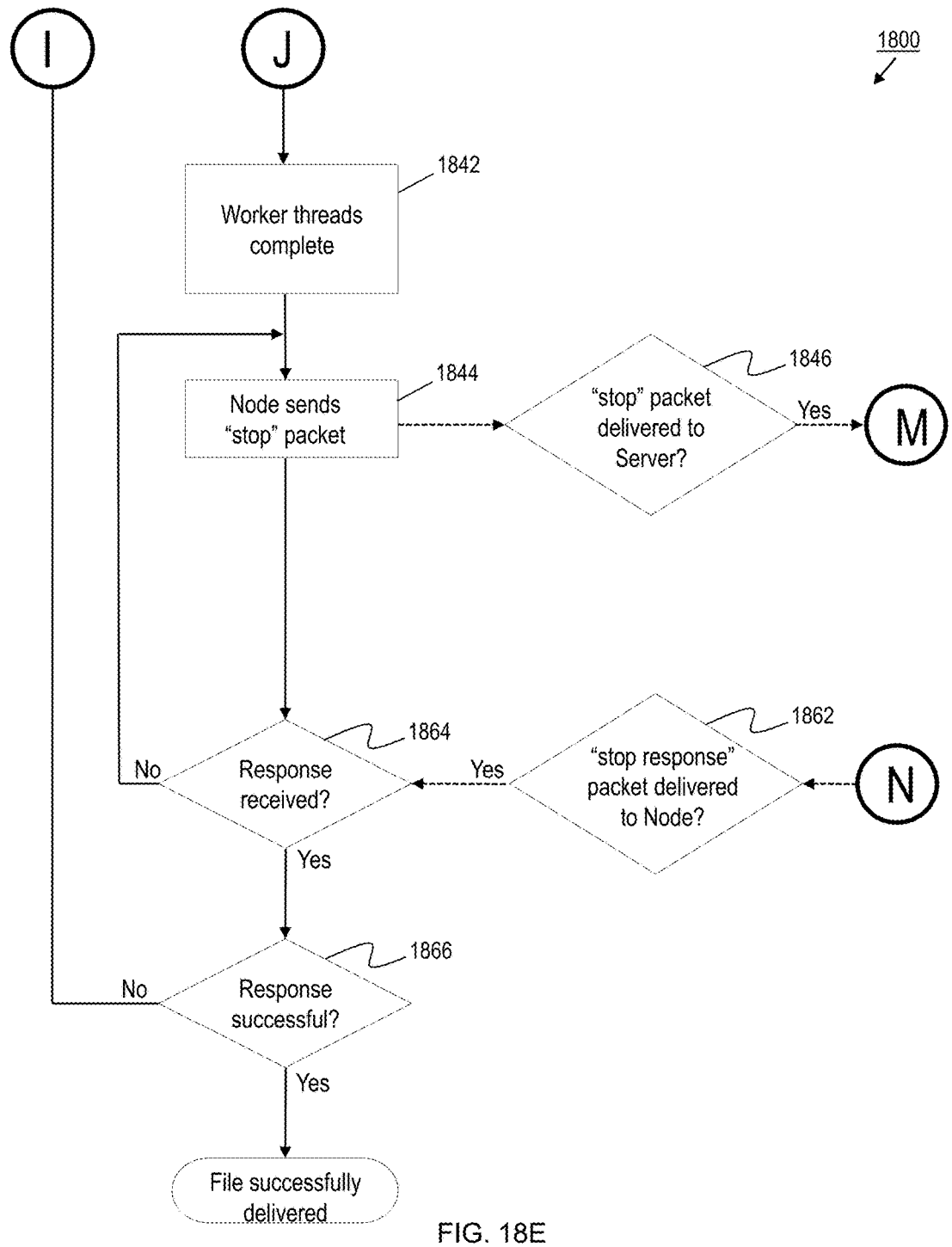
Figure 18F:
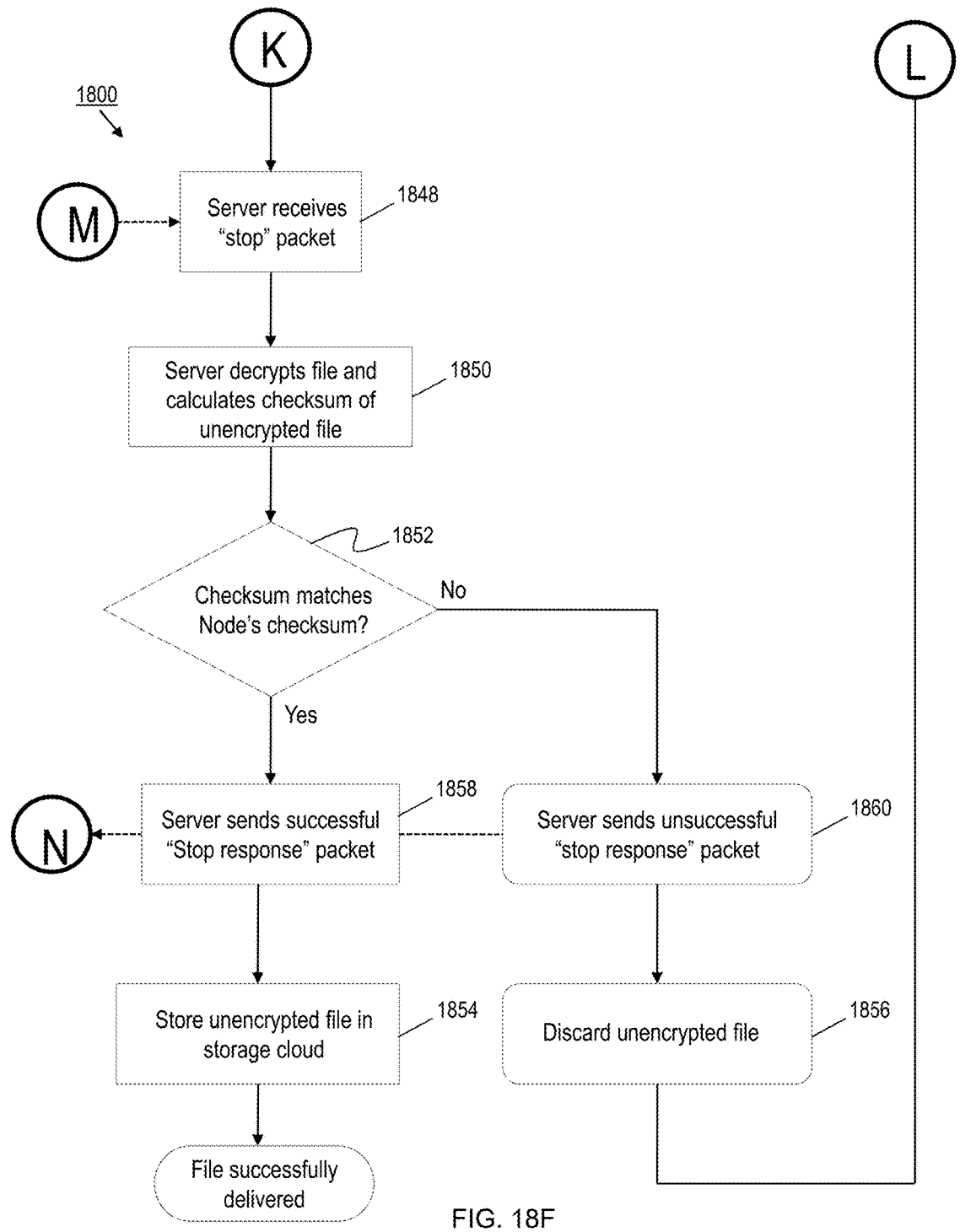

Upon powering up (step 1602), the broadcasting device 908 sends a "status request" (e.g., an HTTP GET request) to the scheduling logic 920 (see FIGS. 17A and 17B). For additional security any of the communications between the broadcasting device 908 and the scheduling logic 920 might be done using Secure Hypertext Transfer Protocol (HTTPS). The broadcasting device 908 is authenticated using its unique identifier (described above) and secret password (described below). In one exemplary embodiment, each "status request" is sent through a RESTful web-service API. The status request can take the form of GET/nodes/[NODE-ID].xml and return an XML packet which minimally includes, for example, <node><status>unregistered</status></node>. The status request is used to send the unique identifier of the broadcasting device 908 to the scheduling logic 920. The status request also allows the broadcasting device 908 to request the current status that the scheduling logic 920 has for itself. For example, the status could be "unregistered," in which case the broadcasting device 908 would do nothing but keep checking in with the scheduling logic 920; "probing," in which case the broadcasting device 908 would know that someone is trying to register it, so the broadcasting device 908 would flash its LED; or "ready" or "broadcasting," in which case the broadcasting device 908 is registered and can proceed to broadcast video (see FIGS. 17A and 17B).

A combined process 1700 for registering the broadcasting device 908 and performing post-registration processing (e.g., broadcasting) using the broadcasting device 908, according to one exemplary embodiment, is shown in FIGS. 17A and 17B. Steps 1702, 1704, 1706, 1708, and 1710 relate to the autonomous registration of the broadcasting device 908 with the scheduling logic 920. Steps 1712, 1714, 1716, 1718, 1720, 1722, 1724, 1726, 1728, 1730, and 1732 are all directed to post-registration processing by the broadcasting device 908. In particular, steps 1712, 1714, 1716, 1718, and 1720 form a processing loop wherein the broadcasting device 908 periodically checks with the scheduling logic 290 to determine if an event schedule stored on the broadcasting device 908 is stale (i.e., no longer matches the event schedule stored at the scheduling logic 920). If so, the broadcasting device 908 updates the local copy of its event schedule (step 1716). Furthermore, steps 1718, 1720, 1722, 1724, 1726, 1728, 1730, and 1732 relate to broadcasting of events by the broadcasting device 908.

In addition to being useful during the registration process 1600, the returned status is also useful for synchronizing expected behavior when a connection between the broadcasting device 908 and the scheduling logic 920 is interrupted. For example, the status request could tell the broadcasting device 908 whether or not there is an open broadcast session for that broadcasting device 908. An open broadcasting session means that the scheduling logic 920 believes that the broadcasting device 908 should be streaming video to a specific media server 912 on specific ports. If power was lost at the broadcasting device 908, the scheduling logic 920 will use this information to resume a broadcast when power is restored to the broadcasting device 908.

Since the broadcasting device 908 is not registered, the scheduling logic 920 logs its network address (e.g., WAN IP) and returns a status of "unregistered." The WAN IP refers to the IP address from which traffic appears to originate on the Internet or wide-area network. The broadcasting device 908 waits (e.g., for a few seconds) and then re-checks the status of the broadcasting device 908.

If the content provider 916 is logged into the website of the scheduling logic 920 (step 1604) and follows the hyperlink labeled "Register a New Node" (step 1606), then the scheduling logic 920 compares the WAN IP address of the content provider 916 with the last know WAN IP address of its unregistered broadcasting devices.

If the scheduling logic 920 finds a unique match (i.e., finds exactly one of its unregistered broadcasting devices with the same last known WAN IP address as the content provider 916), then the scheduling logic 920 changes that status of the broadcasting device 908 to "probing." Otherwise, the scheduling logic 920 prompts the content provider 916 to enter the unique code from the bottom of the case of the broadcasting device 209 (step 1616).

When the broadcasting device 908 sees a status of "probing," the broadcasting device 908 begins flashing its light (e.g., LED). The broadcasting device 908 waits (e.g., for a few seconds) and then re-checks the status of the broadcasting device 908 by sending another "status request." In this manner, prior to being registered, the broadcasting device 908 continues to query the scheduling logic 920 until it discovers that it is registered (e.g., "ready," "broadcasting").

If the content provider 916 is eventually successful in registering the broadcasting device 908, the scheduling logic 920 will set the broadcasting device's status to "ready." The registration process 1600 then ends (i.e., the remaining steps are skipped). Once the broadcasting device 908 is registered, it enters its normal life cycle and can stream video in accordance with its user-defined schedule.

If, however, the content provider 916 elects to give up on the registration process 1600, or the registration process 1600 otherwise fails, the scheduling logic 920 will set the status of the broadcasting device 908 to "unregistered." Thereafter, as noted above, since the broadcasting device 908 is not registered, the scheduling logic 920 logs its WAN IP address and returns a status of "unregistered," and the registration process 1600 can continue from this point. In the embodiment described herein, an unregistered broadcasting device cannot be used for anything with respect to the scheduling logic or the media servers, since it is not associated with a user account. No events can be scheduled for the unregistered broadcasting device and no video can be streamed through it. The purpose of the registration process 1600 is to tie the broadcasting device 908 to a specific account. After registration, a user (e.g., the content provider 916) can schedule events for the broadcasting device 908 and broadcast from it.

The broadcasting device 908 is fully automated and interacts with the scheduling logic 920 through a web-server API in order to auto-register itself, to coordinate its schedule, to initiate event broadcasting, and to coordinate the uploading of high-quality (e.g., any one or any two or more of the following: higher video resolution, lower video compression loss; increased audio quality, larger size, and/or increased frame rate) video. Prior to shipping each broadcasting device 908, a secret password is installed on the broadcasting device 908 via a commissioning process and the scheduling logic 920 receives a record for that broadcasting device 908 with its secret password. This secret password can be any numeric data, alphanumeric data, or other code for use in authenticating the broadcasting device 908 with respect to the scheduling logic 920. By sharing the secret password, the broadcasting device 908 can be securely authenticated (using its unique identifier and secret password) by the scheduling logic 920 using HTTP authentication over an SSL connection.

A commissioning process is a process by which software is loaded onto the broadcasting hardware to form the broadcasting device 908. During the commissioning process, a user name and a secret password are assigned to the broadcasting device 908 and shared with the scheduling logic 920. In exemplary embodiment, the username is the unique identifier described above. The commissioning process typically occurs at a manufacturing site of the broadcasting device 908. The software is loaded onto the broadcasting hardware using any suitable means, method, and/or mechanism. In one exemplary embodiment, described below, the software is loaded onto the broadcasting hardware using a bootable mini-SD card. The manufacturer has a special account (i.e., a manufacturer account) on the website of the scheduling logic 920.

A commissioning process, according to one exemplary embodiment, includes the following six steps:

Step 1. A bootable mini-SD card is inserted into or otherwise interfaced with (e.g., via a USB-based card interface communicating via a USB port of) the broadcasting device 908. The bootable mini-SD card contains a software image that will be installed on the broadcasting device 908.

Step 2. The broadcasting device 908 is turned on, which results in the broadcasting device 908 booting from the mini-SD card.

Step 3. A boot program on the mini-SD establishes a network connection (e.g., a wired or wireless Internet connection) and contacts the website of the scheduling logic 920 over an SSL connection using the manufacturer's account information or other credentials (found on the boot image). The scheduling logic 920 authenticates the manufacturer and also verifies its IP address.

Step 4. The boot program makes a commissioning request to the scheduling logic 920 passing in the broadcasting device's ID as the broadcasting device name.

Step 5. The scheduling logic 920 responds with an auto-generated password that is stored on a flash disk of the broadcasting device 908 as well as at the scheduling logic 920.

Step 6. The boot program writes the software (i.e., the management software) to the flash disk of the broadcasting device 908, which concludes the commissioning process.

In one exemplary embodiment, a testing device (e.g., the computer 100) can be used to verify that the software was correctly installed on the broadcasting hardware during the commissioning process and is functioning properly. This testing device, or another device, could be used to print a label including the unique identifier for the broadcasting device 908, wherein the label is affixed to a housing or case of the broadcasting device 908.

Each broadcasting device 908 keeps a local copy of its schedule of events, but makes frequent requests to the scheduling logic 920 to check for changes to its schedule. In particular, the broadcasting device 908 sends an "event schedule request" (e.g., an HTTP GET request) to the scheduling logic 920, using its unique identifier and secret password for authentication. In this manner, the broadcasting device 908 obtains a copy of its event schedule maintained by the scheduling logic 920. In one exemplary embodiment, the response from the scheduling logic 920 that includes the event schedule is formatted in XML.

In one exemplary embodiment, the broadcasting device 908 sends an "event schedule request" to the scheduling logic 920 approximately every 5 seconds. In one exemplary embodiment, the broadcasting device 908 sends an "event schedule request" to the scheduling logic 920 every 30 to 60 seconds. In one exemplary embodiment, a delay of more than 60 seconds is present between successive "event schedule requests" sent by the broadcasting device 908 to the scheduling logic 920.

For each event in the event schedule, the web service returns a unique identifier, a start date, a start time, and a duration. Additionally, each event entry in the event schedule includes an "updated-at" timestamp. The broadcasting device 908 stores (e.g., caches) this event schedule locally and uses it to determine when to begin and end each broadcasting session. In one exemplary embodiment, a token made by hashing event updated-at timestamps is used to minimize traffic (i.e., the event schedule requests) with the scheduling logic. At the scheduling logic 920, the token is recalculated whenever the schedule changes. At the broadcasting device 908, the token is recalculated whenever an updated schedule is downloaded from the scheduling logic 920. A difference between the tokens indicates that a change in the schedule maintained as the scheduling logic 920. Thus, if the tokens match, an HTTP status code indicating that there are no changes to the schedule is returned to the broadcasting device by the scheduling logic 920. If the tokens do not match, XML content containing the updated schedule is returned to the broadcasting device 908 by the scheduling logic 920. In this manner, the "event schedule request" is sent by the broadcasting device 908 with its token, and the scheduling logic 920 compares the token from the broadcasting device 908 to its own token, only returning the full schedule if the tokens are different.

When one of the events on the schedule of the broadcasting device 908 is scheduled to begin, the broadcasting device 908 powers up the video acquisition device 910 and any other related devices, early enough in advance for them to go through their respective power-up processes, and sends a "channel creation request" to the scheduling logic 920. This request contains the scheduled event's unique ID and results in the creation of a new broadcasting channel. The broadcasting device 908 then polls this channel by issuing a "view channel request" to the scheduling logic 920 to determine completion of the channel creation. In particular, the broadcasting device 908 must wait until the returned channel is available. Once the channel is available, the web-service responds with values for the media server name/URL, the stream name, and the video and audio ports to broadcast to. Once these values are obtained, the broadcasting device 908 begins capturing and encoding its video stream. The stream is configured to broadcast to the media servers 912 and ports given in the channel. From an encoder, a configuration file is created in SDP format and this configuration file is sent to the scheduling logic 920 in a "configure channel request." The configure channel request establishes the connection between the broadcasting device 908 and the designated media servers 912. The scheduling logic 920 passes this information on to the correct media servers 912. Thereafter, the broadcasting device 908 begins streaming to the media servers 912 on the correct ports. Once streaming of the video data for the event is complete and a corresponding higher quality (e.g., any one or any two or more of the following: higher video resolution, lower video compression loss; increased audio quality, larger size, and/or increased frame rate) file is saved, the broadcasting device 908 can begin a trickle upload process for the video data, as described below.

When the currently broadcasting event is scheduled to end, the broadcasting device 908 sends a "delete channel request" to the scheduling logic 920 and powers down any related devices (i.e., the video acquisition device 910). This request contains the open channel's unique ID, and results in the destruction (i.e., deletion) of the broadcasting channel. Upon deletion of the channel, the video session is converted into a video recording corresponding to a standardized or proprietary format for playback (e.g., VOD) on a standardized or proprietary player, respectively. The video recording is stored in the media server cloud 922 and is associated with the event for later rebroadcast.

The scheduling logic 920 manages the media server cloud 922 by acquiring, configuring, and releasing media servers 912, for example, as streaming server instances from a third-party cloud computing service (e.g., Amazon EC2) as needed. The scheduling logic 920 also monitors the server instances for changes in usage or errors, and manages secure access to the media servers 912.

For each streaming server instance, the scheduling logic 920 maintains a record of both estimated or otherwise reserved bandwidth for the event and actual bandwidth being used by the event. All decisions about scaling the resources of the media server cloud 922 are based on actual and expected fluctuations in bandwidth, which is the limiting performance factor for streaming media. In order to preserve service quality, each streaming server instance is utilized only up to a threshold bandwidth. The threshold bandwidth is set to insure that service quality is good while the actual bandwidth usage remains at or below this level.

New streaming server instances are requested from the third-party cloud computing service whenever there is a need for more bandwidth than can be supported easily by the current streaming servers that are active in the media server cloud 922. This need can be triggered by an event that is scheduled to start soon, or by an increase in the number of view requests for existing live broadcasts and/or pre-recorded broadcasts.

Before a scheduled event begins, the amount of bandwidth required is estimated. The bandwidth estimate is then increased by a scaling factor (e.g., two standard deviations) in order to accommodate the bandwidth needs of the event in the vast majority of cases (i.e., the view bandwidth). The viewer bandwidth is then increased by another scaling factor (e.g., 20%) to accommodate unexpected scaling to other servers. Application of these scaling factors provides a total bandwidth to be reserved for the event (i.e., the reserved bandwidth).

Assuming the reserved bandwidth is not greater than the threshold bandwidth for a single streaming server, then all active streaming servers are checked for available bandwidth. If an available server is found, then this amount of bandwidth is reserved on the available server. Additionally, the available server is then configured to act as an Origin server for the event. If a streaming server with enough available bandwidth is not found, then the scheduling logic 920 acquires a new streaming server instance, configures it, and reserves the requested bandwidth on this new server which becomes the Origin server for the event.

If the reserved bandwidth is greater than the threshold bandwidth for a single streaming server, then the necessary bandwidth is reserved on multiple servers. The scheduling logic 920 first reserves a complete server to act as the Origin server for the event. The scheduling logic 920 then reserves one or more Edge servers to supply all of the needed bandwidth to the viewers 918, with the number of Edge servers being determined by dividing the reserved bandwidth by a server's threshold bandwidth (rounding up to a whole number). If the Origin server can support all of the Edge servers directly, then the Edge servers are configured to pull from the Origin server. The number of Edge servers that can be supported by an Origin server is determined by dividing the threshold bandwidth by the event stream's bandwidth (rounding down to a whole number) and then scaling down further (e.g., 10%) to allow room for unexpected growth. If the Origin server cannot support all of the Edge servers, then a number of Relay servers will be reserved to bridge the gap. This is a simple fanout configuration including as many layers of Relay servers as necessary to support the Edge servers without exceeding the threshold bandwidth on any one server.

During a live event broadcast, the bandwidth being used by viewers 918 is monitored to make sure it stays within the viewer bandwidth range for the event. If a view request arrives that would cause the bandwidth to exceed this limit, then the scheduling logic 920 will attempt to reserve more bandwidth on the same server for the event. If the server has bandwidth available, then it is reserved and the viewer bandwidth limit is adjusted to serve the outstanding view request. If the server does not have available bandwidth, then a new Edge server is reserved which relays from the reserved bandwidth on the Origin server. If the amount of reserved bandwidth is smaller than some limit, then a Relay server is also reserved to stand between the Origin server and the new Edge server. This same mechanism is used with bandwidth usage on the new Relay server, so that the network can readily scale in size and, in theory at least, scale indefinitely.

As far as management of the media server cloud 922 is concerned, video-on-demand (VOD) streaming is treated as an ongoing event. This is true in that the bandwidth usage history for viewing pre-recorded events is tracked and used to estimate future bandwidth needs in the same way that event bandwidth usage is estimated. The VOD pseudo-event then reserves bandwidth in the same way as regular (i.e., live) events, with the exception that all servers can send VOD directly, so there is no need for an Origin/Relay/Edge configuration. As bandwidth increases beyond the threshold bandwidth of a single server, more servers are reserved directly.

After a streaming server is acquired and is running on a disk image that contains streaming server software, additional configuration must be performed. This is done by uploading an initialization package to the server and then running an initialization script of the package. This includes activities such as performance tuning of the specific server instance, mounting a storage server disk image, and configuring security parameters.

When a particular event is ready to begin broadcasting, the server also needs to be configured for that event. This configuration is accomplished by running scripts that were installed as part of the initialization package. The configuration includes, for example, information indicating: (1) whether the server should act as an Origin, Relay, or Edge for the broadcast; (2) whether or not to record the broadcast; (3) what licensing restrictions to use for the broadcast (e.g., limiting the number of viewers 218); and (4) what security token and parameters to use for the broadcast.

When a streaming server is first acquired, a scheduled checkup is set to assess whether or not the server is still necessary. At each checkup, the server is checked for reserved bandwidth. If no bandwidth is reserved on the server, then it is released. Otherwise, it is left running and another checkup is scheduled for later (e.g., in one hour). By keeping the streaming servers in order and allocating bandwidth according to that ordering, a server will rarely remain in use long if it is not needed.

The bandwidth usage for an event is estimated based on the history of actual bandwidth usage for the particular broadcasting device 908 that is streaming the event and may also be influenced by other factors, such as the content provider's market segment, the starting date, time, and duration of the event, and/or hard limits on the number of viewers 918 or bandwidth setup by the content provider 916 when configuring the event. The estimate may also be influenced by promotional advertising analytics, such as a number of people who indicated interest on a Facebook page setup for the event. In one exemplary embodiment, some or all of these influencing factors are combined into a Bayesian probability model, and the amount of bandwidth is estimated as the mean of the probability distribution.

When an event is underway, the broadcasting device 908 transmits video and/or audio data to the media servers 912. In general, the video/audio data is transmitted using, at least in part, the improved backhaul protocol described above. Consequently, the video/audio data is typically subjected to some encryption scheme and some FEC scheme when being sent from the broadcasting device 908 (i.e., stream originator) to the media servers 912 (i.e., stream receiver). The video data and/or the audio data may be encoded/compressed prior to transmission. In one exemplary embodiment, the video data is encoded according to the H.264 standard, using the Baseline Profile (BP). In one exemplary embodiment, the audio data is encoded according to the Advanced Audio Coding (AAC) standard, using the Low Complexity (LC) profile. As part of starting an event, the scheduling logic 920 places an SDP file on the designated media servers 912, which allows the media servers 912 to know how to receive and process the data being sent to it by the broadcasting device 908.

After a live broadcast is completed, the broadcasting device 908 may upload to the storage servers a higher quality (e.g., any one or any two or more of the following: higher video resolution, lower video compression loss; increased audio quality, larger size, and/or increased frame rate) video that was recorded locally during the live broadcast. This is done so that later re-broadcasting does not suffer from the same quality limitations that uplink bandwidth imposes on the initial live broadcast. Accordingly, depending on the configuration of an event, the broadcasting device 908 may store a high-resolution copy of an event that it broadcast. In one exemplary embodiment, the broadcasting device 908 stores a high-resolution copy of an event in addition to broadcasting the event live. In one exemplary embodiment, the broadcasting device 908 stores a high-resolution copy of an event instead of broadcasting the event live.

When the broadcasting device 908 is not busy broadcasting events, a background process running on the broadcasting device 908 sends higher quality (e.g., any one or any two or more of the following: higher video resolution, lower video compression loss; increased audio quality, larger size, and/or increased frame rate) data acquired by the video acquisition device 910 to one or more of the media servers 912 instantiated as storage servers in the media server cloud 922 for storage thereof. A "trickle upload" process 1800 for storing the higher quality data, according to one exemplary embodiment, is shown in FIGS. 18A-18F.

According to the upload process 1800, the broadcasting device 908 encrypts the higher quality (e.g., any one or any two or more of the following: higher video resolution, lower video compression loss; increased audio quality, larger size, and/or increased frame rate) media file with a public key that the scheduling logic 920 has issued to the applicable media servers 912, in step 1802. Next, in step 1804, the broadcasting device 908 sends a UDP "start" packet to the media server 912 with the event identifier, a checksum of the original higher quality media file, and the length of the encrypted file, telling the server that the broadcasting device 908 is initiating the trickle upload process.

If the media server 912 successfully receives the "start" packet from the broadcasting device 908 (steps 1806 and 1808), the media server 912 stores the checksum for later validation and allocates space to hold the encrypted file, in step 1810. The media server 912 then sends a UDP "start response" packet to the broadcasting device 908, indicating that the server is ready to receive data (step 1810).

Next it is determined whether the broadcasting device 908 successfully receives the "start response" packet from the media server 912 (steps 1812 and 1814). If acknowledgment isn't received within a predetermined timeout, the broadcasting device 908 repeats sending of the UDP "start" packet (step 1804). If the broadcasting device 908 receives the "start response" packet from the media server 912, the broadcasting device 908 determines the Path Maximum Transmission Unit (PMTU) between the broadcasting device 908 and the media server 912, in step 1816, to reduce the chances that packets will be fragmented at the Internet Protocol (IP) layer. The broadcasting device 908 divides the encoded higher quality data file up into blocks of PMTU minus H bytes of data, in step 1818, where H is the number of bytes in the headers of the "send" packet, including the application, UDP, and IP headers.

In step 1820, the broadcasting device 908 starts a predetermined number of threads based on a number of outstanding packets the broadcasting device 908 is willing to tolerate. Each of the threads will then perform the following four steps: (1) choose an unsent block from the file in step 1822; (2) mark the block as being in transit in step 1824; (3) send a UDP "send" packet to the media server 912 with the event identifier, the starting offset of the block into the file, the data length, and the data chunk, in step 1826; and (4) wait a predetermined amount of time for a response from the server in step 1828. If the server sends a response, mark the packet as delivered in step 1830. If no response is received, the thread processing returns to step 1826. Next, in step 1832, it is determined if any unsent blocks remain. If unsent blocks do remain, the thread processing restarts at step 1822. If there are no more unsent blocks, the thread exits and processing of the upload process 1800 continues at step 1842.

The media server 912 listens for UDP "send" packets from the broadcasting device 908, in step 1834. Upon receipt of a UDP "send" packet (step 1836), the media server 912 writes the content into the pre-allocated storage at the requested offset (step 1838) and sends a UDP "send response" to the broadcasting device 908 (step 1840).

Once all blocks are sent (step 1842), the broadcasting device 908 sends a UDP "stop" packet to the media server 912 with the event identifier, telling the server that the broadcasting device 908 has sent the entire higher quality file, in step 1844.

If the media server 912 successfully receives the UDP "stop" packet (steps 1846 and 1848), the media server 912 decrypts the received data with its private key and calculates a checksum of the unencrypted file (step 1850). In step 1852, it is determined if this checksum matches the checksum sent by the broadcasting device 908 (in step 1804). If the checksums match, in step 1852, the media server 912 will begin to store the higher quality file in the media server cloud 922 (step 1854). If the checksums do not match, then the decrypted data will be discarded in step 1856. The media server 912 will send a UDP "stop response" packet to the broadcasting device 908 indicating its success or failure (steps 1858 and 1860, respectively).

If the broadcasting device 908 successfully receives the "stop response" packet (steps 1862 and 1864), the "stop response" packet is evaluated to determine if the file was successfully delivered (step 1866). Thus, if the status in the "stop response" packet indicates that the file delivery was successful, the broadcasting device 908 considers this transfer complete. If the status in the "stop response" packet indicates that the file delivery was unsuccessful, the broadcasting device 908 will restart processing of the upload process 1800 at step 1802. If the broadcasting device 908 does not receive the "stop response" packet (steps 1862 and 1864), processing of the upload process 1800 continues at step 1844.

The viewer 918 views an event through a URL provided by the content provider 916. The URL could be provided, for example, as a hyperlink in an e-mail or on the a website (e.g., the content provider's site). The URL is constructed for the broadcast by an API of the scheduling logic 920. The URL points to a customized video player (e.g., Flash with ActionScript) that holds a secure token, the URL, and parameters for the event's VOD or Edge server. If the event is ticketed, it also supplies a unique token within the parameters. These tokens are available according to the content provider's licensing configuration. This is the only interaction between the viewer 918 and the scheduling logic 920, i.e., to retrieve a customized viewer based on the broadcast requested and the viewer's access privileges.

The viewer 918 similarly has no direct access to the media servers 912. The viewer 918 can only access the video stream on a media server 912 (Edge or VOD) through the customized video player (e.g., Flash and ActionScript) that was supplied by the scheduling logic 920. The video steam is encrypted and authenticated by a secure token (and optionally a unique viewer token) to prevent any unauthorized access to the video content.

As noted above, a broadcast can be configured to require unique tokens or tickets. In order to view such a broadcast, each viewer 918 must pass a unique token to the media server 912 which will lookup the token and insure that it is not a violation of its restrictions to allow viewing of the video. If the token is not found in a lookup database of the media servers 912, then access to the video is refused.

If the token is found in the lookup database, it can be used to impose various restrictions, for example: (1) restrictions on the number of simultaneous viewers (e.g., a restriction on one simultaneous viewer would allow the viewer if there were no open viewers using the same token, but would refuse access if such a viewer was already open); (2) restrictions on viewer time, such as restricting viewing to a specific time period and/or a specific amount of cumulative viewing time; (3) restrictions on the amount of bandwidth consumed by viewers with the token; (4) group restrictions wherein a group of tokens are cumulatively restricted according to simultaneous viewer count, specific date/time ranges, cumulative viewing time, and/or bandwidth limits; and (5) restrictions that differ for viewing an event live and viewing a pre-recorded version of the event.

The unique tokens and their corresponding restrictions are managed by the scheduling logic 920 as part of the account and event setup. A user interface provided by the scheduler website keeps this management simple by providing sets of common restrictions for different types of events. The selected restrictions are then communicated to the media server 212 as part of event configuration.

FIGS. 19-23 show screen shots from a user interface 1900, according to one exemplary embodiment, provided by the scheduler website implemented by the scheduling software 902 running on the server computer 904 (i.e., the scheduling logic 920). These screen shots illustrate a scenario by which a user or administrator (e.g., the content provider 916) could schedule an event to be broadcast by an autonomous broadcasting system (e.g., the autonomous broadcasting system 900) as a live video stream.

In this example, the administrator shares a link (corresponding to a URL) with potential viewers of a video stream. It is assumed that a broadcasting device of the autonomous broadcasting system has already been registered with the website. If the broadcasting device and any related hardware (e.g., a video acquisition device) are working, the event will automatically be broadcasted as the live video stream to as many of the potential viewers as request or otherwise connect to the live video stream. The autonomous broadcasting system is readily scalable based on many factors (e.g., a number of requesting viewers) since the system uses cloud computing to dynamically add servers as needed.

Figure 19:
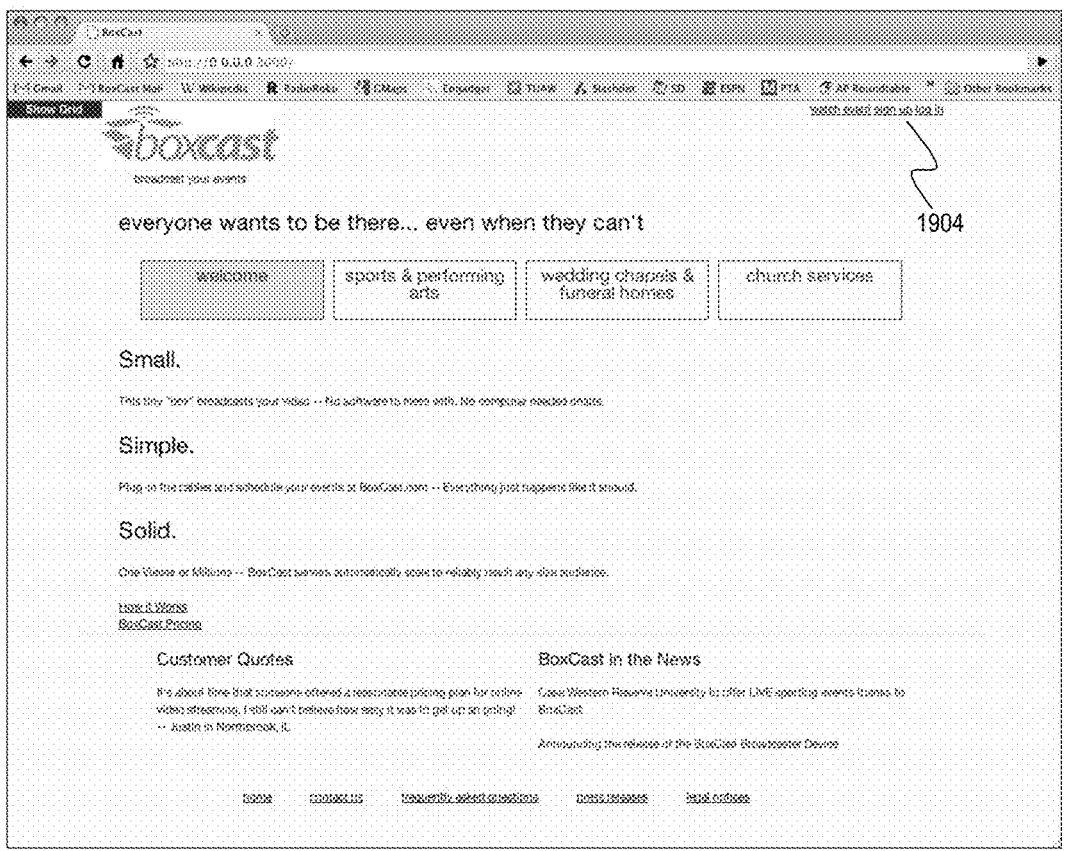
FIG. 19 is a screen shot of a user interface, according to one exemplary embodiment, displaying a home page of a scheduler website.

The user interface 1900 includes a webpage 1902 shown in FIG. 19, which is displayed as a result of a user (e.g., the content provider 916) visiting the scheduler website (e.g., at www.boxcast.com) using a computer (e.g., the computer 800) running a web browser. The webpage 1902 represents a home page of the scheduler website that initially appears, unless the user had selected "keep me signed in" during his last session. The webpage 1902 includes a login link 1904.

Figure 20:
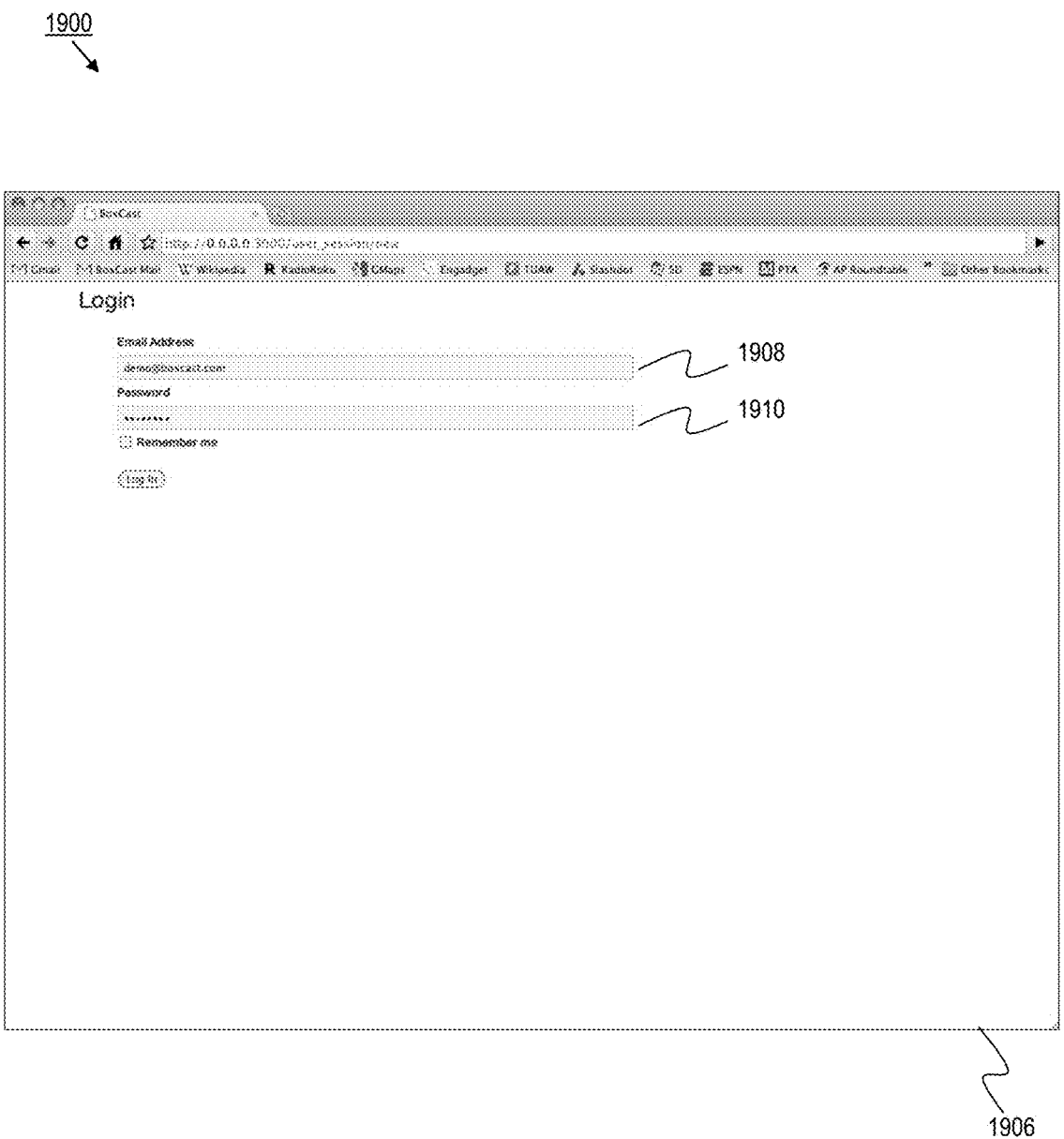
FIG. 20 is a screen shot of a user interface, according to one exemplary embodiment, displaying a login page of a scheduler website.

If the user clicks on or otherwise selects the login link 1904, the user interface 1900 displays a webpage 1906, as shown in FIG. 20, which prompts the user to login to the scheduler website by entering a username 1908 (e.g., an e-mail address) and a password 1910.

Figure 21:
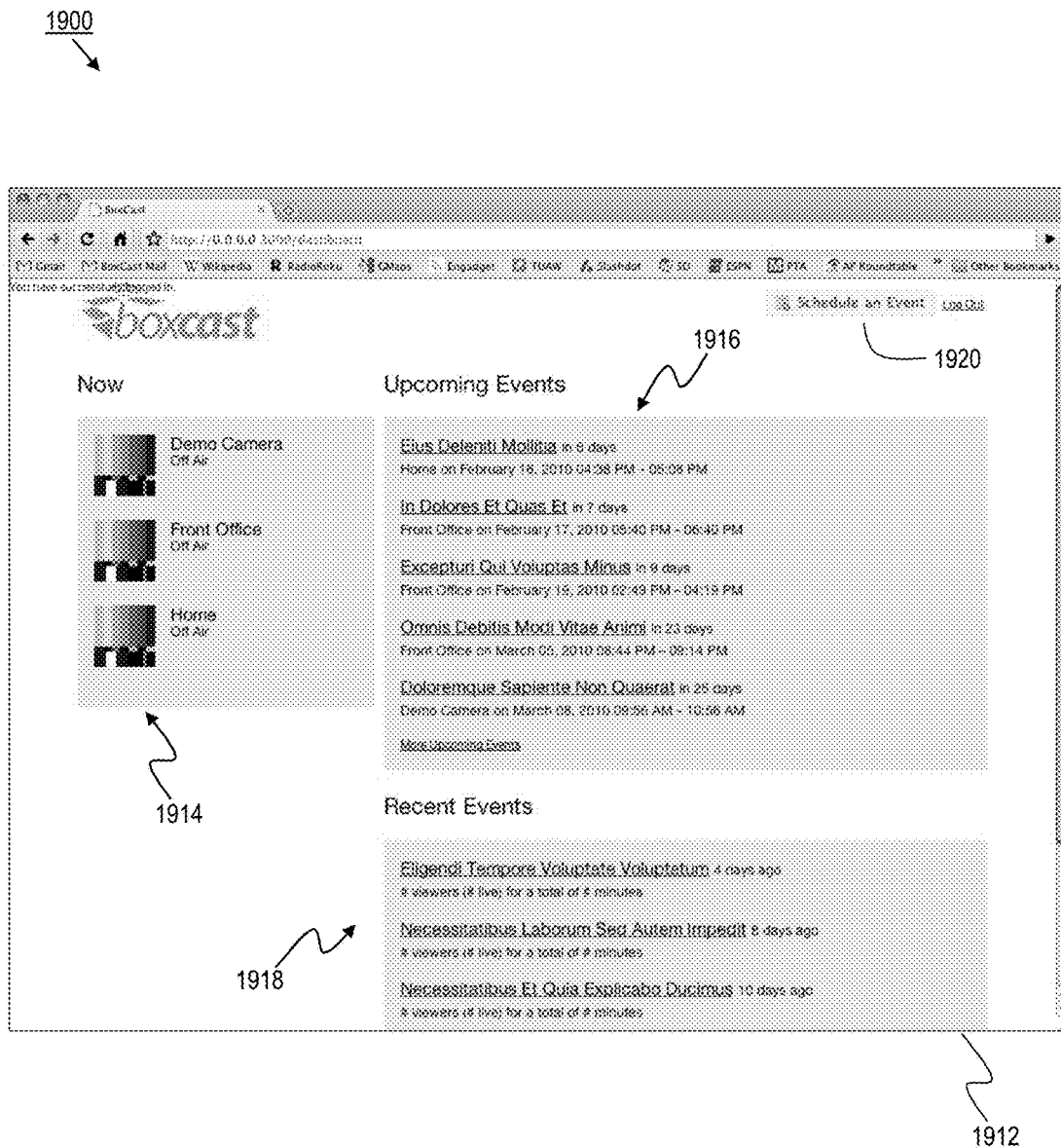
FIG. 21 is a screen shot of a user interface, according to one exemplary embodiment, displaying a user's event page within a scheduler website.

Once the user inputs his credentials (i.e., the username 1908 and password 1910) and the credentials are authenticated by the system, the user is taken to his main webpage 1912 as shown in FIG. 21. This main page 1912 shows, for example, a status of broadcasting devices 1914 (including any events that are currently being broadcast), a list of upcoming events 1916, and a list of recent events 1918, associated with the user. The main webpage 1912 includes a "schedule an event" link 1920.

Figure 22:
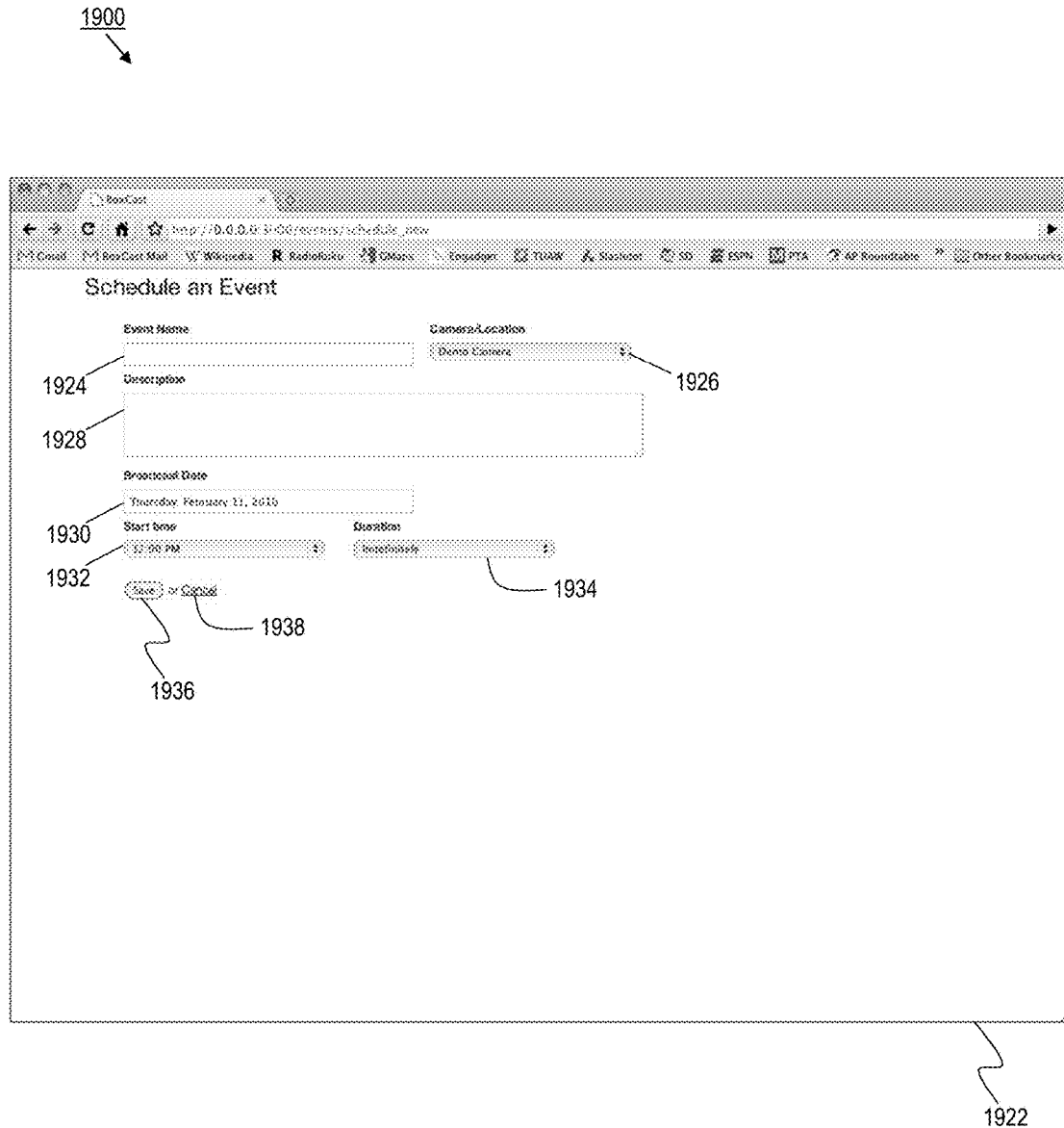
FIG. 22 is a screen shot of a user interface, according to one exemplary embodiment, displaying an event scheduling page of a scheduler website.
Figure 23:
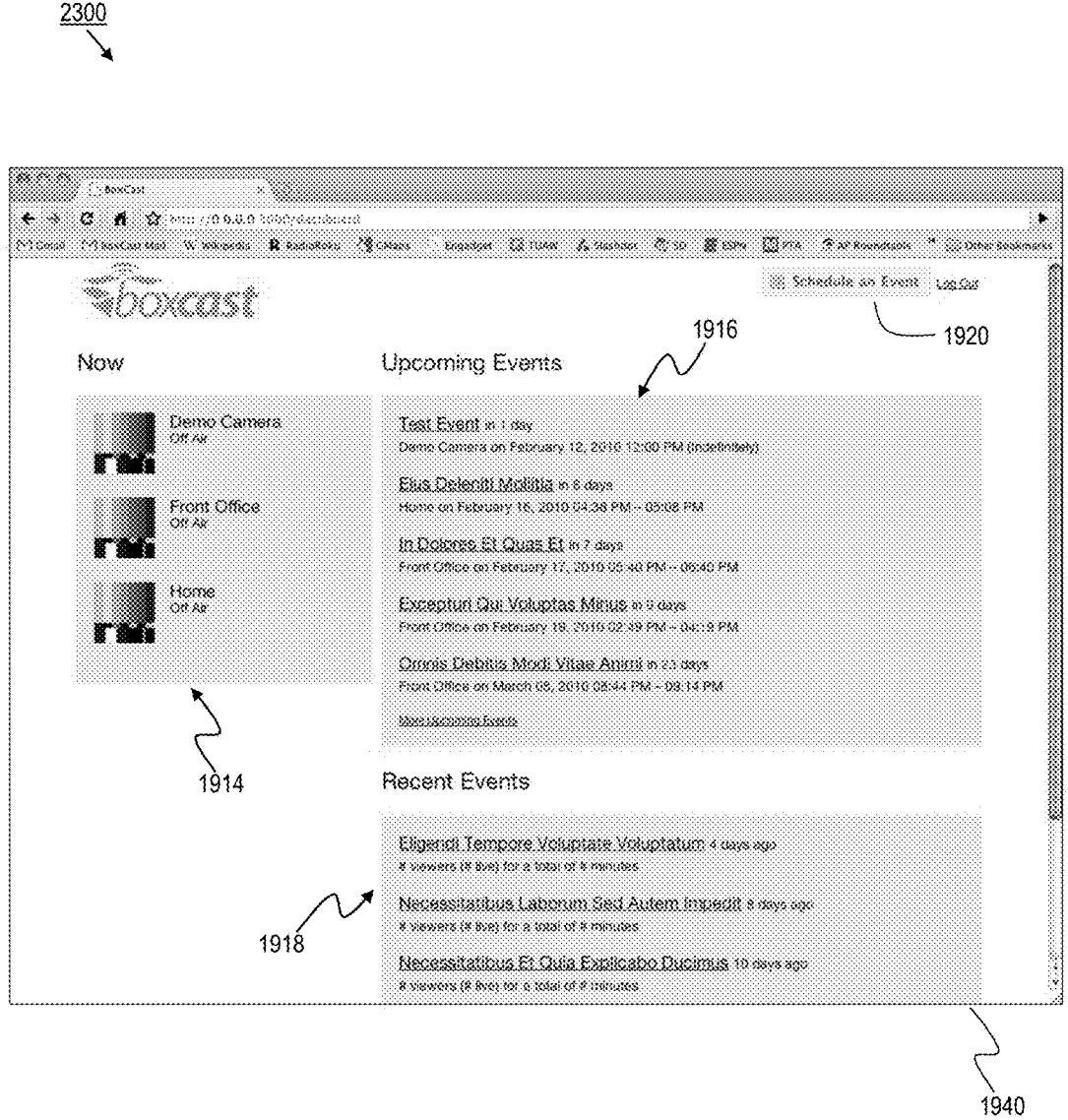
FIG. 23 is a screen shot of a user interface, according to one exemplary embodiment, displaying a modified version of the user's event page of FIG. 21.

If the user clicks on or otherwise selects the "schedule an event" link 1920, the user interface 1900 displays a webpage 1922, as shown in FIG. 22, which prompts the user to input information for the new event to be scheduled. This information includes a name 1924, a location or associated broadcasting device 1926, a description 1928, a broadcast date 1930, a start time 1932, and a duration 1934, for the event. The webpage 1922 also includes a save link 1936 and a cancel link 1938. If the user clicks or otherwise selects the cancel link 1938, the event scheduling ends and the user is returned to his main page 1912. If the user clicks or otherwise selects the save link 1936, the new event is scheduled and the user is returned to a webpage 1940 representing an updated version of his main page 1912. The webpage 1940, as shown in FIG. 23, includes the newly scheduled event in the list of upcoming events 1916.

The selected broadcasting device 908 of the autonomous broadcasting system will broadcast the event to one or more media servers on the selected broadcast date and start time for the selected duration. Accordingly, users will be directed from a link corresponding to the new event, as displayed, for example, on the webpage 1902 or a similar page at www-.boxcast.com or as a link in an e-mail, to view the live video stream being broadcast for the event.

The systems and methods of the present invention can be implemented on a variety of platforms including, for example, networked computer systems and stand-alone computer systems. Additionally, the logic and databases shown and described herein preferably reside in or on a computer readable medium such as, for example, a Read-Only Memory (ROM), Random-Access Memory (RAM), programmable read-only memory (PROM), electrically programmable read-only memory (EPROM), electrically erasable programmable read-only memory (EEPROM), magnetic disk or tape, and optically readable mediums including CD-ROM and DVD-ROM. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

The above description of specific embodiments has been given by way of example. From the disclosure given, those skilled in the art will not only understand the general inventive concepts and their attendant advantages, but will also find apparent various changes and modifications to the structures and methods disclosed. For example, although the above exemplary embodiments reference streaming of video data and video data including audio data, the general inventive concepts can be extended to include the acquiring and streaming of audio data only. It is sought, therefore, to cover all such changes and modifications as fall within the spirit and scope of the general inventive concept, as defined by the appended claims and equivalents thereof.

The invention claimed is:

1. A method comprising:
   situating an autonomous broadcast device (ABD) behind a router; and
   establishing an Internet connection for the ABD behind the router, wherein the router prevents remote access to the ABD from outside the router,
   wherein the ABD autonomously performs the following actions without any modification to or circumvention of the router:
      issue a request via the Internet connection to a first server situated outside the router and receive data relating to a recording start time of a live event from the first server in response to the request;
      receive digital content of the live event after the recording start time from a digital recording device proximate to the live event;
      transmit streaming information via the Internet connection to a second server, wherein the second server is configured to stream the digital content to a plurality of users;
      transmit the digital content via the Internet connection to the second server contemporaneously with the live event and based on the data relating to the recording start time;
      receive data relating to a recording end time for the live event from the first server via the Internet connection; and
      cease transmission of the digital content based on the data relating to the recording end time,
   wherein the digital content is transmitted to the second server according to a first protocol,
   wherein the first protocol defines an encryption scheme for the digital content; and
   wherein the first protocol defines an error correction scheme for the digital content.

2. The method of claim 1, wherein the router comprises a firewall.

3. The method of claim 1, wherein the ABD lacks a user interface permitting a user to input the recording start time of the live event via the ABD.

4. The method of claim 1, wherein the first protocol is a backhaul protocol that transports the digital content from the ABD to the second server using a plurality of packets, wherein each of the packets comprises (i) encrypted data corresponding to a portion of the digital content and (ii) error correction information.

5. The method of claim 4, wherein the first protocol uses UDP to transmit the packets from the ABD to the second server; and
wherein the first protocol uses TCP to deliver corresponding packet acknowledgements from the second server to the ABD.

6. The method of claim 4, wherein the first protocol facilitates transmission of information for addressing congestion along a backhaul path, said information comprising one or more of: (a) a number of buffers and bytes sent; (b) a number of buffers and bytes positively acknowledged (ACKed); (c) a number of buffers and bytes negatively acknowledged (NACKed); (d) a number of buffers retransmitted due to negative acknowledgements (NACKs); (e) a number of buffers retransmitted due to timeout waiting for positive acknowledgement; (f) a number of buffers and bytes for which positive acknowledgement (ACKs) were never received; (g) statistics about round-trip time (RTT) used to calculate timeout values; (f) whether a TCP socket is open or closed; (g) a transmit backlog on the TCP socket; (h) and an amount of actual packet loss reported from the receiver for each channel, as well as the last time actual loss data was received.

7. The method of claim 1, wherein the encryption scheme is one of eBC-0 and eBC-x16.

8. The method of claim 1, wherein the error correction scheme is a 1-dimensional XOR scheme suitable for recovering one missing packet from a group of N packets.

9. The method of claim 8, wherein the value of N is selected to correspond to the last packet of a multi-packet frame.

10. The method of claim 8, wherein the error correction scheme is fBC-X1d.

11. A method comprising:
situating an autonomous broadcast device (ABD) behind a router; and
establishing an Internet connection for the ABD behind the router, wherein the router prevents remote access to the ABD from outside the router,
wherein the ABD autonomously performs the following actions without any modification to or circumvention of the router:
issue a request via the Internet connection to a server situated outside the router and receive data relating to a recording start time of a live event from the server in response to the request;
receive digital content of the live event after the recording start time from a digital recording device proximate to the live event;
transmit streaming information via the Internet connection to the server; and
transmit the digital content via the Internet connection to the server contemporaneously with the live event and based on the data relating to the recording start time,
wherein the streaming information is transmitted to the server using a first protocol and the digital content is transmitted to the server using a second protocol,
wherein the second protocol defines an encryption scheme for the digital content; and
wherein the second protocol defines an error correction scheme for the digital content.

12. The method of claim 11, wherein the router comprises a firewall.

13. The method of claim 11, wherein the ABD autonomously receives data relating to a recording end time for the live event from the server via the Internet connection, and wherein the ABD ceases transmission of the digital content based on the data relating to the recording end time.

14. The method of claim 11, wherein the second protocol is a backhaul protocol that transports the digital content from the ABD to the server using a plurality of packets, wherein each of the packets comprises (i) encrypted data corresponding to a portion of the digital content and (ii) error correction information.

15. The method of claim 14, wherein the second protocol uses UDP to transmit the packets from the ABD to the server; and
wherein the second protocol uses TCP to deliver corresponding packet acknowledgements from the server to the ABD.

16. The method of claim 14, wherein the second protocol facilitates transmission of information for addressing congestion along a backhaul path, said information comprising one or more of: (a) a number of buffers and bytes sent; (b) a number of buffers and bytes positively acknowledged (ACKed); (c) a number of buffers and bytes negatively acknowledged (NACKed); (d) a number of buffers retransmitted due to negative acknowledgements (NACKs); (e) a number of buffers retransmitted due to timeout waiting for positive acknowledgement; (f) a number of buffers and bytes for which positive acknowledgement (ACKs) were never received; (g) statistics about round-trip time (RTT) used to calculate timeout values; (f) whether a TCP socket is open or closed; (g) a transmit backlog on the TCP socket; (h) and an amount of actual packet loss reported from the receiver for each channel, as well as the last time actual loss data was received.

17. The method of claim 11, wherein the encryption scheme is one of eBC-0 and eBC-x16.

18. The method of claim 11, wherein the error correction scheme is a 1-dimensional XOR scheme suitable for recovering one missing packet from a group of N packets.

19. The method of claim 18, wherein the value of N is selected to correspond to the last packet of a multi-packet frame.

20. The method of claim 18, wherein the error correction scheme is fBC-X1d.

21. A system comprising:
an autonomous broadcasting device (ABD) situated behind a router, the router comprising a firewall;
scheduling logic remote from and in data communication with the ABD over a network; and
a server,
wherein the scheduling logic interfaces with a first user to allow the first user to set a recording start time for a live event,
wherein, in response to a request initiated autonomously by the ABD, the scheduling logic transmits data relating to the recording start time to the ABD over the network without modification or circumvention of the firewall,
wherein, based on the data relating to the recording start time, the ABD autonomously transmits video data of the live event without modification or circumvention of the firewall contemporaneously with the live event from a video acquisition device to the server over the network, wherein the server transmits the video data as a live video stream to a second user over the network, wherein the video data is transmitted to the server according to a first protocol, wherein the first protocol defines an encryption scheme for the video data; and wherein the first protocol defines an error correction scheme for the video data.

22. The system of claim 21, wherein the first protocol is a backhaul protocol that transports the video data from the ABD to the server using a plurality of packets, wherein each of the packets comprises (i) encrypted data corresponding to a portion of the video data and (ii) error correction information.

23. The system of claim 22, wherein the first protocol uses UDP to transmit the packets from the ABD to the server; and wherein the first protocol uses TCP to deliver corresponding packet acknowledgements from the server to the ABD.

24. The system of claim 22, wherein the first protocol facilitates transmission of information for addressing congestion along a backhaul path, said information comprising one or more of: (a) a number of buffers and bytes sent; (b) a number of buffers and bytes positively acknowledged (ACKed); (c) a number of buffers and bytes negatively acknowledged (NACKed); (d) a number of buffers retransmitted due to negative acknowledgements (NACKs); (e) a number of buffers retransmitted due to timeout waiting for positive acknowledgement; (f) a number of buffers and bytes for which positive acknowledgement (ACKs) were never received; (g) statistics about round-trip time (RTT) used to calculate timeout values; (f) whether a TCP socket is open or closed; (g) a transmit backlog on the TCP socket; (h) and an amount of actual packet loss reported from the receiver for each channel, as well as the last time actual loss data was received.

25. The system of claim 21, wherein the encryption scheme is one of eBC-0 and eBC-x16.

26. The system of claim 21, wherein the error correction scheme is a 1-dimensional XOR scheme suitable for recovering one missing packet from a group of N packets.

27. The system of claim 26, wherein the value of N is selected to correspond to the last packet of a multi-packet frame.

28. The system of claim 26, wherein the error correction scheme is fBC-X1d.

29. A method comprising:
receiving and storing on a server schedule data from a first user, the schedule data comprising data relating to a recording start time for a live event;

in response to a request from an autonomous broadcasting device (ABD), transmitting the data relating to the recording start time to the ABD, wherein the ABD is remote from the server and situated behind a router, and wherein the request is initiated autonomously by the ABD and no modification to or circumvention of the router is necessary for communication between the ABD and the server;

receiving streaming information from the ABD;

receiving a first transmission of digital content of the live event from the ABD contemporaneously with the live event and based on the data relating to the recording start time; and contemporaneously with the live event, streaming the digital content to a plurality of second users, wherein the digital content is received from the ABD according to a first protocol, wherein the first protocol defines an encryption scheme for the digital content; and wherein the first protocol defines an error correction scheme for the digital content.

30. The method of claim 29, wherein the first protocol is a backhaul protocol that transports the digital content from the ABD to the server using a plurality of packets, wherein each of the packets comprises (i) encrypted data corresponding to a portion of the digital content and (ii) error correction information.

31. The method of claim 30, wherein the first protocol uses UDP to transmit the packets from the ABD to the server; and wherein the first protocol uses TCP to deliver corresponding packet acknowledgements from the server to the ABD.

32. The method of claim 30, wherein the first protocol facilitates transmission of information for addressing congestion along a backhaul path, said information comprising one or more of: (a) a number of buffers and bytes sent; (b) a number of buffers and bytes positively acknowledged (ACKed); (c) a number of buffers and bytes negatively acknowledged (NACKed); (d) a number of buffers retransmitted due to negative acknowledgements (NACKs); (e) a number of buffers retransmitted due to timeout waiting for positive acknowledgement; (f) a number of buffers and bytes for which positive acknowledgement (ACKs) were never received; (g) statistics about round-trip time (RTT) used to calculate timeout values; (f) whether a TCP socket is open or closed; (g) a transmit backlog on the TCP socket; (h) and an amount of actual packet loss reported from the receiver for each channel, as well as the last time actual loss data was received.

33. The method of claim 29, wherein the encryption scheme is one of eBC-0 and eBC-x16.

34. The method of claim 29, wherein the error correction scheme is a 1-dimensional XOR scheme suitable for recovering one missing packet from a group of N packets.

35. The method of claim 34, wherein the value of N is selected to correspond to the last packet of a multi-packet frame.

36. The method of claim 34, wherein the error correction scheme is fBC-X1d.

* * * * *

(12) INTER PARTES REVIEW CERTIFICATE (3162nd)
United States Patent
Hartman et al.

(10) Number: US 10,154,317 K1
(45) Certificate Issued: Jun. 29, 2023

(54) SYSTEM, METHOD, AND PROTOCOL FOR TRANSMISSION OF VIDEO AND AUDIO DATA

(71) Applicants: Justin R. Hartman; Ronald C. Hopper; Gordon R. Daily; Joel S. Helbling

(72) Inventors: Justin R. Hartman; Ronald C. Hopper; Gordon R. Daily; Joel S. Helbling

(73) Assignee: BOXCAST, LLC

Trial Number:

IPR2022-00067 filed Oct. 15, 2021

Inter Partes Review Certificate for:

Patent No.: 10,154,317
Issued: Dec. 11, 2018
Appl. No.: 15/637,160
Filed: Jun. 29, 2017

The results of IPR2022-00067 are reflected in this inter partes review certificate under 35 U.S.C. 318(b).

INTER PARTES REVIEW CERTIFICATE
U.S. Patent 10,154,317 K1
Trial No. IPR2022-00067
Certificate Issued Jun. 29, 2023

AS A RESULT OF THE INTER PARTES REVIEW PROCEEDING, IT HAS BEEN DETERMINED THAT:

Claims 1-36 are cancelled.

\* \* \* \* \*